United States Patent
Hall, Jr.

(10) Patent No.: US 12,372,053 B2
(45) Date of Patent: Jul. 29, 2025

(54) WAVE SWELL ENERGY CAPTURE INFRASTRUCTURE

(71) Applicant: George B. Hall, Jr., Battle Ground, WA (US)

(72) Inventor: George B. Hall, Jr., Battle Ground, WA (US)

(*) Notice: Subject to any disclaimer, the term of this patent is extended or adjusted under 35 U.S.C. 154(b) by 24 days.

(21) Appl. No.: 18/399,280

(22) Filed: Dec. 28, 2023

(65) Prior Publication Data
US 2024/0287959 A1 Aug. 29, 2024

Related U.S. Application Data

(60) Provisional application No. 63/477,766, filed on Dec. 29, 2022.

(51) Int. Cl.
| | | |
|---|---|---|
| F03B 13/18 | (2006.01) | |
| F03B 13/10 | (2006.01) | |
| F03B 13/14 | (2006.01) | |

(52) U.S. Cl.
CPC ............ *F03B 13/188* (2013.01); *F03B 13/10* (2013.01); *F03B 13/14* (2013.01)

(58) Field of Classification Search
CPC .... F03B 13/10; F03B 13/1855; F03B 13/188; F03B 13/14; F03B 13/183; F03B 13/1815; F03B 13/20; F05B 2270/202; F05B 2270/1077; F05B 2240/93; F05B 2270/18
See application file for complete search history.

(56) References Cited

U.S. PATENT DOCUMENTS

| | | | |
|---|---|---|---|
| 2011/0018275 A1* | 1/2011 | Sidenmark | F03B 13/1815 290/53 |
| 2016/0265506 A1 | 9/2016 | Kimura | |
| 2018/0073482 A1 | 3/2018 | Sheldon-Coulson et al. | |
| 2019/0360452 A1* | 11/2019 | Qu | F03B 13/1875 |
| 2020/0011289 A1* | 1/2020 | Steenstrup | F03B 13/264 |

OTHER PUBLICATIONS

PCT Application No. PCT/US2023/086465, filed Dec. 29, 2023, 182 pages.
International Search Report and Written Opinion for PCT Application No. PCT/US2023/086465, mailed Apr. 23, 2024, 9 pages.
Chapter II Demand and Article 34 Amendment filed in PCT Application No. PCT/US2023/086465, filed Jul. 23, 2024, 20 pages.

* cited by examiner

*Primary Examiner* — Shafiq Mian
(74) *Attorney, Agent, or Firm* — Berkeley Law & Technology Group, LLP

(57) ABSTRACT

Example methods, apparatuses, and/or articles of manufacture are disclosed herein that may be utilized, in whole or in part, to facilitate and/or support one or more operations and/or techniques for wave swell energy capture infrastructure, such as implemented, in whole or in part, via utilization of an energy conversion apparatus.

18 Claims, 68 Drawing Sheets

WAVE SWELL ENERGY CAPTURE INFRASTRUCTURE

CROSS-REFERENCE TO RELATED APPLICATIONS

The present application claims priority under 35 U.S.C. § 119 to U.S. Provisional Application Ser. No. 63/477,766, entitled "WAVE SWELL ENERGY CAPTURE INFRASTRUCTURE," filed on Dec. 29, 2022, which is owned by the inventor or applicant hereof and which is expressly incorporated herein by reference in its entirety.

BACKGROUND

1. Field

The present disclosure relates generally to energy capture infrastructures and, more particularly, to wave swell energy capture infrastructure.

2. Information

As highlighted by a number of recent studies, pollution from the use of fossil fuels may have resulted in climate-affecting and/or, at times, climate-damaging greenhouse gases and poor air quality, among other changes. Currently, a large amount of the world's energy comes from fossil fuels. A yet to be more successfully utilized cleaner energy source may include wave swell energy, for example, which may arguably be a more abundant, more environmentally friendly, more reliable, more predictable, etc. renewable energy resource. Thus, it appears that a statistically significant percentage of worldwide electricity demand may be met, for example, by harvesting ocean wave swell or like energy.

Unfortunately, wave swell energy harvesting technology, ocean or otherwise, may still be in preliminary stages of experimentation. As a way of just one example, development of wave swell energy capturing systems may be technologically and/or economically challenging due, at least or in part, to somewhat seasonal behavior of the underlying resource (e.g., ocean, lake, river, etc.). In some instances, this may affect the ability to generate power at an economically viable level during particular seasons or portions thereof, such as, for example, during summer and spring/fall "shoulder" months (e.g., months between peak season months, etc.). Accordingly, how to suitably capture wave swell energy, such as to facilitate and/or support technologically and/or economically feasible harvesting operations, for example, continues to be an area of development.

SUMMARY

Example implementations relate to wave swell energy capture infrastructure that may be implemented, in whole or in part, via utilization of a suitable apparatus, such as an energy conversion apparatus. In an implementation, an apparatus may comprise a subsea cable assembly fixedly attached to a seabed structure via one or more pulleys of a set of pulleys of the subsea cable assembly. The subsea cable assembly may have a set of guides to rotationally route one or more cables of a set of cables of the subsea cable assembly for a movable connection of the one or more cables to a dual cable drum apparatus via a first drum. One or more additional pulleys of the subsea cable assembly may be fixedly attached to one or more subsea interconnecting cables to interconnect with a surface flotation apparatus. The surface flotation apparatus may be operatively connected to a cable tensioning apparatus via at least a connecting cable of a second drum of the dual cable drum apparatus. The cable tensioning apparatus, the dual cable drum apparatus, and the surface flotation apparatus may cooperate via at least the one or more subsea interconnecting cables, the connecting cable, and the set of cables of the subsea cable assembly to convert a linear motion of the surface flotation apparatus into a rotary motion of the dual cable drum apparatus during a full wave period.

In another implementation, an apparatus may comprise a subsea cable assembly fixedly attached to a surface flotation apparatus via one or more pulleys of a set of pulleys of the subsea cable assembly. Here, the subsea cable assembly may have a set of guides to rotationally route one or more cables of a set of cables of the subsea cable assembly for a movable connection of the one or more cables to a dual cable drum apparatus via a first drum. One or more additional pulleys of the subsea cable assembly may be fixedly attached to one or more subsea interconnecting cables to interconnect with at least one of a seabed anchor or a sea anchor. The surface flotation apparatus may be operatively connected to a cable tensioning apparatus via at least a connecting cable of a second drum of the dual cable drum apparatus. The cable tensioning apparatus, the dual cable drum apparatus, and the surface flotation apparatus may cooperate, via at least the one or more subsea interconnecting cables, the connecting cable, and the set of cables of the subsea cable assembly to convert a linear motion of the surface flotation apparatus into a rotary motion of the dual cable drum apparatus during a full wave period.

In yet another implementation, an apparatus may comprise a subsea interconnecting cable operatively connected to a dual cable drum apparatus via a first drum. The subsea interconnecting cable may be fixedly attached to at least one of a seabed anchor or a sea anchor. A surface flotation apparatus of the apparatus may be operatively connected to a cable tensioning apparatus via at least a connecting cable of a second drum of the dual cable drum apparatus. Here, the cable tensioning apparatus, the dual cable drum apparatus, and the surface flotation apparatus may cooperate, via the subsea interconnecting cable and the connecting cable, to convert a linear motion of the surface flotation apparatus into a rotary motion of the dual cable drum apparatus during a full wave period.

In yet another implementation, an apparatus may comprise a subsea interconnecting cable connected to a hydraulic power conversion apparatus comprising at least a hydraulic power assembly and a hydraulic cable tension assembly. The subsea interconnecting cable may be fixedly attached to at least one of a seabed anchor or a sea anchor. Here, the power conversion apparatus may be mounted on a surface flotation apparatus for substantially concurrent operation. The hydraulic power assembly, the hydraulic cable tension assembly, and the surface flotation apparatus may cooperate, via at least the subsea interconnecting cable, to facilitate a movement of a first hydraulic piston within a first hydraulic cylinder to initiate a first hydraulic flow from the first hydraulic cylinder to a hydraulic accumulator during a first half of a full wave period.

In yet another implementation, a magnetically coupled bi-directional flow turbine may comprise a guide-vane nozzle set fixedly positioned within a turbine housing having a first opening and a second opening. The magnetically coupled bi-directional flow turbine may further comprise a turbine bucket set positioned within the turbine housing to rotate relative to the guide-vane nozzle set. The turbine bucket set may be fixedly attached to a substantially hollow cylinder comprising a first plurality of magnets so as to facilitate rotational movements thereof. The hollow cylinder may substantially extend over an internal sealed chamber that may be stationary to the turbine housing. The internal sealed chamber may house at least a drive rotor assembly comprising a second plurality of magnets. Here, the substantially hollow cylinder may transfer a rotational motion to the drive rotor assembly via a magnetic coupling of corresponding magnetic pairs of the first and the second plurality of magnets during a full wave period.

In yet another implementation, a bi-directional flow turbine may comprise a guide-vane nozzle set fixedly positioned within a turbine housing having a first opening and a second opening, and a turbine bucket set positioned within the turbine housing to rotate relative to the guide-vane nozzle set. The turbine bucket set may be fixedly attached to a substantially hollow cylinder comprising a plurality of magnets so as to facilitate rotational movements thereof. The plurality of magnets of the hollow cylinder may substantially extend over windings of an internal generator stator assembly, which may be stationary to the turbine housing. Here, the plurality of magnets may produce electromagnetically induced voltage in the windings during the rotational movements of the substantially hollow cylinder over a full wave period.

BRIEF DESCRIPTION OF THE DRAWINGS

Non-limiting and non-exhaustive aspects are described with reference to the following figures, wherein like reference numerals refer to like parts throughout the various figures unless otherwise specified.

FIG. 1O is an elevation view illustrating one or more aspects of an example wave swell energy capture infrastructure that may include surface flotation apparatus with surface flotation apparatus guide and alignment structure, which may comprise a mounted subsea structure, according to an implementation.

DETAILED DESCRIPTION

It should also be appreciated that structures, components, etc. illustrated have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from the scope and spirit of claimed subject matter. It should also be noted that directions and/or references, such as, for example, up, down, top, bottom, and so on, if applicable or appropriate, may be used to facilitate and/or support discussion and are not intended to restrict application of claimed subject matter. Therefore, the following detailed description is not to be taken to limit claimed subject matter and/or equivalents.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, and/or articles of manufacture are disclosed herein that may be implemented, in whole or in part, to facilitate and/or support one or more operations and/or techniques for wave swell energy capture infrastructure. As will be seen, depending on an implementation, these or like one or more operations and/or techniques may, for example, be implemented, in whole or in part, via utilization of an energy conversion apparatus that may embody seabed structure mounted subsea pulley assembly, though claimed subject matter is not so limited. For example, in some instances, an energy conversion apparatus may embody surface flotation apparatus mounted subsea pulley assembly, as will also be seen. It should also be noted that, at times, an energy conversion apparatus may, for example, be anchored to a seabed, such as via seabed anchor, as also discussed below. As will also be seen, a number of surface flotation devices or apparatuses may also be utilized, in whole or in part, such as to facilitate and/or support absorption of wave swell energy during wave transitions, among other functions.

Figure 1A:
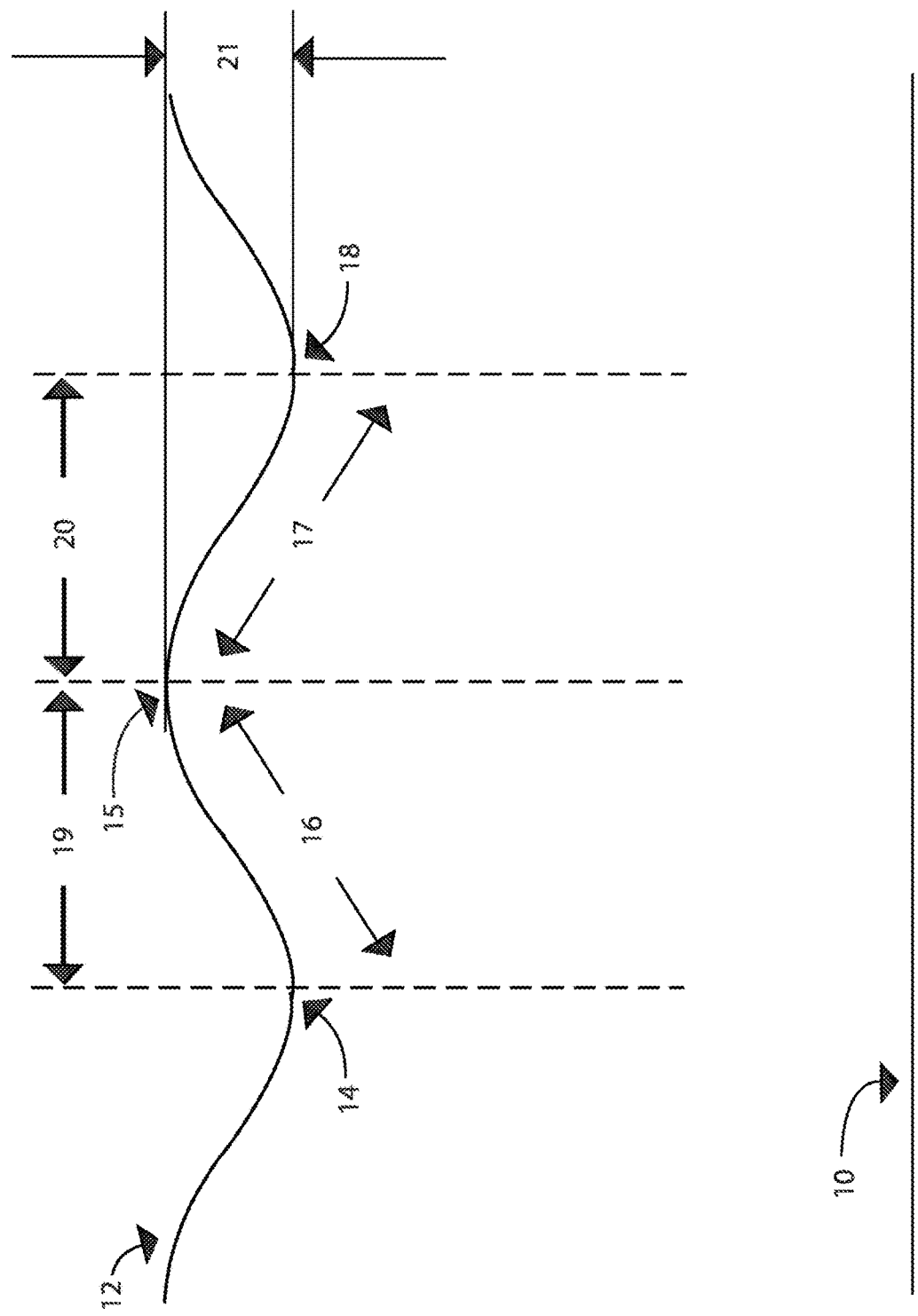
FIG. 1A is an example illustration of a wave swell period or cycle, according to an implementation.

As alluded to previously, a wave typically contains potential energy due, at least or in part, to work performed while a flat surface of water is deformed into waves. By definition, waves are generated from the action of the wind from locally driven events, whereas swells are also waves generated from the action of the wind, but are formed from distant weather events. Waves generated from the action of the wind from locally driven events may combine with swells generated by winds that are formed from distant weather events. Energy potential exists in both swells and waves, and/or the combination of the two. As illustrated generally in FIG. 1A at 16, this work may correspond to water surface 12 being lifted against the force of gravity while traveling, at least in part, from a wave trough 14 to a wave crest 15. As also illustrated, a wave height 21 is schematically shown as the difference between the top of wave crest 15 and the bottom of wave trough 18. Reference numeral 10 illustrates an example of a seabed, ocean floor, lake bottom, or the like.

As will be discussed in greater detail below, wave swell energy capture infrastructure may include a particular implementation of wave swell energy harvesting technology that may amplify, at least in part, waves' relatively vertical travel and/or velocity. In some instances, this may facilitate and/or support increase in energy that can be suitably harvested, such as for electrical generation, for example, or any other suitable application, output, and/or purpose. For example, as will also be seen, one particular implementation of wave swell energy harvesting technology, which may also be part of wave swell energy capture infrastructure, may include a hydro kinetic turbine, though claimed subject matter is not so limited. Here, hydro kinetic turbine may, for example, be suitably mounted and/or oriented (e.g., relatively vertically, etc.), such as to more efficiently and/or more effectively utilize amplified waves' relatively vertical travel and/or velocity in one particular implementation of wave swell energy harvesting technology. By way of example but not limitation, in one particular simulation or experiment, it has been observed that a suitably mounted and/or orientated (e.g., relatively vertically, etc.) hydro kinetic turbine, may be capable of performing more effectively and/or more efficiently while waves' average vertical velocities are equal to or above 1 meter/second. Continuing with the above example, by way of explanation, it has also been observed that a velocity higher than an average wave vertical velocity of 1 meter/second, may not develop until sea conditions average at or above a sustained Beaufort Wind Scale of 6 (e.g., wind velocities of 12.86 meters/second, etc.), such as may be found in more mature and/or developed seas or other sufficiently continuous bodies of water. Again, it should be noted that these are merely examples to which claimed subject matter is not limited.

Additionally, it has been observed that, in some instances, amplification of wave height may amplify wave upward velocity. As also discussed below, amplification of wave's relatively vertical travel and/or velocity may contribute to an increase of energy that may be suitably harvested, such as, for example, during summer periods while wave heights and/or relative vertical velocities may be relatively low, (0-2 m wave height) and/or during winter periods where wave heights and/or relative vertical velocities may be relatively high (4-11 m wave height). It should be noted, however, that one or more aspects of the present disclosure may also be suitably utilized, in whole or in part, during one or more other seasonal periods or during any combination thereof.

Unfortunately, existing wave swell energy harvesting technology, such as point absorber-type systems (e.g., small bottom-referenced heaving buoy, bottom-referenced submerged heave-buoy, etc.) or the like may depend, at least in part on, and, thus, may be limited by, aspects of buoyancy (upward force exerted by a fluid that opposes the weight of a partially or fully immersed object) and mass (e.g., weight, etc.) of surface flotation apparatus and/or a subsurface apparatus for operation. This may negatively affect suitable harvesting of wave potential energy. Namely, existing point absorber-type systems or like wave harvesting technology typically use buoyancy and/or subsurface buoyancy device to extract wave potential energy over the first half of wave period, referenced generally at 19 in FIG. 1A, as surface and/or subsurface buoyance apparatus travels from wave trough 14 to wave crest 15, illustrated schematically at 16 and use gravitational pull or mass (e.g., weight, etc.) of a surface flotation apparatus and/or subsurface apparatus to harvest wave potential energy during the second half of wave period 20, while wave travels from wave crest 15 to wave trough 18, as further illustrated at 17. Existing wave swell energy harvesting technology may also be limited, for example, in size and scope, in whole or in part, by power conversion system torque limitations, due, at least in part, to low wave vertical velocities, which may particularly occur in summer and fall/spring shoulder months.

Thus, as discussed below, to solve and/or sufficiently address these or like challenges, at times, particular aspects of buoyancy may be advantageously used, in whole or in part, to facilitate and/or support harvesting of wave potential energy. As will be seen, unlike existing approaches relying on a mass for proper operation, such as those discussed above, for example, among others, here, a mass (e.g., weight, etc.) of surface flotation apparatus and/or subsurface apparatus may be considered as a relatively minor contributor, if at all, in one or more aspects of harvesting of wave potential energy. As also discussed herein, in some instances, not having to substantially balance a mass (e.g., weight, etc.) and/or buoyancy of surface and/or subsurface apparatus, as well as providing torque reduction for a power conversion apparatus, may allow for a number of advantageous design options that may be incorporated into wave swell energy capture infrastructure, such as to increase generation output, reduce cost of construction, improve efficiency of energy harvest, etc., such as compared to existing approaches. As mentioned above, during the first half of wave period, referenced generally at 19 in FIG. 1A, the force necessary to support (float}, and lift the mass (e.g., weight, etc.) of surface-flotation and/or sub-surface apparatus and capture wave potential energy, is provided by buoyancy. While during the second half of wave period referenced generally at 20 in FIG. 1A, capturing wave potential energy may be, in whole or in part, provided by gravitational pull of mass (e.g., weight, etc.) of surface flotation and/or subsurface flotation apparatus. Increasing the submerged volume of surface flotation apparatus, (increasing the buoyancy of the surface flotation apparatus), may be utilized to decrease the mass (e.g., weight, etc.) required of surface flotation and/or subsurface apparatus to capture a wave potential energy during the second half of the wave period referenced generally at 20 in FIG. 1A by one or more aspects of wave swell energy capture infrastructure, such as discussed within. For example, every cubic meter of increase submerged volume (buoyancy) may be utilized, in whole or in part, to offset approximately 1,200 kg. mass (e.g., weight, etc.) of surface flotation apparatus without impacting or reducing energy capture during the second half of the wave period referenced generally at 20 in FIG. 1A, by one or more aspects of wave swell energy capture infrastructure, such as discussed within.

Briefly, for purposes of explanation, schematics in FIGS. 1A-13B include elevation and/or plan views, as applicable, of one or more implementations of one or more aspects of wave swell energy capture infrastructure, such as discussed herein. It should be noted that like numerals may designate like parts throughout FIGS. 1A-13B, as well as other figures of the present disclosure, such as to indicate corresponding and/or analogous structures, components, etc.

FIGS. 1B-1G are examples illustrations of operation of one or more implementations of example wave swell energy capture infrastructure. FIGS. 1B-1E are examples illustrations of operation of one or more implementations of example wave swell energy capture infrastructure which may, in whole or in part, facilitate and/or support amplification of wave relative vertical travel and/or velocity, such as via one or more approaches discussed herein. As illustrated in FIGS. 1B-1G, examples are shown of surface flotation apparatus 201 traveling in a relatively upward and downward direction as it transitions (illustrated via reference numerals 16 and 17, respectively), in whole or in part, from wave trough 14 to wave crest 15 and back to wave trough 18. Illustrated in FIGS. 1B-1E, subsea pulley assembly 401, as will be discussed in greater detail below, may in whole or in part, facilitate amplification of wave relatively vertical travel and/or velocity. Thus, in some instances, this or like amplification of wave relatively vertical travel and/or velocity may be advantageously used, in whole or in part, to facilitate and/or support one or more wave swell energy harvesting operations (e.g., for electrical generation, etc.) discussed herein.

Figure 1B:
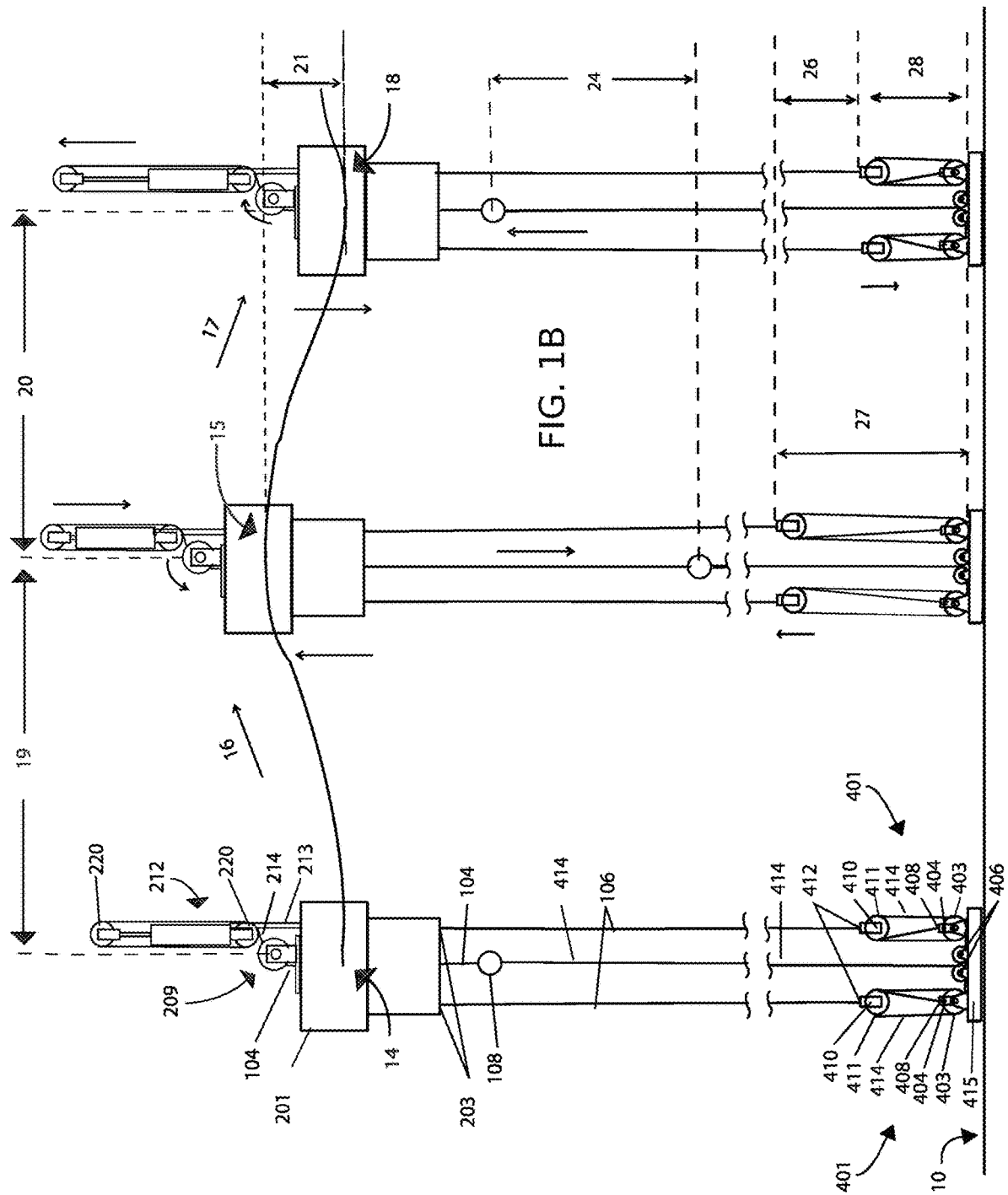
FIG. 1B is an example illustration of an operation of one or more aspects for a wave swell energy capture infrastructure that may include more than one seabed structure mounted subsea pulley assembly, according to an implementation.
Figure 1C:
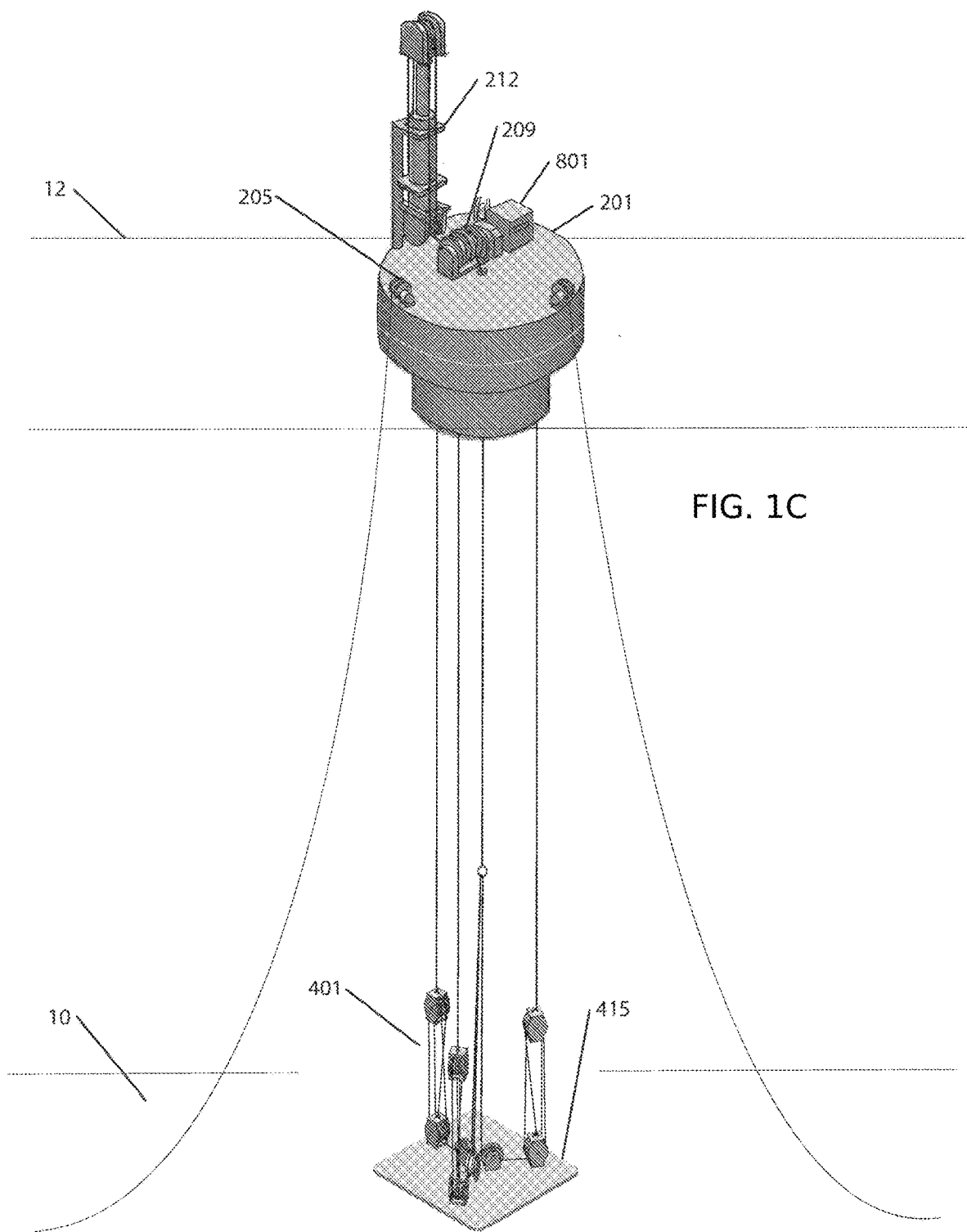
FIG. 1C is an example 3-dimensional (3D) illustration of wave swell energy capture infrastructure that may include more than one seabed structure mounted subsea pulley assembly, according to an implementation.
Figure 1D:
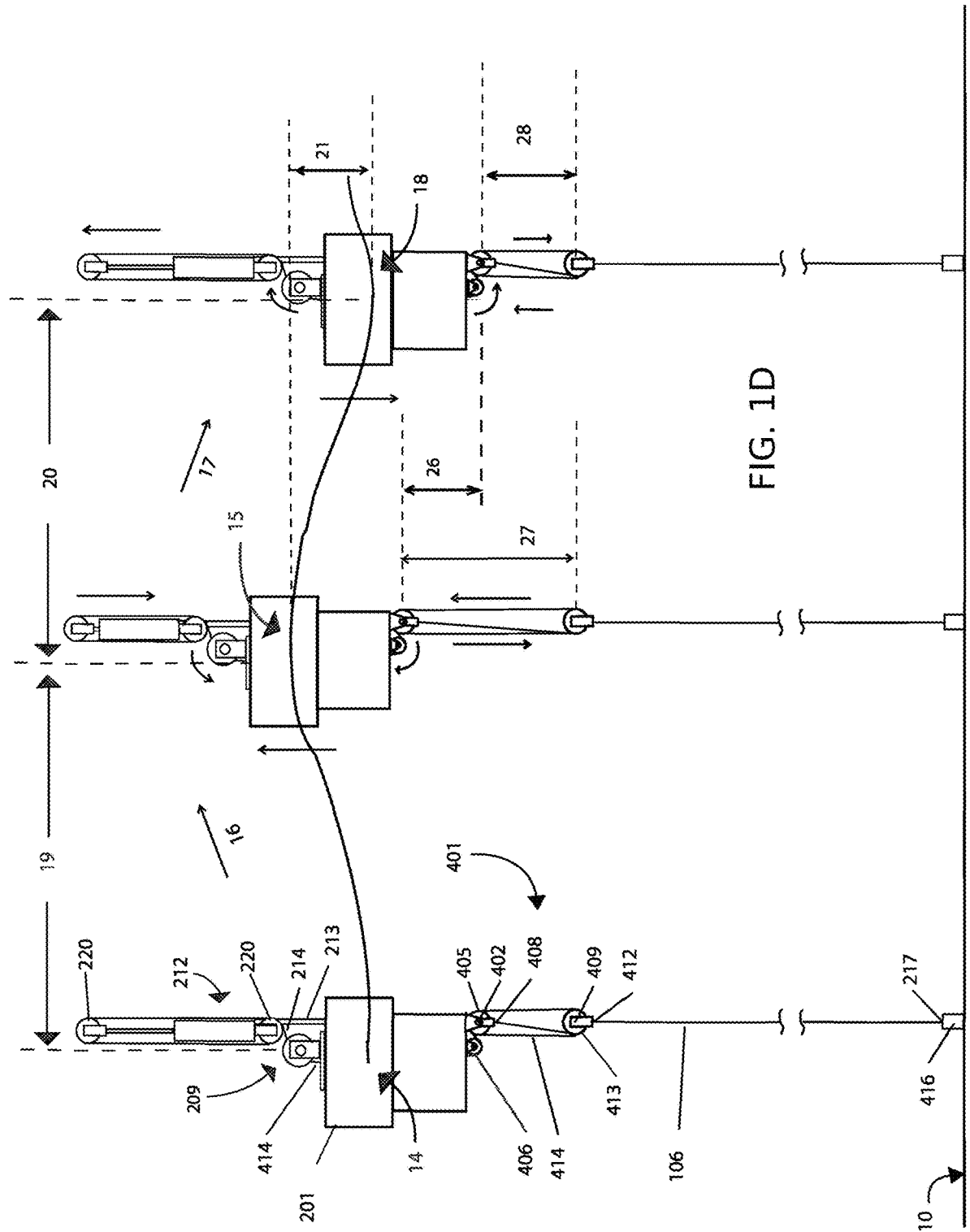
FIG. 1D is an example illustration of an operation of one or more aspects for wave swell energy capture infrastructure that may comprise a surface flotation apparatus mounted subsea pulley assembly, with seabed anchored, subsea interconnecting cable, according to an implementation.
Figure 1E:
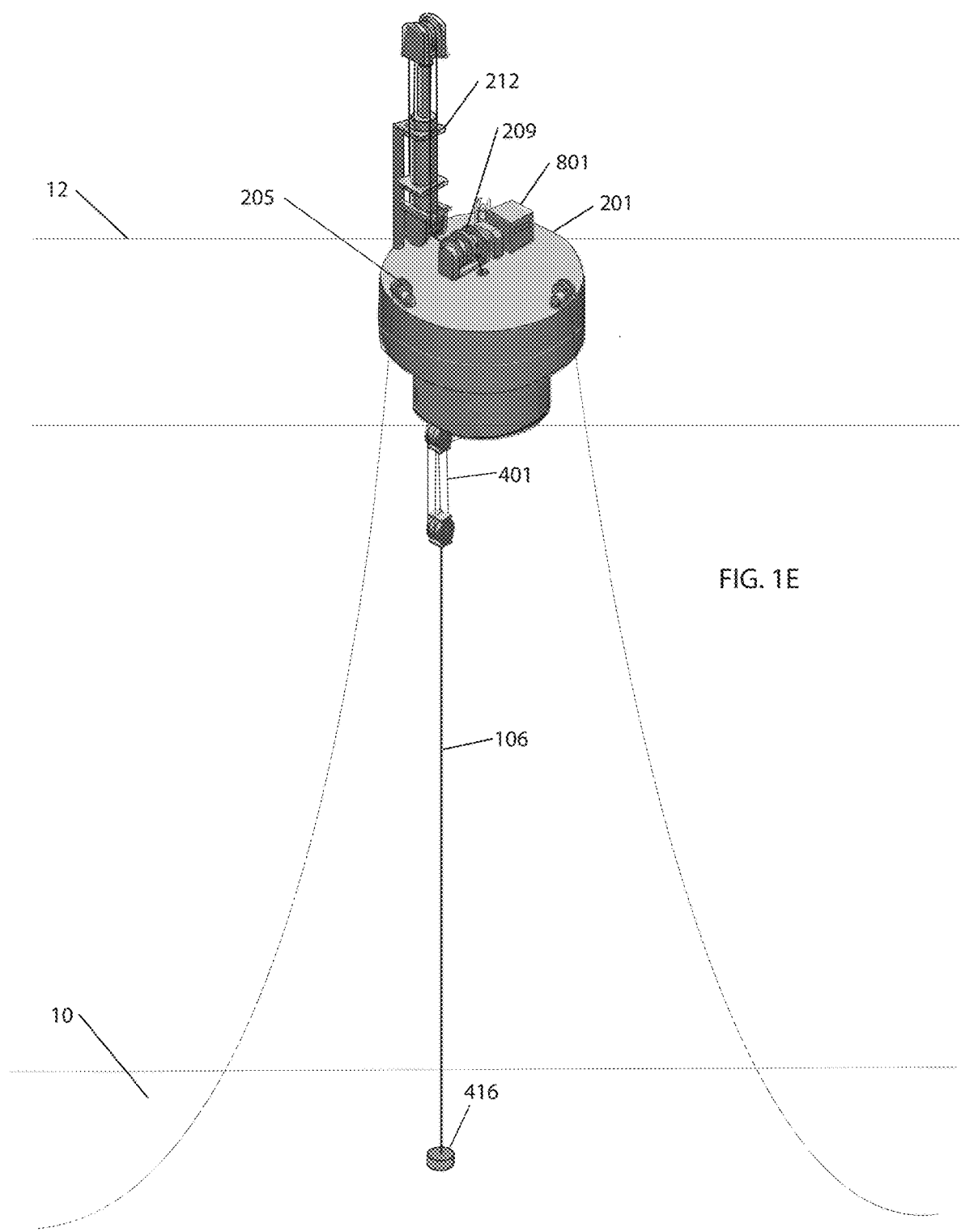
FIG. 1E is an example 3D illustration of wave swell energy capture infrastructure that may comprise surface flotation apparatus mounted subsea pulley assembly, with seabed anchored, subsea interconnecting cable, according to an implementation.
Figure 1F:
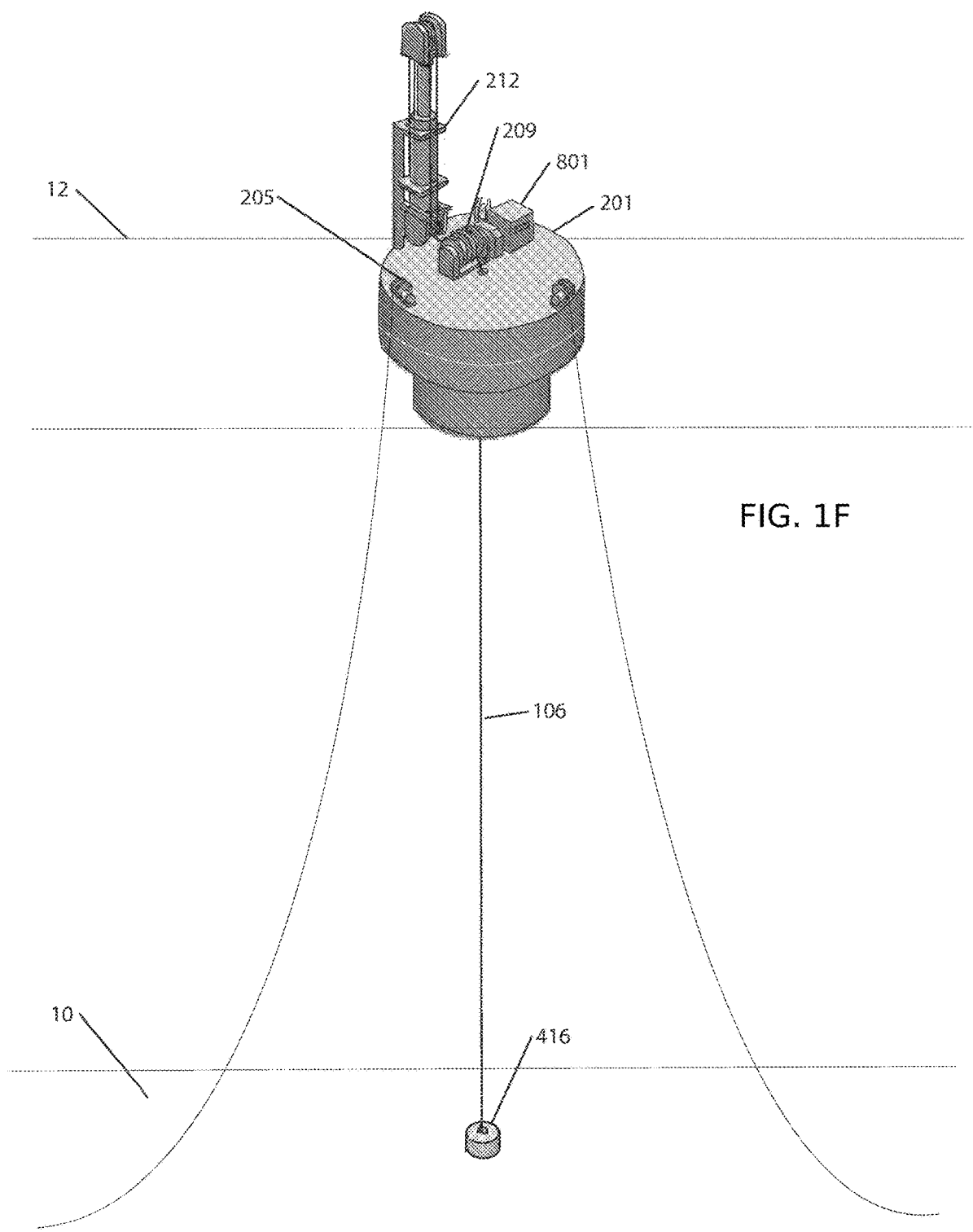
FIG. 1F is a 3D illustration of wave swell energy capture infrastructure that may comprise surface flotation apparatus mounted cable tensioning apparatus with seabed anchored, subsea interconnecting cable, according to an implementation.
Figure 1G:
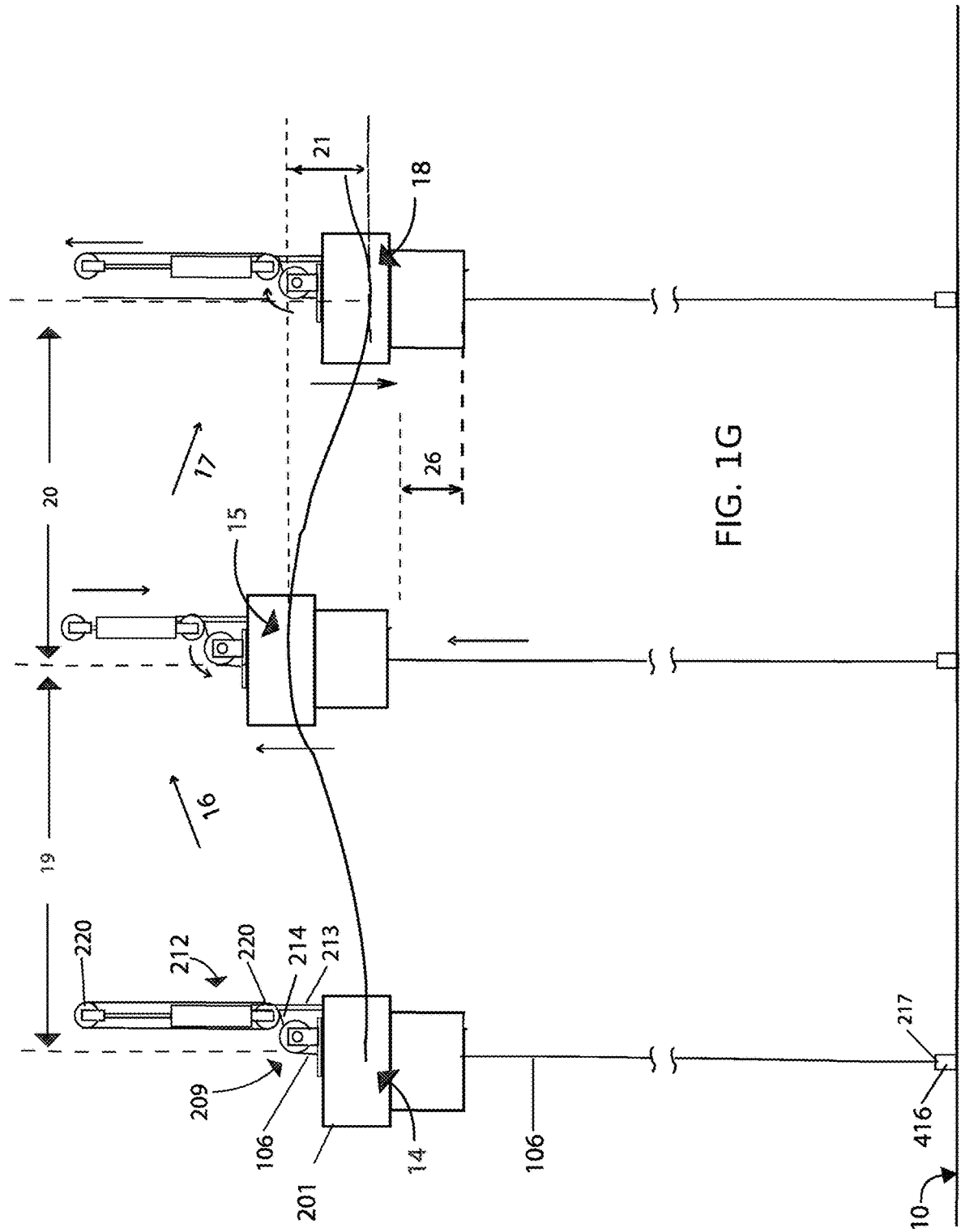
FIG. 1G is an example illustrating operation of one or more aspects for wave swell energy capture infrastructure that may comprise surface flotation apparatus mounted cable tensioning apparatus with seabed anchored, subsea interconnecting cable, according to an implementation.
Figure 1H:
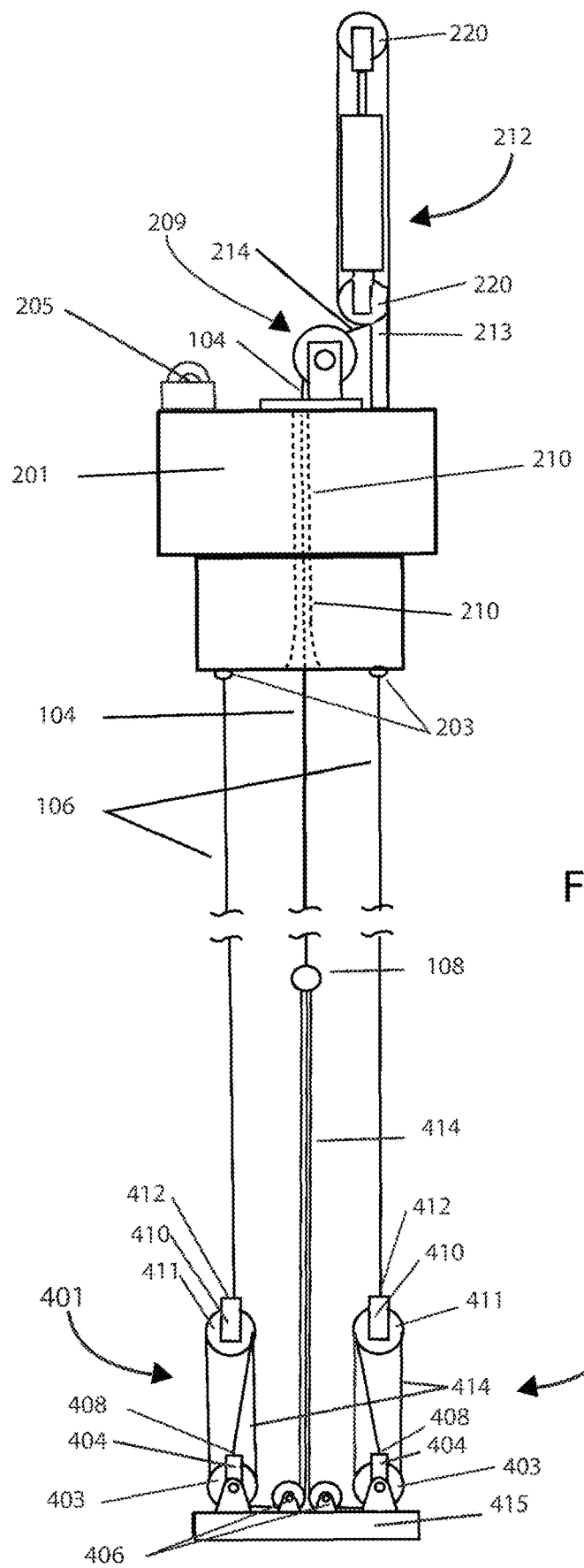
FIG. 1H is an elevation view illustrating one or more aspects of an example wave swell energy capture infrastructure with one or more seabed structure mounted subsea pulley assembly, according to an implementation.

FIG. 1H is an elevation view illustrating one or more aspects of an example wave swell energy capture infrastructure, which may, at least in part, include surface flotation apparatus 201, cable tensioning apparatus 212, dual cable drum apparatus 209, cable/chain anchor 205, subsea pulley assembly 401, respective subsea interconnecting cables 104, 106, and 414, and a seabed structure 415.

Figure 1I:
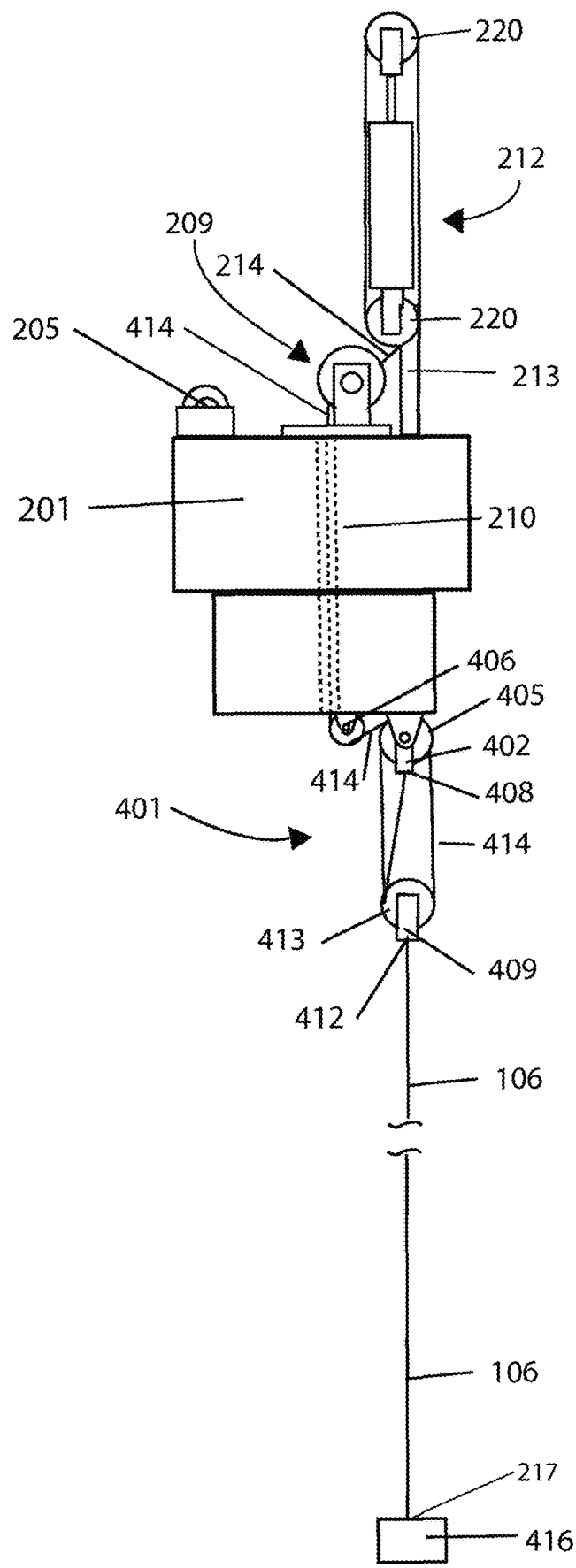
FIG. 1I is an elevation view illustrating one or more aspects of an example wave swell energy capture infrastructure that may comprise surface flotation apparatus mounted subsea pulley assembly, with seabed anchored, subsea interconnecting cable, according to an implementation.
Figure 1J:
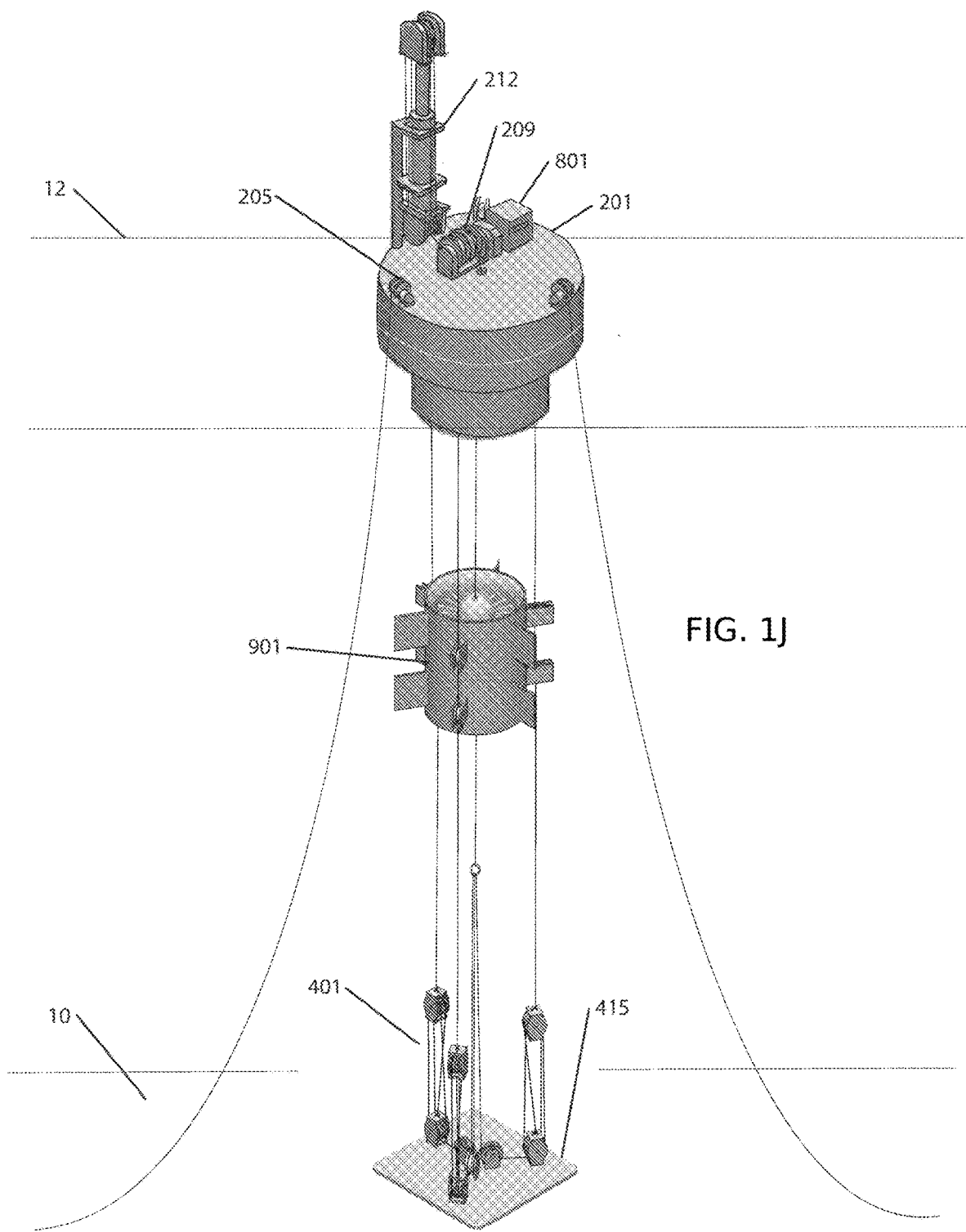
FIG. 1J is a 3D illustration of a wave swell energy capture infrastructure that may comprise hydro kinetic turbine apparatus, surface flotation apparatus, which may include more than one seabed structure mounted subsea pulley assembly, according to an implementation.

FIG. 1I is an elevation view illustrating one or more aspects of an example wave swell energy capture infrastructure, which may, at least in part, include surface flotation apparatus 201, cable tensioning apparatus 212, dual cable drum apparatus 209, cable/chain anchor 205, subsea pulley assembly 401, respective subsea interconnecting cables 106, and 414, and seabed anchor 416.

Figure 1K:
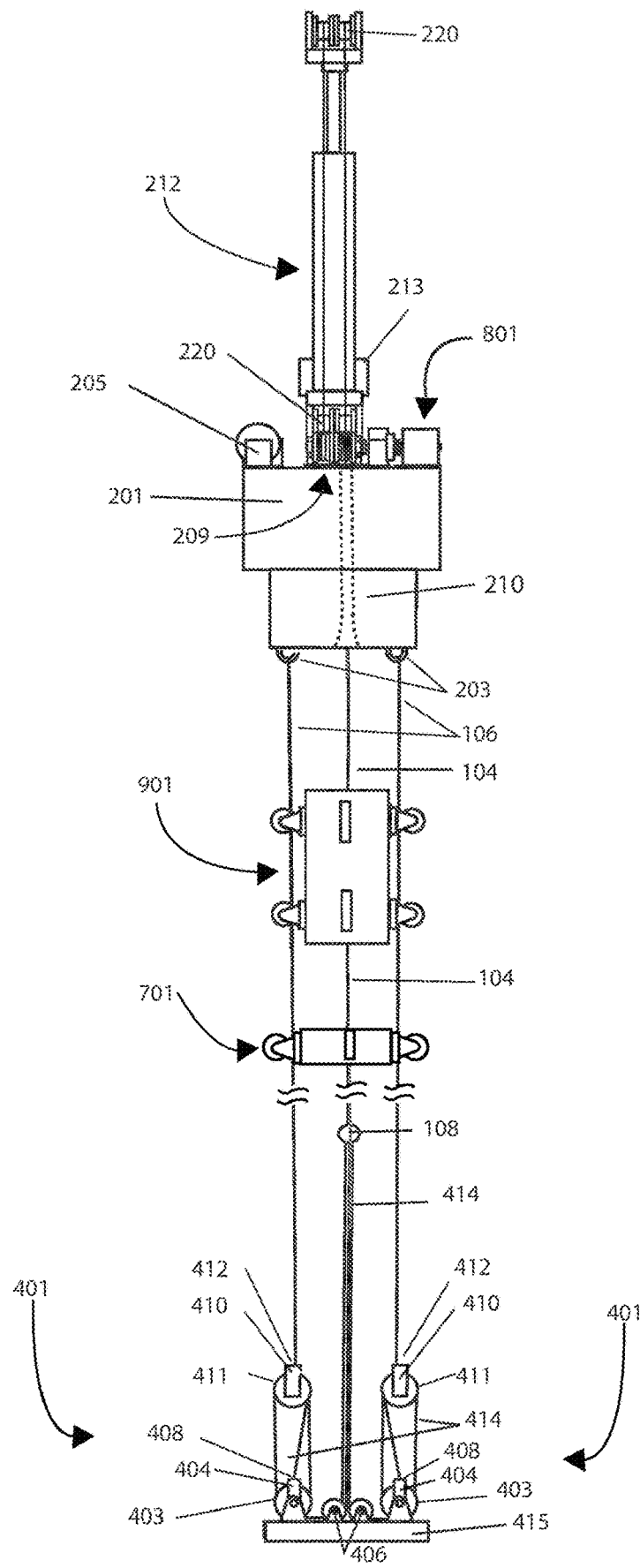
FIG. 1K is an elevation view illustrating one or more aspects of an example wave swell energy capture infrastructure that may comprise a hydro kinetic turbine apparatus, surface flotation apparatus, and subsea cable guide assembly, which may include more than one seabed structure mounted subsea pulley assembly, according to an implementation.

FIG. 1K is an elevation view illustrating one or more aspects of an example wave swell energy capture infrastructure which may, at least in part, include surface flotation apparatus 201, cable tensioning apparatus 212, dual cable drum apparatus 209, cable/chain anchor 205, subsea pulley assembly 401, respective subsea interconnecting cables 104, 106, and 414, subsea cable guide assembly 701, hydro kinetic turbine apparatus 901, and seabed structure 415.

Figure 1L:
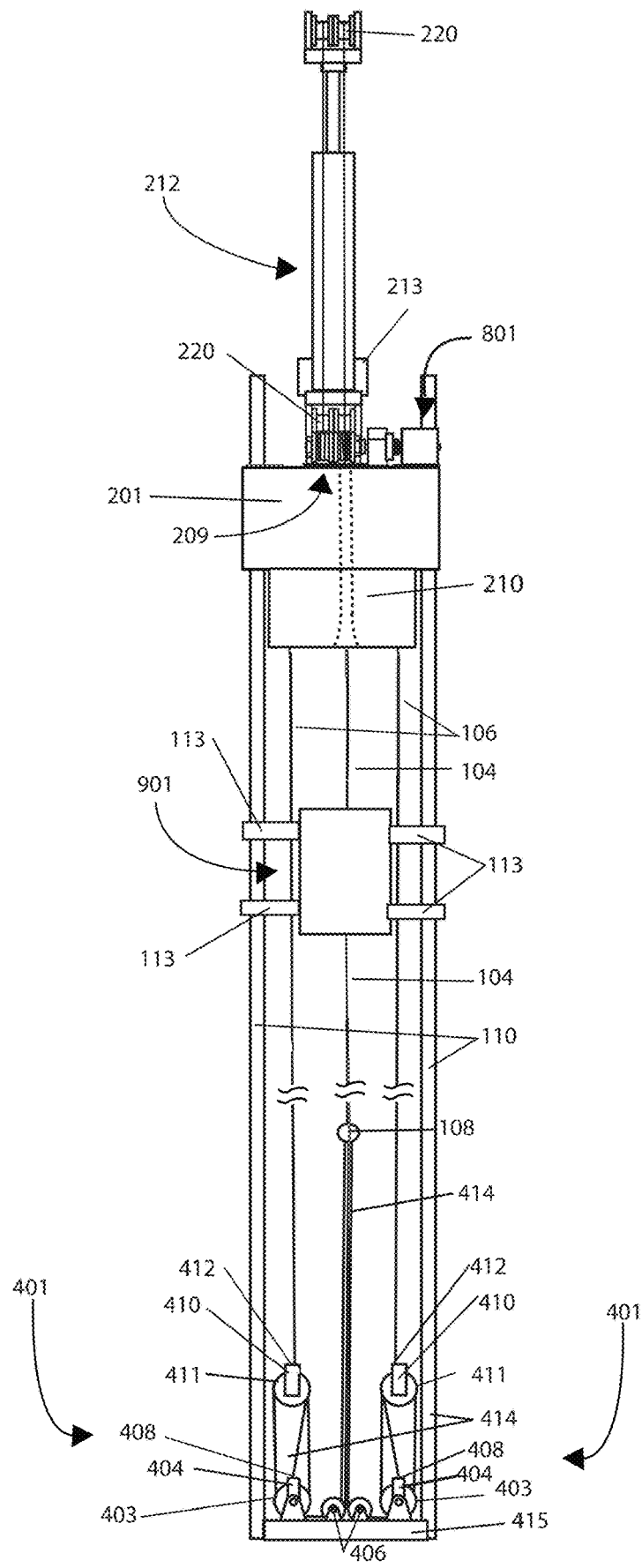
FIG. 1L is an elevation view of one or more aspects of an example wave swell energy capture infrastructure that may comprise an alternative anchor and surface flotation apparatus guide and alignment structure, and may further comprise subsea interconnecting cables, that may include more than one seabed structure mounted subsea pulley assembly, according to an implementation.

FIG. 1L is elevation view illustrating one or more aspects of an example wave swell energy capture infrastructure which shows an alternative anchor and surface flotation apparatus and hydro kinetic turbine apparatus guide and alignment structure, which may, for example, comprise one or more vertical structures 110, that may be in whole or in part, attached to seabed structure 415, and may, in whole or in part pass through surface flotation apparatus 201 and one or more turbine guide structure 113.

Figure 1M:
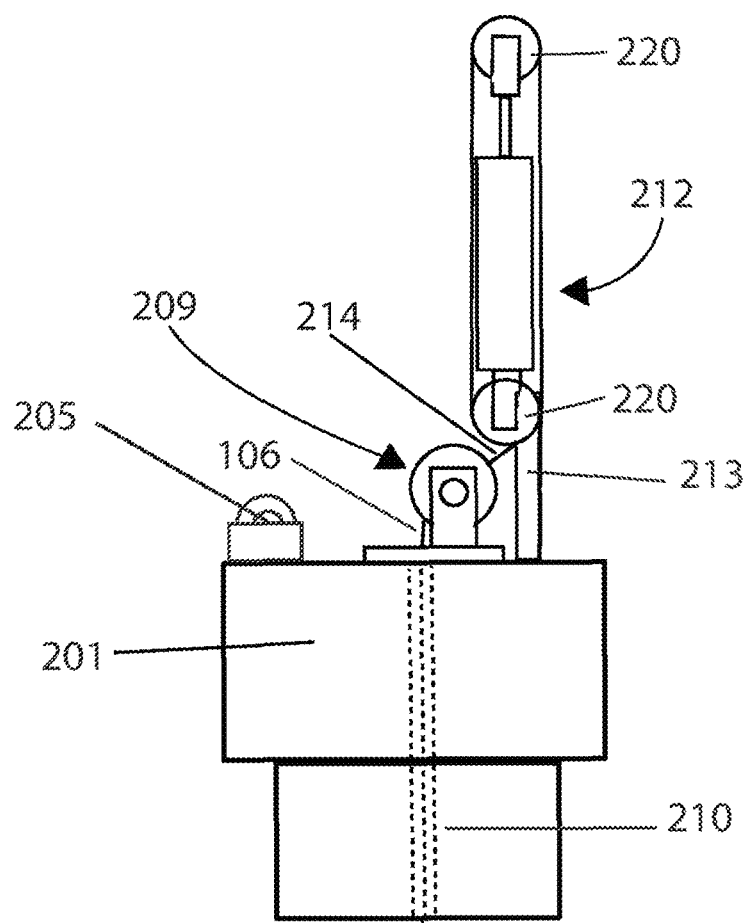
FIG. 1M is an elevation view illustrating one or more aspects of an example wave swell energy capture infrastructure that may comprise surface flotation apparatus mounted cable tensioning apparatus with seabed anchored, subsea interconnecting cable, according to an implementation.
Figure 1M:
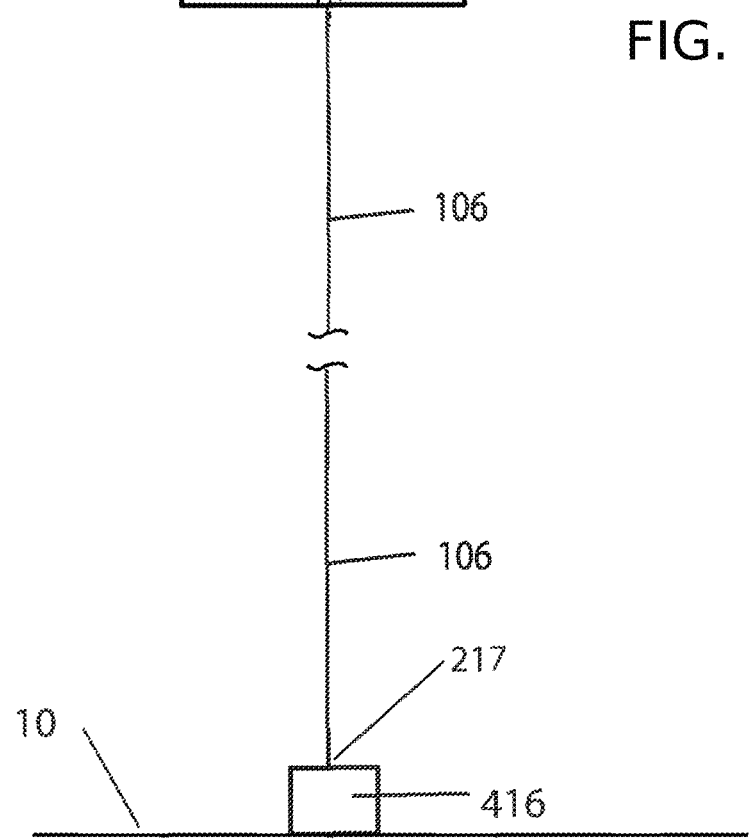

FIG. 1M is an elevation view illustrating one or more aspects of an example wave swell energy capture infrastructure, which may, at least in part, include surface flotation apparatus 201, subsea interconnecting cable 106, dual cable drum apparatus 209, cable/chain anchor 205, seabed anchor 416, and cable tensioning apparatus 212.

Figure 1N:
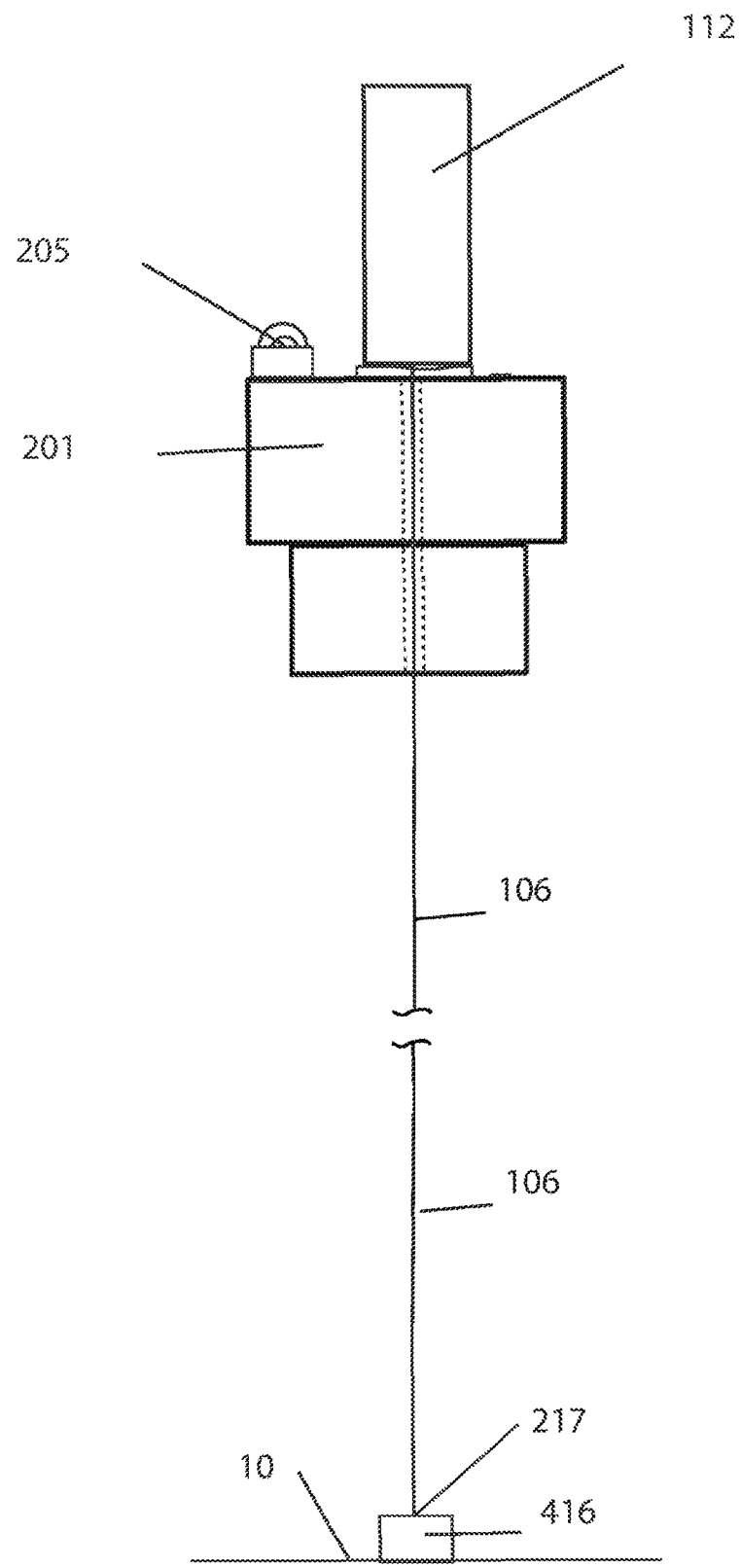
FIG. 1N is an elevation view illustrating one or more aspects of an example wave swell energy capture infrastructure that may comprise surface flotation apparatus mounted hydraulic power conversion apparatus with seabed anchored, subsea interconnecting cable, according to an implementation.

FIG. 1N is an elevation view illustrating one or more aspects of an example wave swell energy capture infrastructure, which may, at least in part, include surface flotation apparatus 201, subsea interconnecting cable 106, cable/chain anchor 205, seabed anchor 416, and combined hydraulic power conversion apparatus 112.

As will be discussed in more detail in subsequence paragraphs, wave potential energy captured by buoyancy of a surface flotation apparatus's relative upward and downward travel, as described previously may, in whole or in part, facilitate and/or support amplification of wave relative vertical travel and/or velocity, facilitate and/or support the energy capture across a wave period, and at least in part, facilitate and/or support an acceptable torque load on an energy conversion apparatus, such as via one or more approaches discussed herein of wave height an aspect of wave swell energy capture infrastructure. Such as via one or more approaches discussed herein as an aspect of wave swell energy capture infrastructure.

Continuing now with FIG. 1B, as illustrated, in an implementation, one or more subsea interconnecting cables, referenced generally at 106 may, for example, be fixedly attached to surface flotation apparatus 201, such as via respective connection points, referenced generally at 203. Here, any suitable connection points, such as a pad-eye and shackle, attached to a choker anchor thimble style cable end connector, may be used, in whole or in part. As also seen, the opposite end of each, one or more subsea interconnecting cables 106, may be fixedly attached to upper pulley assembly 410, such as via respective connection points 412, which may, for example comprise subsea pulley assembly, referenced generally at 401. Here, any suitable connection points, such as pad-eye and shackle, attached to choker anchor thimble style cable end connector, may be used, in whole or in part. In turn, one or more, subsea pulley assembly 401 may, for example, be suitably secured to seabed, ocean floor, lake bottom, or the like, referenced generally via an arrow at 10, such as via seabed structure 415. As also illustrated, during operation, each one or more, subsea interconnecting cables 106 may, in whole or in part, result in upper pulley assembly 410, to travel a particular distance, referenced via 26, such as while surface flotation apparatus 201 travels a particular distance, referenced generally at 21, which may or may not be substantially similar to distance 26. As will be discussed in more detail in subsequence paragraphs, lengthening and shortening distance, referenced generally at 27 (lengthening) and 28 (shortening), between upper pulley assembly 410 and lower pulley assembly 404 of subsea pulley assembly 401, while surface flotation apparatus 201 travels relatively upward and downward may, in whole or in part, facilitate and/or support amplification, referenced generally at 24, of wave relative vertical travel and/or velocity 21, such as via one or more approaches discussed herein of wave height as an aspect of wave swell energy capture infrastructure.

As further seen in FIG. 1B, as illustrated, in an implementation, one or more subsea interconnecting cables, referenced generally at 414 may, for example, be fixedly attached together at one end to connection point referenced generally at 108. Here, any suitable connection points, such as steel ring and shackle, attached to a choker anchor thimble style cable end connector, may be used, in whole or in part. Briefly, opposite end of each of one or more subsea interconnecting cables 414, as illustrated in FIG. 4A and discussed in greater detail in subsequence paragraphs, may, in whole or in part, terminate within a corresponding subsea pulley assembly, referenced generally at 401. Referring back to FIG. 1B, one end subsea interconnecting cable, referenced generally at 104 may, for example, be fixedly attached to connection point referenced generally at 108. Here, any suitable connection points, such as steel ring and shackle, attached to choker anchor thimble style cable end connector, may be used, in whole or in part. Briefly, illustrated in FIGS. 2A, 3A and discussed in greater detail in subsequence paragraphs, opposite end of subsea interconnecting cable 104 may wrap around and be fixedly attached, via a cable drum clamp or similar connection, to cable drum 208 may, for example, be comprised within dual cable drum apparatus, referenced generally at 209. As illustrated in FIG. 1B, upward travel of surface flotation apparatus 201, as surface flotation apparatus 201 travels from wave trough 14 to wave crest 15, rotation of dual cable drum apparatus 209 may, in whole or in part, result in subsea interconnecting cable 104 unwinding from cable drum 208.

Figure 2A:
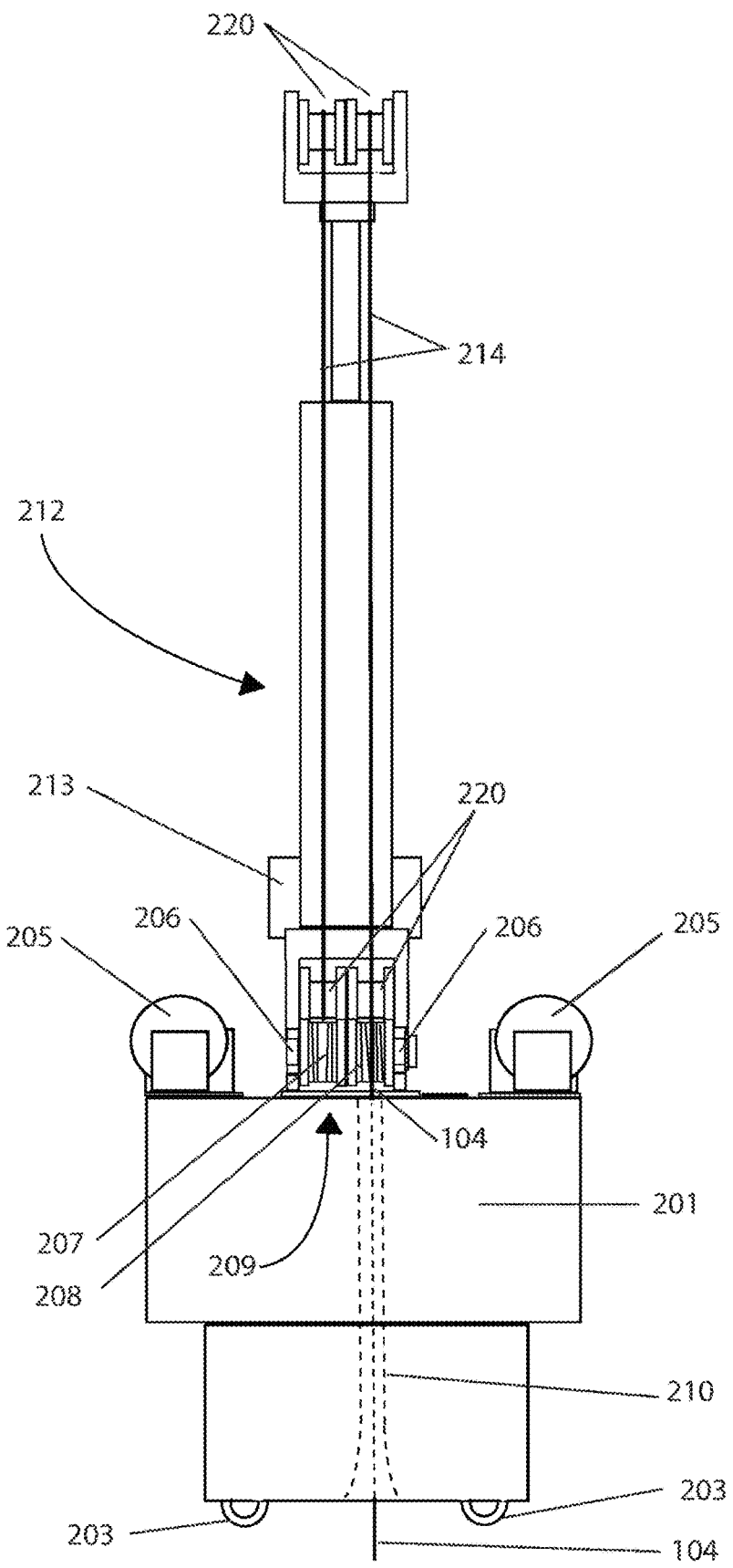
FIG. 2A is an elevation view illustrating one or more aspects of an example surface flotation apparatus, which may be employed with seabed structure including more than one subsea pulley assembly, according to an implementation.
Figure 3A:
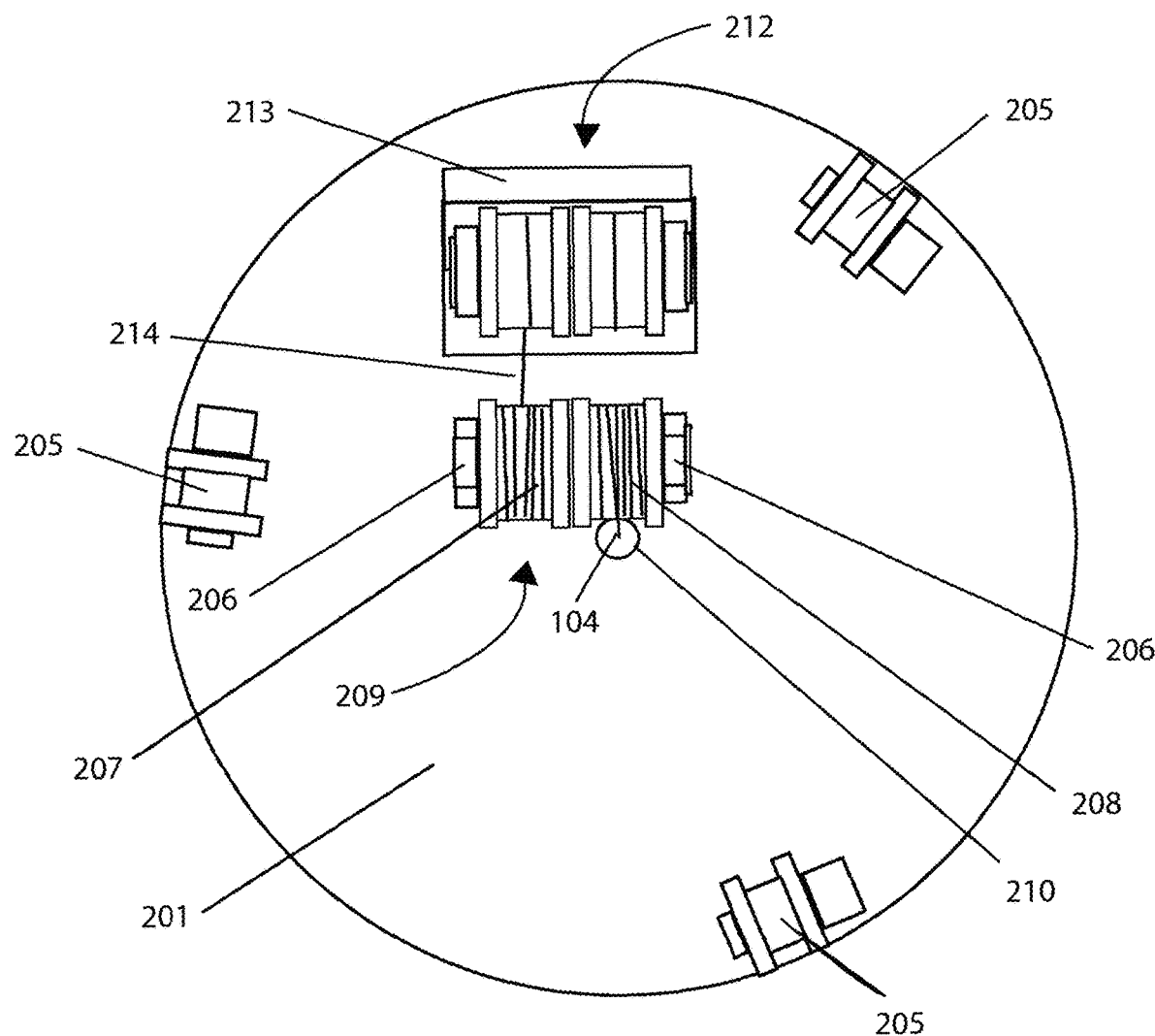
FIG. 3A through FIG. 3C are plan views illustrating one or more aspects of an example surface flotation apparatus mounted cable tensioning apparatus, according to an implementation.
Figure 3B:
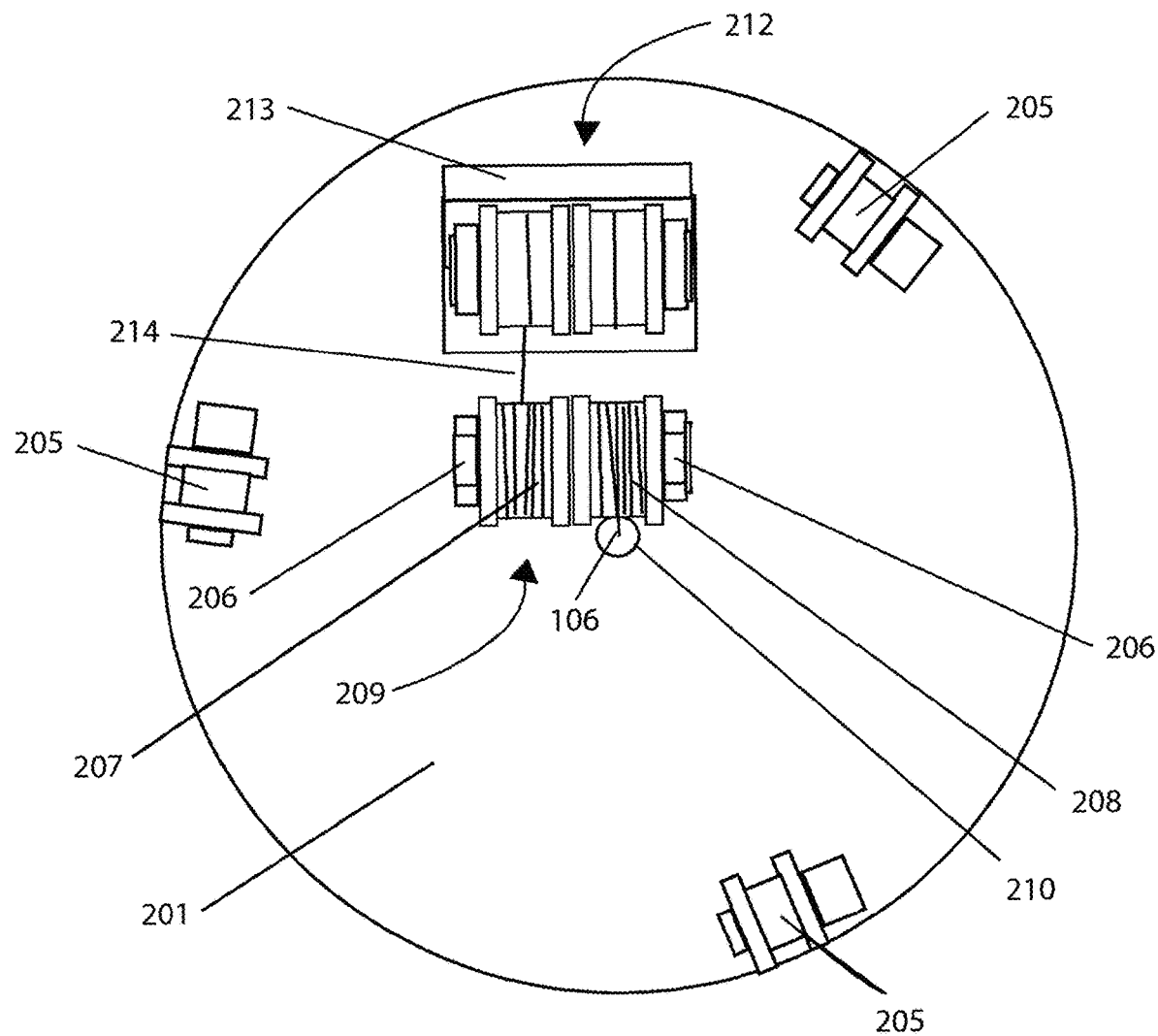
Figure 4A:
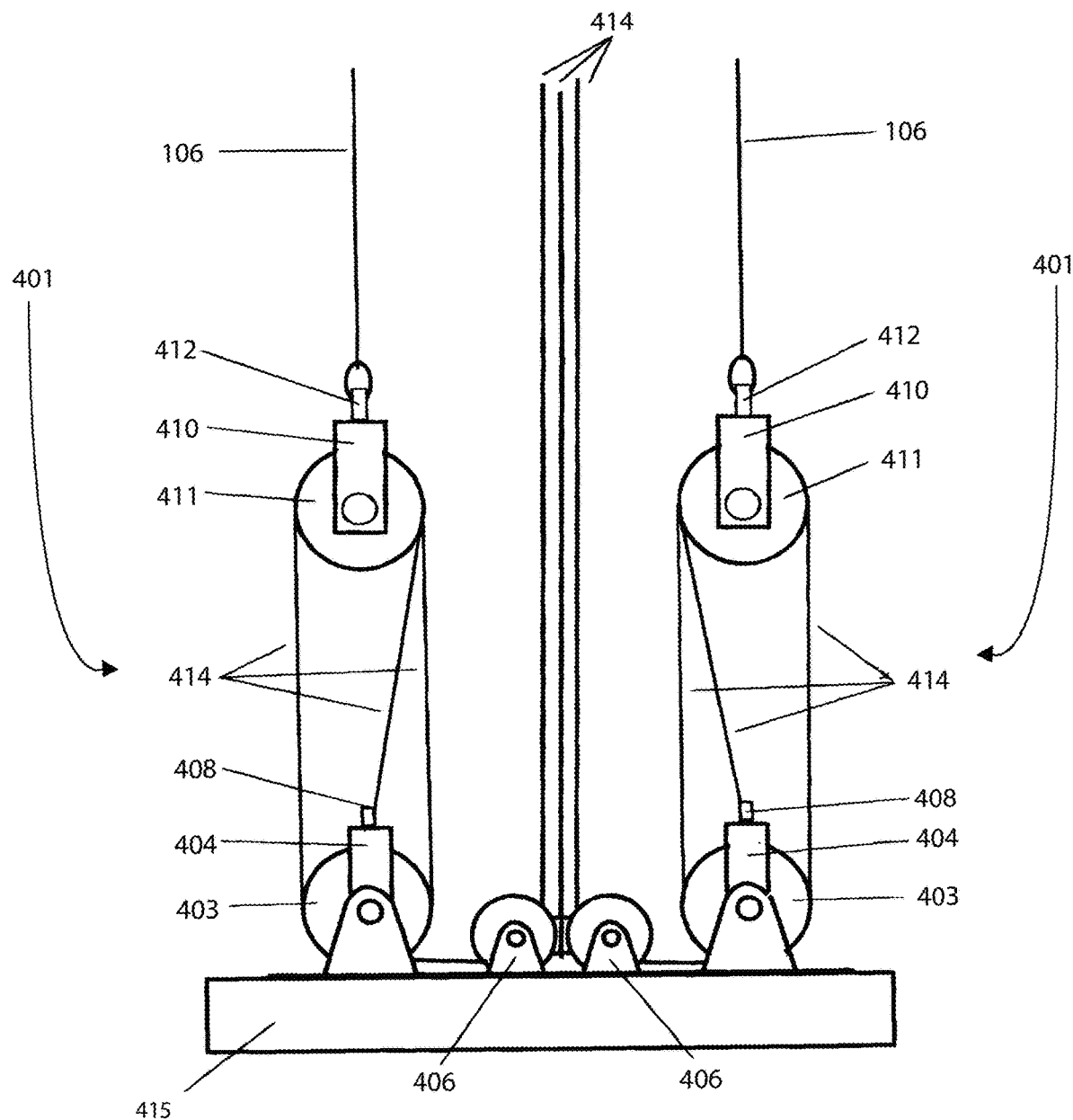
FIG. 4A is an elevation view illustrating one or more aspects of an example seabed structure with more than one seabed structure mounted subsea pulley assembly, according to an implementation.

Briefly, as seen in FIG. 1B, in an implementation, and illustrated in FIGS. 2A and 3A, cable 214 may be, in whole or in part, wrapped around and fixedly attached, via a cable drum clamp or similar connection at one end, to a cable drum 207, which may, for example be comprised within dual cable drum apparatus 209. Opposite end of cable 214 may, in whole or in part, after threading through one or more pulleys 220, which may, for example, be comprised within cable tensioning apparatus, referenced generally at 212, be fixedly attached to cable tensioning apparatus 212, via cable-clamp or similar connection.

Continuing with FIG. 1B, as illustrated, in an implementation, cable tensioning apparatus, generally referenced at 212 may, in whole or in part, be mounted and fixedly attached to surface flotation apparatus 201, via a welded steel or other style of structure 213. As described previously, and illustrated in FIG. 1B, and detailed in FIGS. 2A and 3A, during the first half of wave period, referenced generally at 19, rotation of dual cable drum apparatus, generally referenced at 209 may, in whole or in part, let out subsea interconnecting cable 104. Rotation of dual cable drum apparatus 209 may, in whole or in part, result in cable 214, (wound in an opposite direction as subsea interconnecting cable 104) around cable drum 207 to pull in. Briefly, and discussed in more detail in subsequence paragraphs, rotation of dual cable drum apparatus 209 may, in whole or in part, result in retraction of cable tensioning apparatus 212 during the first half of wave period. Rotation of dual cable drum apparatus 209 during second half of wave period, referenced generally at 20, may, in whole or in part, allow extension of cable tensioning apparatus 212.

As illustrated in FIG. 1B in an implementation, and described above, cable tensioning apparatus 212 may retract, in whole or in part, while surface flotation apparatus 201 transitions from wave trough 14 to wave crest 15 during first half of wave period, referenced at 19. Retraction of cable tensioning apparatus 212 may, in whole or in part, create stored potential energy within cable tensioning apparatus 212. Stored potential energy, within cable tensioning apparatus 212 may, in whole or in part, be released and/or harvested by a power conversion apparatus, while cable tensioning apparatus 212 extends during the second half of wave period, referenced at 20, while surface flotation apparatus 201 transitions from wave crest 15 into wave trough 18, according to an implementation.

Referring now to FIG. 1D, illustrated in an implementation, subsea interconnecting cable, referenced generally at 106 may, for example, be fixedly attached to seabed anchor 416, such as via respective connection points, referenced generally at 217. Here, any suitable connection points, such as pad-eye and shackle, attached to a choker anchor thimble style cable end connector, may be used, in whole or in part. Seabed anchor 416 may be suitably secured to seabed, ocean floor, lake bottom, or the like, referenced generally via an arrow at 10. As also seen, opposite ends of subsea interconnecting cable 106 may be fixedly attached to lower pulley assembly 409, which may comprise subsea pulley assembly, referenced generally at 401, via respective connection points 412. Here, any suitable connection points, such as pad-eye and shackle, attached to choker anchor thimble style cable end connector, may be used, in whole or in part. In operative use, lower pulley assembly 409 may be capable of maintaining a relatively vertical height and position in relation to seabed, ocean floor, lake bottom, or the like, referenced at 10. In turn, upper pulley assembly 402, comprised within subsea pulley assembly, referenced generally at 401 may, for example, be suitably secured to surface flotation apparatus 201. As also illustrated, during operation, upper pulley assembly 402, may travel a particular distance, referenced via 26, such as while surface flotation apparatus 201 travels a particular distance, referenced generally at 21, which may or may not be substantially similar to distance 26. As will be discussed in more detail in subsequence paragraphs, lengthening and shortening distance between upper pulley assembly 402 and lower pulley assembly 409 of subsea pulley assembly 401, referenced generally at 27 (lengthening) and 28 (shortening), may, in whole or in part, facilitate and/or support amplification of wave relative vertical travel and/or velocity, such as via one or more approaches discussed herein of wave height as an aspect of wave swell energy capture infrastructure.

Briefly as further seen in FIG. 1D, as illustrated, in an implementation, subsea interconnecting cable, referenced generally at 414 may, in whole or in part, terminate within a corresponding subsea pulley assembly, referenced generally at 401. As also seen in FIG. 1D and detailed in FIGS. 2C and 3C, opposite end of subsea interconnecting cable 414 may be fixedly attached, via cable drum clamp or similar connection, to cable drum 208 of dual cable drum apparatus, referenced generally at 209. As illustrated in FIG. 1D, subsea interconnecting cable 414 may, in whole or in part, result in rotation of dual cable drum apparatus 209 as surface flotation apparatus 201 travels from wave trough 14 to wave crest 15 and back to wave trough 18. As illustrated in FIG. 1D, upward travel of surface flotation apparatus 201 from a wave trough 14 to a wave crest 15, may, in whole or in part, result in rotation of dual cable drum apparatus 209, which may operatively result in subsea interconnecting cable 414 unwinding from cable drum 208.

Figure 2B:
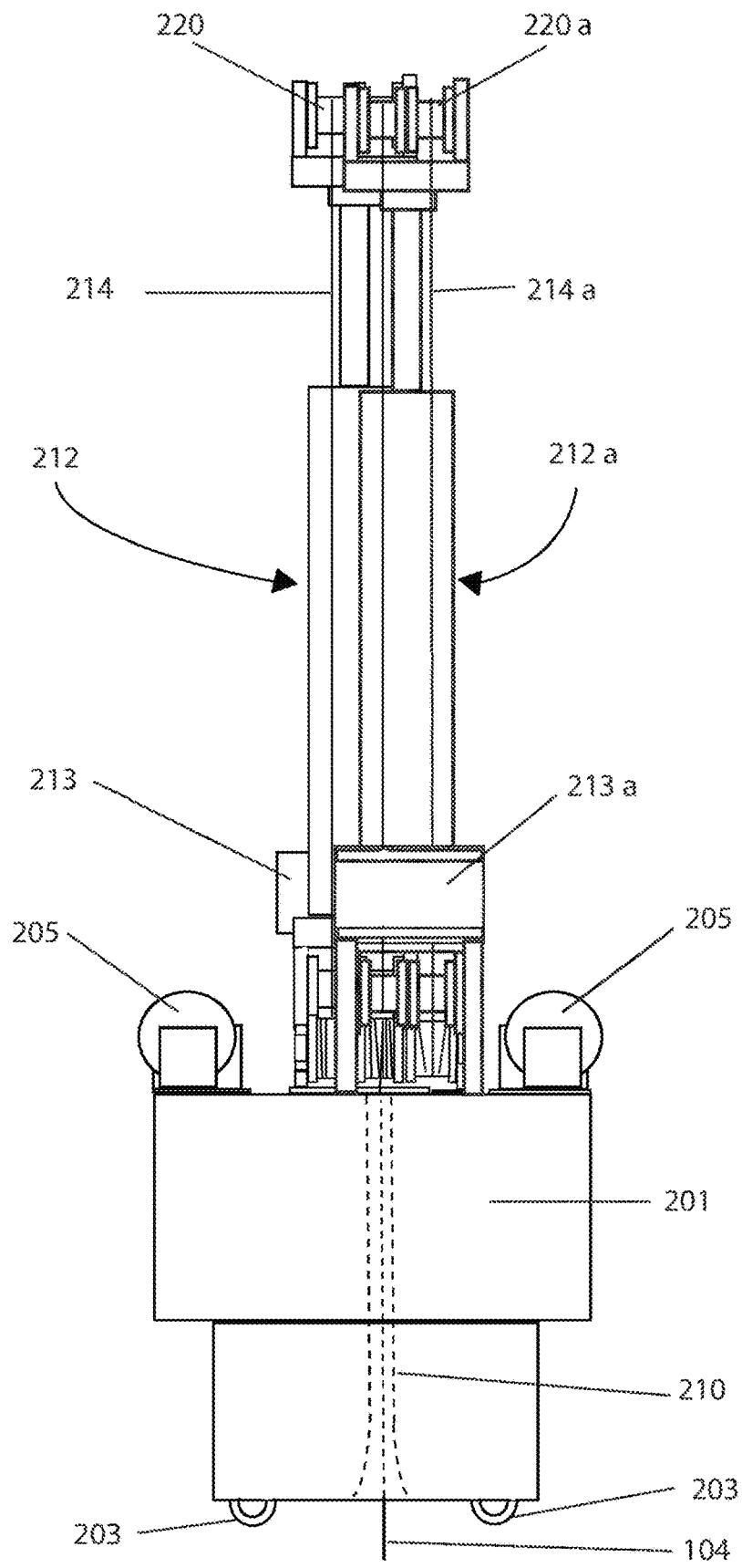
FIG. 2B is an elevation view of one or more aspects of surface flotation apparatus, which may comprise more than one surface flotation apparatus mounted cable tensioning apparatus, according to an implementation.
Figure 2C:
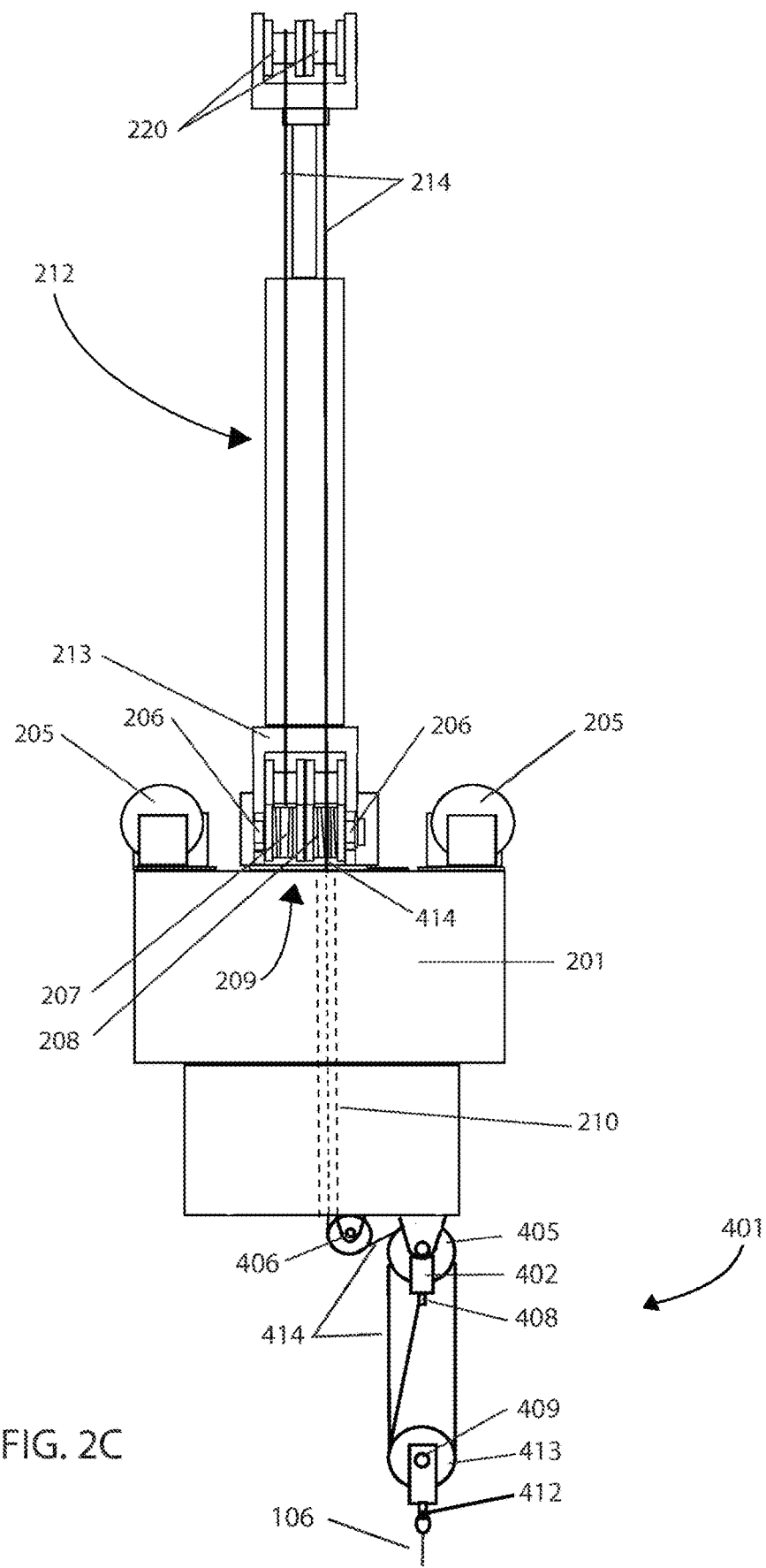
FIG. 2C is an elevation view illustrating one or more aspects of an example surface flotation apparatus mounted, subsea pulley assembly, according to an implementation.
Figure 3C:
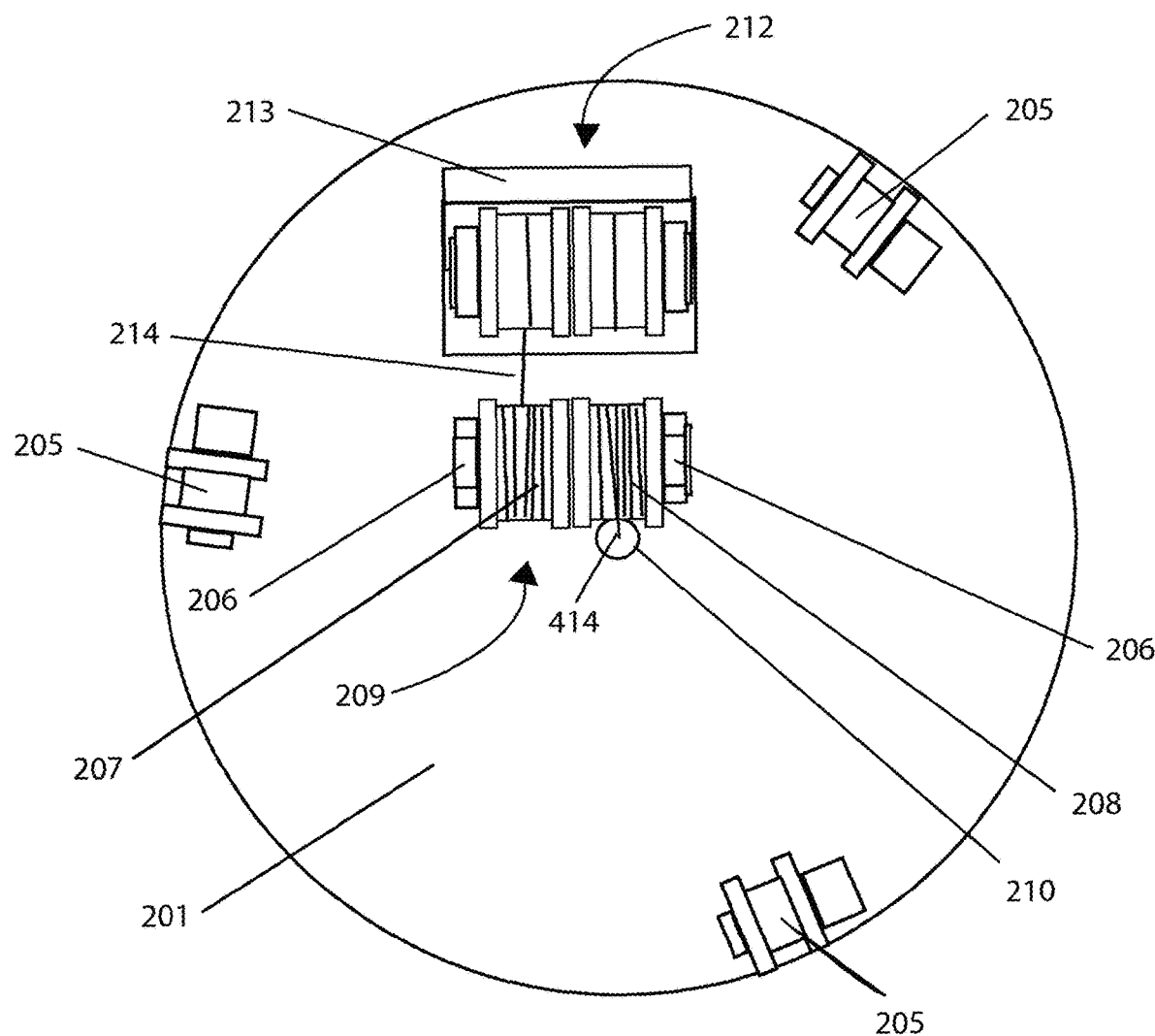

Briefly, as seen in FIG. 1D, in an implementation, and illustrated in FIGS. 2C and 3C, cable 214 may, in whole or in part, be wrapped around and fixedly attached at one end, via cable drum clamp or similar connection, to cable drum 207, which may be, for example, comprised within dual cable drum apparatus 209. Opposite end of cable 214 may, in whole or in part, be fixedly attached to cable tensioning apparatus 212, via a cable drum clamp or similar connection. Cable 214 may, in whole or in part thread through one or more pulleys, referenced generally at 220 that may, in whole or in part, be comprised within cable tensioning apparatus 212.

Continuing with FIG. 1D, as illustrated, in an implementation, cable tensioning apparatus 212 may, in whole or in part, be mounted and fixedly attached to surface flotation apparatus 201, via a welded steel or other similar style of structure referenced generally at 213. As described previously as illustrated FIG. 1D and detailed in FIGS. 2C and 3C, rotation of dual cable drum apparatus 209 may, in whole or in part, let out subsea interconnecting cable 414 during first half of wave period, referenced generally at 19. Rotation of dual cable drum apparatus 209, during first half of wave period, referenced generally at 19, may in whole or in part, cause cable 214, (wound around cable drum 207 in an opposite direction as subsea interconnecting cable 414 on cable drum 208), to pull in. Briefly, and discussed in more detail in subsequence paragraphs, pulling in cable 214 may, in whole or in part, result in retraction of cable tensioning apparatus 212. While rotation of dual cable drum apparatus 209 during second half of wave period, referenced generally at 20 may, in whole or in part, allow extension of cable tensioning apparatus 212.

As illustrated in FIG. 1D in an implementation, and described above, cable tensioning apparatus 212 may retract, in whole or in part, while surface-flotation apparatus 201 transitions from wave trough 14 to wave crest 15 during first half of wave period, referenced at 19. Retraction of cable tensioning apparatus 212 may, in whole or in part, create stored potential energy within cable tensioning apparatus 212. Stored potential energy, within cable tensioning apparatus 212 may, in whole or in part, be released and/or harvested by a power conversion apparatus, while cable tensioning apparatus 212 extends during the second half of wave period, referenced at 20, while surface flotation apparatus 201 transitions from wave crest 15 into wave trough 18, according to an implementation.

Referring now to FIG. 1G, an optional or alternative wave swell energy capture infrastructure embodiment, may be a non-amplified system. As illustrated in FIG. 1G, in an implementation, a subsea interconnecting cable, referenced generally at 106 which may be, for example, fixedly attached to seabed anchor 416, such as via respective connection points, referenced generally at 217. Here, any suitable connection points, such as pad-eye and shackle, attached to choker anchor thimble style cable end connector, may be used, in whole or in part. Seabed anchor 416 may be suitably secured to seabed, ocean floor, lake bottom, or the like, referenced generally via an arrow at 10. As also seen, opposite ends of subsea interconnecting cable 106 may be fixedly attached, via cable drum clamp or similar connection, to dual cable drum apparatus 209. As illustrated in FIG. 1G, subsea interconnecting cable 106 may, in whole or in part, result in rotation of dual cable drum apparatus 209, as surface flotation apparatus 201 travels from wave trough 14 to wave crest 15 and back to wave trough 18. Continuing with FIG. 1G, as illustrated, in an implementation, cable tensioning apparatus 212 may, in whole or in part, be mounted and fixedly attached to surface flotation apparatus 201, via a welded steel or other similar style of structure, referenced generally at 213. As described previously, and illustrated in FIG. 1G, and detailed in FIGS. 1M, 2D and 3B, during first half of wave period, referenced generally at 19, rotation of dual cable drum apparatus 209 may, in whole or in part, let out subsea interconnecting cable 106. Rotation of dual cable drum apparatus 209, during first half of wave period, referenced generally at 19, may in whole or in part, cause cable 214, (wound around cable drum 207 in an opposite direction as subsea interconnecting cable 414 on cable drum 208), to pull in. Briefly, and discussed in more detail in subsequence paragraphs, pulling in cable 214 may, in whole or in part, result in retraction of cable tensioning apparatus 212. While rotation of cable drum of dual cable drum apparatus 209 during second half of wave period, referenced generally at 20 may, in whole or in part, allow extension of cable tensioning apparatus 212.

As illustrated in FIG. 1G in an implementation, and described above, cable tensioning apparatus 212 may retract, in whole or in part, while surface flotation apparatus 201 transitions from wave trough 14 to wave crest 15 during first half of wave period, referenced at 19. Retraction of cable tensioning apparatus 212 may, in whole or in part, create stored potential energy within cable tensioning apparatus 212. Stored potential energy, within cable tensioning apparatus 212 may, in whole or in part, be released and/or harvested by a power conversion apparatus, while cable tensioning apparatus 212 extends during the second half of wave period, referenced at 20, while surface flotation apparatus 201 transitions from wave crest 15 into wave trough 18, according to an implementation.

FIG. 1H is an elevation view illustrating one or more aspects of an example wave swell energy capture infrastructure, which include one or more subsea pulley assemblies, referenced generally at 401 that may be, in whole or in part, physically mounted to seabed structure 415. Illustrated, for example, one or more subsea interconnecting cables, referenced generally at 106 may each be, in whole or in part, physically attached at one end to surface flotation apparatus 201 via respective connection points, referenced generally at 203. Here, any suitable connection points, such as pad-eye and shackle, attached to choker anchor thimble style cable end connector may be used, in whole or in part. The other end of each of one or more subsea interconnecting cables, referenced generally at 106 may be, in whole or in part attached to upper pulley assembly 410, via respective connection points, referenced generally at 412. Here, any suitable connection points, such as pad-eye and shackle, attached to choker anchor thimble style cable end connector may be used, in whole or in part. As illustrated in FIGS. 1H and 1n greater detail in FIG. 4A, each subsea pulley assembly, generally referred at 401 may, in whole or in part, include subsea interconnecting cable 414. Subsea interconnecting cable 414 may be, in whole or in part, physically attached at one end to lower pulley assembly 404, via respective connection points, referenced generally at 408. Here, any suitable connection points, such as pad-eye and shackle, attached to choker anchor thimble style cable end connector may be used, in whole or in part. Subsea interconnecting cable 414 may, in whole or in part, route through upper pulley assembly 410, pulley 411, and lower pulley assembly 404, pulley 403, in a "block and tackle" configuration (block and tackle may be defined as two or more pulleys assembled to form paired blocks, with a rope or cable threaded between them). As further seen in FIG. 1H, as illustrated, in an implementation, one or more subsea interconnecting cables, referenced generally at 414 may, for example, be fixedly attached together at one end to connection point referenced generally at 108. Here, any suitable connection points, such as steel ring and shackle, attached to a choker anchor thimble style cable end connector, may be used, in whole or in part. As previously discussed and illustrated in FIGS. 1H, 2A, 3A, subsea interconnecting cable 104 may, for example, be fixedly attached at one end to connection point referenced generally at 108, via any suitable connection such as a steel ring and shackle attached to a choker anchor thimble style cable end connector, while opposite end of subsea interconnecting cable 104 may wrap around and be fixedly attached, via a cable drum clamp or similar connection, to cable drum 208 that may, in whole or in part, be comprised within dual cable drum apparatus, referenced generally at 209. As illustrated schematically at 24 in FIG. 1B, subsea interconnecting cable 104 and connector 108, relative vertical travel, may be a greater relative vertical travel than that of surface flotation apparatus 201 (illustrated schematically at 21) due, in whole or in part, to subsea interconnecting cable 414 "block and tackle" configuration within subsea pulley assembly 401. Increased relative vertical travel of subsea interconnecting cable 414, connector 108, and subsea interconnecting cable 104 may be, at least or in part, a factor of the number of cable pulleys 411 and 403 comprised within subsea pulley assembly 401. The number of pulleys, 403 and 411 utilized within each of respective lower and upper pulley assemblies 404 and 410, may be in any combination thereof, and/or number or configuration such as suitable to achieve desired wave height amplification.

FIG. 1I is an elevation view illustrating one or more aspects of an example wave swell energy capture infrastructure, which include subsea pulley assembly, referenced generally at 401 that may be, in whole or in part, physically mounted to surface flotation apparatus 201. Illustrated, for example, subsea interconnecting cable referenced generally at 106 may be, in whole or in part, physically attached at one end to seabed anchor 416 via respective connection points, referenced generally at 217. Here, any suitable connection points, such as pad-eye and shackle, attached to choker anchor thimble style cable end connector may be used, in whole or in part. Other end of each of one or more subsea interconnecting cable, referenced generally at 106, may be, in whole or in part attached to a lower pulley assembly 409, via respective connection points, referenced generally at 412. Here, any suitable connection points, such as pad-eye and shackle, attached to choker anchor thimble style cable end connector may be used, in whole or in part. As illustrated in FIG. 1I and in greater detail in FIG. 4B, subsea pulley assembly, generally referred at 401 may, in whole or in part, include subsea interconnecting cable 414. Subsea interconnecting cable 414 may be, in whole or in part, physically attached at one end to upper pulley assembly 402, via respective connection points, referenced generally at 408. Here, any suitable connection points, such as pad-eye and shackle, attached to choker anchor thimble style cable end connector may be used, in whole or in part. Subsea interconnecting cable 414 may, in whole or in part, route through lower pulley assembly 409, pulley 413, and upper pulley assembly 402, pulley 405, in a block and tackle configuration. As further seen in FIG. 1I opposite end of subsea interconnecting cable, referenced generally at 414 may, as previously discussed and illustrated in FIGS. 1I, 2C, 3C, may wrap around and be fixedly attached, via a cable drum clamp or similar connection, to cable drum 208, which may be, for example, comprised within dual cable drum apparatus, referenced generally at 209. As illustrated schematically in FIG. 1D, subsea interconnecting cable 414 relative travel, may be a greater relative travel than that of surface flotation apparatus 201 (illustrated schematically at 21) due, in whole or in part, to subsea interconnecting cable 414 block and tackle configuration within subsea pulley assembly 401. Increased relative travel of subsea interconnecting cable 414, may be, at least or in part, a factor of the number of cable pulleys 413 and 405 included within subsea pulley assembly 401. The number of pulleys, 405 and 413 utilized within each of respective cable pulley assemblies 402 and 409, may be in any combination thereof, and/or number or configuration such as suitable to achieve desired wave height amplification.

FIG. 1K is an elevation view illustrating one or more aspects of an example wave swell energy capture infrastructure, which include one or more subsea pulley assemblies, referenced generally at 401 that may be, in whole or in part, physically mounted to seabed structure 415. Illustrated, for example, one or more subsea interconnecting cables, referenced generally at 106 may each be, in whole or in part, physically attached at one end to surface flotation apparatus 201 via respective connection points, referenced generally at 203. Here, any suitable connection points, such as pad-eye and shackle, attached to choker anchor thimble style cable end connector may be used, in whole or in part. Other end of each of one or more subsea interconnecting cables, referenced generally at 106 may be, in whole or in part attached to upper pulley assembly 410, via respective connection points, referenced generally at 412. Here, any suitable connection points, such as pad-eye and shackle, attached to choker anchor thimble style cable end connector may be used, in whole or in part. As illustrated in FIGS. 1K and 1n greater detail in FIG. 4A, each subsea pulley assembly, generally referred at 401 may, in whole or in part, include subsea interconnecting cable 414. Subsea interconnecting cable 414 may be, in whole or in part, physically attached at one end to lower pulley assembly 404, via respective connection points, referenced generally at 408. Here, any suitable connection points, such as pad-eye and shackle, attached to choker anchor thimble style cable end connector may be used, in whole or in part. Subsea interconnecting cable 414 may, in whole or in part, route through upper pulley assembly 410, pulley 411, and lower pulley assembly 404, pulley 403, in a block and tackle configuration. As further seen in FIG. 1K, as illustrated, in an implementation, one or more subsea interconnecting cables, referenced generally at 414 may, for example, be fixedly attached together at one end to connection point referenced generally at 108. Here, any suitable connection points, such as steel ring and shackle, attached to a choker anchor thimble style cable end connector, may be used, in whole or in part. As previously discussed and illustrated in FIGS. 1H, 2A, 3A, subsea interconnecting cable 104 may, for example, be fixedly attached at one end to connection point referenced generally at 108, via any suitable connection such as a steel ring and shackle attached to a choker anchor thimble style cable end connector may be used, in whole or in part. Subsea interconnecting cable 104, as shown in elevation view FIG. 1K, and as will be discussed in more detail in subsequence paragraphs, may be fixedly attached to subsea cable guide assembly, referred generally at 701, and hydro kinetic turbine apparatus, generally referred at 901, via any suitable connection point, such as pad-eye and shackle, attached to a choker anchor thimble style cable end connector, may be used, in whole or in part. Subsea interconnecting cable 104 may wrap around and be fixedly attached, via a cable drum clamp or similar connection, to cable drum 208 which may be, for example, comprised within dual cable drum apparatus, referenced generally at 209. As illustrated schematically at 24 in FIG. 1B, subsea interconnecting cable 104 and connector 108, illustrated in FIG. 1K as subsea cable guide assembly 701, and hydro kinetic type turbine apparatus 901, relative vertical travel, may be a greater relative vertical travel than that of surface flotation apparatus 201 (illustrated schematically at 21) due, in whole or in part, to subsea interconnecting cable 414 block and tackle configuration within subsea pulley assembly 401. Increased relative vertical travel of subsea interconnecting cable 414, subsea guide assembly 701 and hydro kinetic type turbine apparatus 901, and subsea interconnecting cable 104 may be, at least in part, a factor of the number of cable pulleys 411 and 403 included within subsea pulley assembly 401. The number of pulleys, 403 and 411 utilized within each of respective lower and upper pulley assemblies 404 and 410, may be in any combination thereof, and/or number or configuration such as suitable to achieve desired wave height amplification.

FIG. 1L is elevation view of one or more aspects of an example wave swell energy capture infrastructure that comprises an alternative anchor and surface flotation apparatus guide and alignment structure wherein a hydro kinetic turbine apparatus 901 is positioned substantially in alignment with and/or over subsea structure 415, via a substantially rigid structure 110, that may be, in whole or in part, secured to a bottom of a continuous body of water and/or subsea structure 415.

FIG. 1M is an elevation view illustrating one or more aspects of an example wave swell energy capture infrastructure having surface flotation apparatus mounted cable tensioning apparatus with seabed anchored, subsea interconnecting cable. Subsea interconnecting cable, referenced generally at 106 that may be, for example, fixedly attached to seabed anchor 416, such as via respective connection points, referenced generally at 217. Here, any suitable connection points, such as pad-eye and shackle, attached to choker anchor thimble style cable end connector may be used, in whole or in part. Seabed anchor 416 may be suitably secured to seabed, ocean floor, lake bottom, or the like, referenced generally via an arrow at 10. As also seen, the opposite ends of subsea interconnecting cable 106 may wrap around and be fixedly attached, via cable drum 208 clamp or similar connection to cable drum 208 that may be, for example, comprised within dual cable drum apparatus, referenced generally at 209.

FIG. 1N is an elevation view illustrating one or more aspects of an example wave swell energy capture infrastructure having surface flotation apparatus mounted hydraulic power assembly with seabed anchored, subsea interconnecting cable. Subsea interconnecting cable, referenced generally at 106 may be, for example, fixedly attached to seabed anchor 416, such as via respective connection points, referenced generally at 217. Here, any suitable connection points, such as pad-eye and shackle, attached to choker anchor thimble style cable end connector may be used, in whole or in part. Seabed anchor 416 may be suitably secured to seabed, ocean floor, lake bottom, or the like, referenced generally via an arrow at 10. As also seen, opposite ends of subsea interconnecting cable 106 may be fixedly attached, via cable clamp or similar connection surface flotation apparatus mounted hydraulic power conversion apparatus 112.

FIG. 1O is an elevation view illustrating one or more aspects of an example wave swell energy capture infrastructure having a surface flotation apparatus 201 which may, in whole or in part, be attached to, a guide/alignment structure which may, in whole or in part, comprise a bottom-located (seabed, ocean floor, take bottom etc.) mounted subsea structure 118. Surface flotation apparatus 201 may fully or partially surround subsea structure 118. Surface flotation apparatus 201 may vertically slide up and down subsea structure 118. Surface flotation apparatus 201 may, in whole or in part, utilize suitable bearings (slide, roller etc.) referenced at 121, between surface flotation apparatus 201 and subsea structure 118. FIG. 1O illustrates, as an example, a surface flotation apparatus 201, which may, in whole or in part, comprise at least one or more of the following: surface mounted dual cable drum apparatus 209, electric generator 803, cable tensioning apparatus 212, power conversion apparatus 801, and/or subsea pulley assembly 401.

Figure 1P:
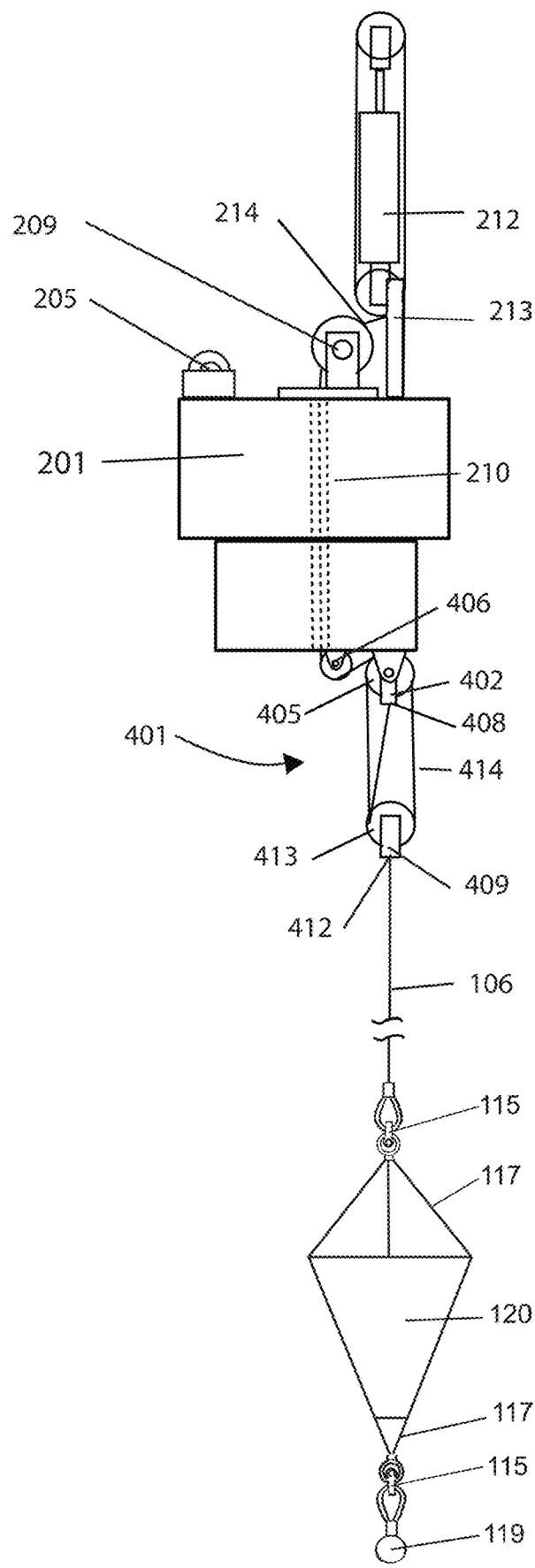
FIG. 1P is an elevation view illustrating one or aspects of an example wave swell energy capture infrastructure that may include a sea anchor, according to an implementation.

FIG. 1P is an elevation view of one or more aspects of an example wave swell energy capture infrastructure illustrating sea anchor 120 as an alternative to sea bed anchor 416 as shown in FIG. 1I. In this example, subsea interconnecting cable 106, may be fixedly attached, via cables 117 to sea anchor 120, such as via respective connection points, referenced generally at 115. As an example, any suitable connection points, such as pad-eye and shackle, attached to choker anchor thimble style cable end connector may be used, in whole or in part. A weight 119 may, at least in part, provide tension on subsea interconnecting cable 106 and sea anchor stability, in whole or in part, fixedly attached via cables 117, to sea anchor 120, such as via respective connection points 115. In some examples, various suitable connection points, such as pad-eye and shackle, attached to choker anchor thimble style cable end connector may be used, in whole or in part. In some examples, sea anchor 120 may, in whole or in part, be used as an alternative and/or supplement to sea bed anchor 416, as illustrated in FIGS. 1D, 1G, 1I, 1M, and 1N.

FIGS. 2A and 3A are elevation and plan views illustrating one or more aspects of an example surface flotation apparatus which may be utilized, in whole or in part, with seabed structure mounted subsea pulley assembly. Surface flotation apparatus 201 may, at least or in part, include cable conduit passage 210 that may be in any combination thereof, and/or number or configuration. Surface flotation apparatus 201 as illustrated, as example, in elevation and plan views may, in whole or in part, embody cable/chain anchor 205. Cable/chain anchor 205 may include, in whole or in part, anchor cable, cable storage drum, cable drum brake system, and cable drum drive apparatus. Cable/chain anchor 205, shown configured, as an example, on surface flotation apparatus 201 as three anchor assemblies, may be in any combination thereof, and/or number or configuration, at least or in part, such as suitable or desired, to maintain surface flotation apparatus 201 in position over seabed structure 415. Surface flotation apparatus 201 may, at least or in part, include dual cable drum apparatus 209. Dual cable drum apparatus 209 may, for example, comprise one or more cable drums 207 and 208, in any combination thereof, and/or number or configuration. Cable drum 207 may be, as described previously, physically attached, via bolting, or via keyway and key or by being, in whole or in part, splined to common shaft etc. to cable drum 208. Cable drum 207, may, in whole or in part, be mounted separately and attached to cable drum 208 though a speed reduction device such as gearbox that may comprise more than one set of gears, and/or by sprocket and chain, or belt and pulleys etc., allowing cable drum 207 to rotate, in whole or in part, at a slower or faster rpm that cable drum 208, optimizing range and operation of cable tensioning apparatus 212, according to an implementation. Dual cable drum apparatus 209 may, for example, comprise one or more support bearings 206, in any combination thereof, and/or number or configuration. Dual cable drum apparatus 209 may, and or in part, as described previously, convert a substantially linear travel of subsea interconnecting cable 104, into rotary motion and rotary torque while surface flotation apparatus 201 transitions from wave trough 14 to wave crest 15. Surface flotation apparatus 201 may, at least or in part, include cable tensioning apparatus 212 and support steel structure 213. As described previously, while surface flotation apparatus 201 transitions from wave trough 14 to wave crest 15 during first half of wave period, referenced at 19, cable tensioning apparatus 212 may, in whole or in part, retract and create stored potential energy within cable tensioning apparatus 212. Dual cable drum apparatus 209, may convert linear travel of cable 214, as cable tensioning apparatus 212 extends, into rotary motion and rotary torque while surface flotation apparatus 201 transitions from wave crest 15 to wave trough 18 during the second half of wave period, referenced at 20. Dual cable drum apparatus 209 rotational motion and/or torque may be utilized to create suitable output energy. In some instances, illustrated as respective examples, other implementation configurations may, in whole or in part, incorporate subsea power conversion apparatus and/or surface flotation apparatus mounted power conversion apparatus, such as if suitable or desired. Cable tensioning apparatus 212, tensioning component may be, at least or in part, pressurized and/or under compression. Cable tensioning apparatus 212 pressurization may, in whole or in part, maintain tension on subsea interconnecting cables 106, 104, 414, and subsea pulley assembly 401, shown in FIG. 1B.

Figure 3D:
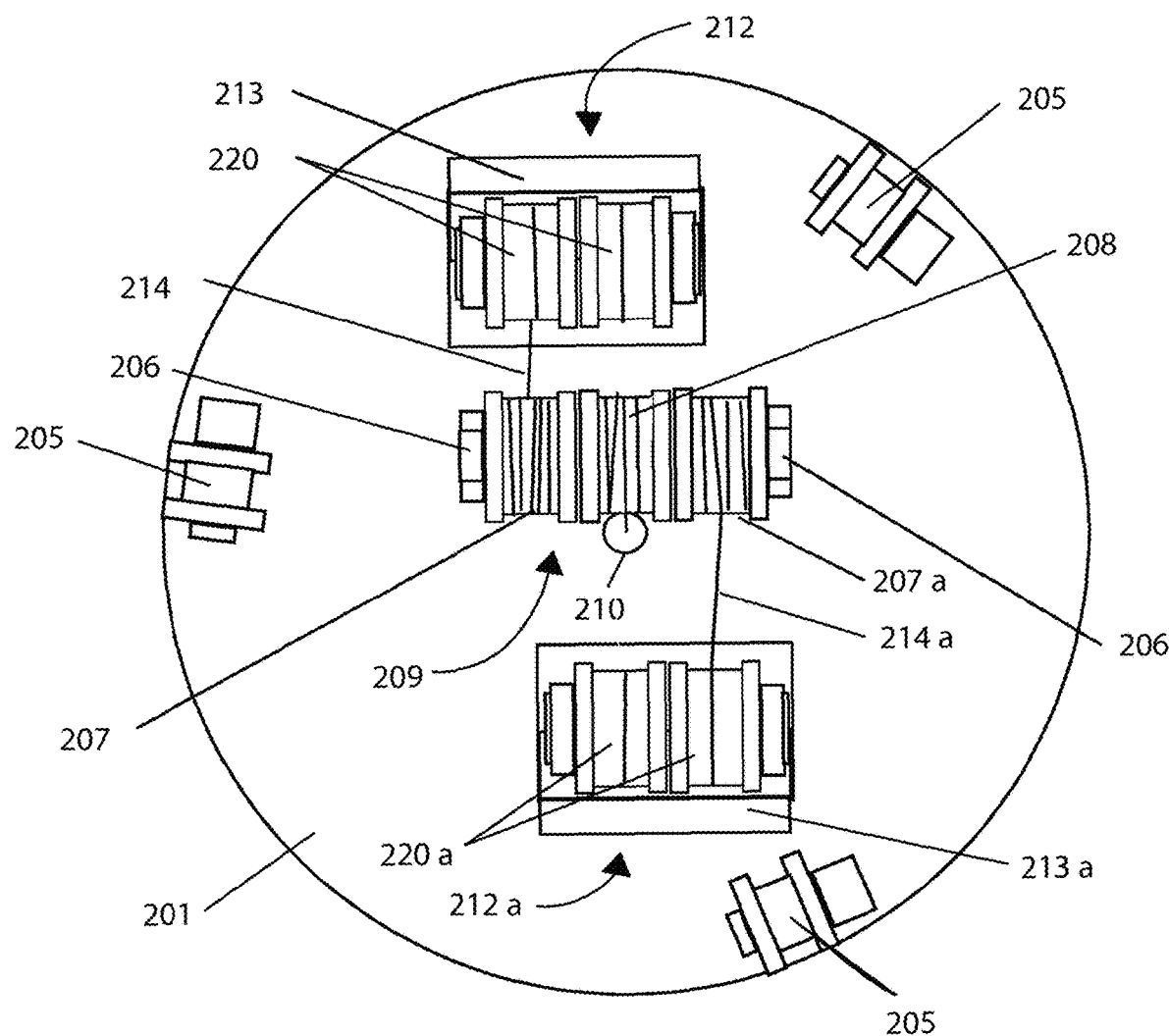
FIG. 3D is a plan view illustrating one or more aspects of an example surface flotation apparatus having more than one surface flotation apparatus mounted cable tensioning apparatus, according to an implementation.

FIGS. 2B and 3D are elevation and plan views illustrating one or more aspects of an example surface flotation apparatus which may be utilized, illustrating two cable tensioning apparatus. Cable tensioning apparatus 212, and 212*a* may, for example, comprise any combination or number of pulleys 220 and 220*a* or be in any combination or configuration thereof, and/or number such as suitable to achieve desired energy capture and cable tension per an implementation. Cable tensioning apparatus 212 may be mounted in any orientation, and be located, as illustrated, mounted on top of surface flotation apparatus 201, or alternatively mounted within and/or below surface flotation apparatus 201 such as suitable for structural design and stability requirements of surface flotation apparatus 201. Cable tensioning apparatus 212 and 212*a* may, for example, comprise, in whole or in part, a gas over hydraulic type apparatus (a similar example may be a gas over hydraulic riser or guide line tensioner as used in oil and gas industries). Yet another implementation cable tensioning apparatus 212 and 212*a* may, in whole or in part, comprise, a mechanical/hydraulic, or hydraulic/spring, or mechanical/spring etc., type tensioner.

FIGS. 2C and 3C are elevation and plan views illustrating one or more aspects of an example surface flotation apparatus that may, in whole or in part, comprise one or more subsea pulley assembly, referenced generally at 401 that may be, in whole or in part, physically mounted to surface flotation apparatus 201. Surface flotation apparatus 201 may, at least or in part, include cable conduit passage 210 that may be in any combination thereof, and/or number or configuration. Surface flotation apparatus 201 as illustrated, as an example, in elevation and plan views may, in whole or in part, embody cable/chain anchor 205. Cable/chain anchor 205 may include, in whole or in part, anchor cable, cable storage drum, cable drum brake system, and cable drum drive apparatus. Cable/chain anchor 205, shown configured, as an example, on surface flotation apparatus 201 as three anchor assemblies, may be in any combination thereof, and/or number or configuration, at least or in part, such as suitable or desired, to maintain surface flotation apparatus 201 in position over seabed anchor 416. Surface flotation apparatus 201 may, at least or in part, include dual cable drum apparatus 209. Dual cable drum apparatus 209 may comprise one or more cable drums 207 and 208, in any combination thereof, and/or number or configuration. Cable drum 207 may, as described, be physically attached, via bolting, or via keyway and key or by being, in whole or in part, splined to common shaft etc. to cable drum 208. Cable drum 207 may, in whole or in part, be mounted separately and attached to cable drum 208 though speed reduction device such as gearbox that may comprise more than one set of gears, and/or attached by sprocket and chain, or belt and pulleys etc., that may comprise more than one ratio combination, allowing cable drum 207 to rotate, in whole or in part, at a slower or faster rpm that cable drum 208, optimizing range and operation of cable tensioning apparatus 212, according to an implementation. Dual cable drum apparatus 209 may comprise one or more support bearings 206, in any combination thereof, and/or number or configuration. Dual cable drum apparatus 209 may, or in part, as described previously, convert a substantially linear travel of subsea interconnecting cable 414, into rotary motion and rotary torque while surface flotation apparatus 201 transitions from wave trough 14 to wave crest 15. Surface flotation apparatus 201 may, at least or in part, include cable tensioning apparatus 212 and support steel structure 213. As described previously, while surface flotation apparatus 201 transitions from wave trough 14 to wave crest 15 during first half of wave period, referenced at 19, cable tensioning apparatus 212 may, in whole or in part, retract and create stored potential energy within cable tensioning apparatus 212. Dual cable drum apparatus 209 may convert linear travel of cable 214 into rotary motion and rotary torque as cable tensioning apparatus 212 extends as surface flotation apparatus 201 transitions from wave crest 15 to wave trough 18 during the second half of wave period, referenced at 20. Dual cable drum apparatus 209 rotational motion and/or torque may be utilized to create suitable output energy as illustrated in respective examples of surface flotation apparatus mounted power conversion apparatus detailed within this disclosure, such as if suitable or desired. Cable tensioning apparatus 212, tensioning component may be, at least or in part, pressurized and/or under compression. Cable tensioning apparatus 212 pressurization may, in whole or in part, maintain tension on subsea interconnecting cables 414, and 106.

Figure 2D:
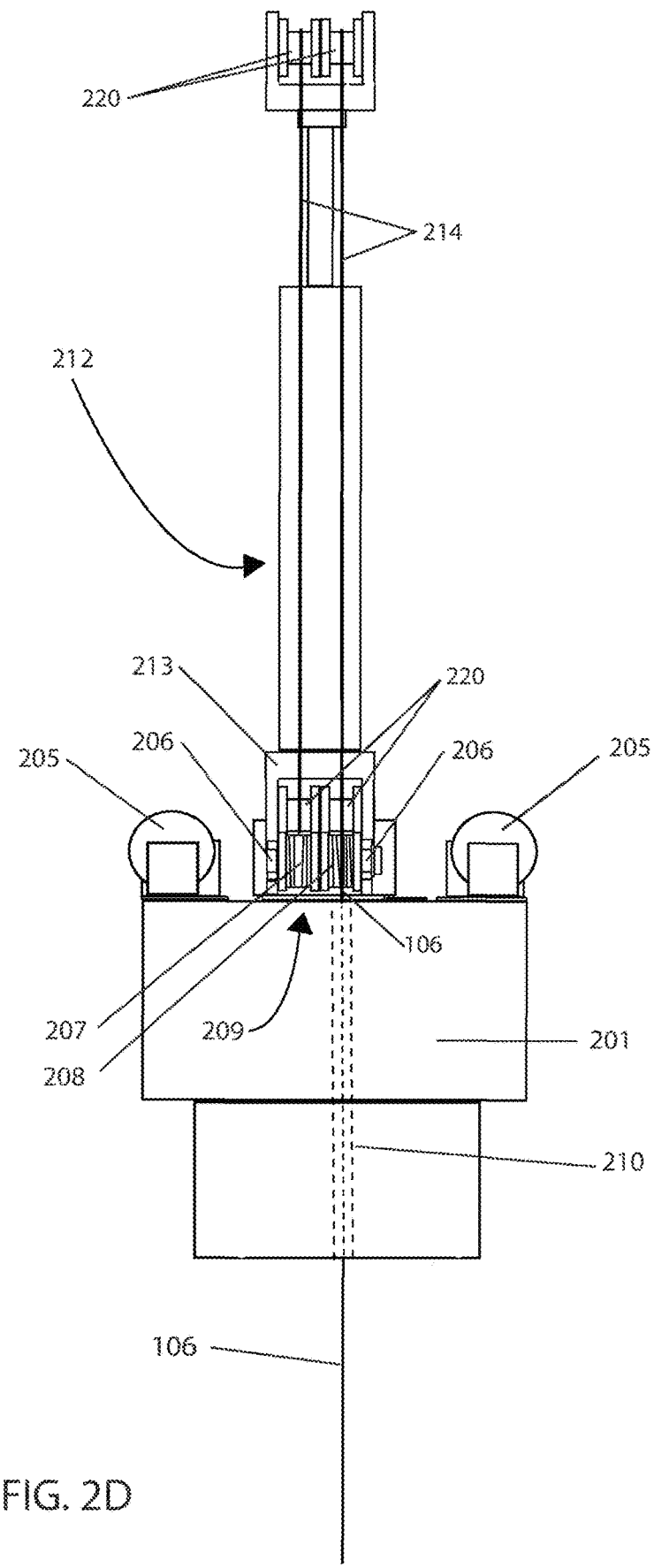
FIG. 2D is an elevation view illustrating one or more aspects of an example surface flotation apparatus, which may utilize seabed anchored, subsea interconnecting cable, according to an implementation.

FIG. 2D is an elevation and plan views illustrating one or more aspects of an example surface flotation apparatus, which may utilize, in whole or in part, seabed anchored, single subsea interconnecting cable 106, and may, at least or in part, include cable conduit passage 210, which may be in any combination thereof, and/or number or configuration. Surface flotation apparatus may include cable/chain anchor 205. Cable/chain anchor 205 may include, in whole or in part, anchor cable, cable storage drum, cable drum brake system, and cable drum drive apparatus. Cable/chain anchor 205, shown configured, as an example, on surface flotation apparatus 201 as three anchor assemblies, may be in any combination thereof, and/or number or configuration, at least or in part, such as suitable or desired, to maintain surface flotation apparatus 201 in position over seabed anchor 416. Surface flotation apparatus 201 may, at least or in part, include dual cable drum apparatus 209. Dual cable drum apparatus 209 may, comprise one or more cable drums 207 and 208, in any combination thereof, and/or number or configuration. Cable drum 207 may, as described, be physically attached, via bolting, or via keyway and key or by being, in whole or in part, splined to common shaft etc. to cable drum 208. Cable drum 207 may, in whole or in part, be mounted separately and attached to cable drum 208 though speed reduction device such as gearbox that may comprise more than one set of gears, and/or by sprocket and chain, or belt and pulleys etc., that may comprise more than one ratio combination, allowing cable drum 207 to rotate, in whole or in part, at a slower or faster rpm that cable drum 208, optimizing range and operation of cable tensioning apparatus 212, according to an implementation. Dual cable drum apparatus 209 may comprise one or more support bearings 206, in any combination thereof, and/or number or configuration. Dual cable drum apparatus 209 may, or in part, as described previously, convert a substantially linear travel of subsea interconnecting cable 106, into rotary motion and rotary torque while surface flotation apparatus 201 transitions from wave trough 14 to wave crest 15.

Surface flotation apparatus 201 may, at least or in part, include cable tensioning apparatus 212 and support steel structure 213. As described previously, while surface flotation apparatus 201 transitions from wave trough 14 to wave crest 15 during first half of wave period, referenced at 19, cable tensioning apparatus 212 may, in whole or in part, retract and create stored potential energy within cable tensioning apparatus 212. Dual cable drum apparatus 209, may convert linear travel of cable 214, as cable tensioning apparatus 212 extends, into rotary motion and rotary torque while surface flotation apparatus 201 transitions from wave crest 15 to wave trough 18 during second half of wave period, referenced at 20. Dual cable drum apparatus 209 rotational motion and/or torque may be utilized to create suitable output energy. In some instances, illustrated as respective examples, implementation configurations may, in whole or in part, incorporate surface flotation apparatus mounted power conversion apparatus, such as if suitable or desired. Cable tensioning apparatus 212, tensioning component may be, at least or in part, pressurized and/or under compression. Cable tensioning apparatus 212 pressurization may, in whole or in part, maintain tension on subsea interconnecting cable 106. Cable tensioning apparatus 212 may retract, in whole or in part, while surface flotation apparatus 201 transitions from wave trough 14 to wave crest 15 during first half of wave period, referenced at 19. Retraction of cable tensioning apparatus 212 may, in whole or in part, create stored potential energy within cable tensioning apparatus 212. Stored potential energy, within cable tensioning apparatus 212 may, in whole or in part, be released and/or harvested by a power conversion apparatus, while cable tensioning apparatus 212 extends during the second half of wave period, referenced at 20, while surface flotation apparatus 201 transitions from wave crest 15 into wave trough 18.

Figure 5:
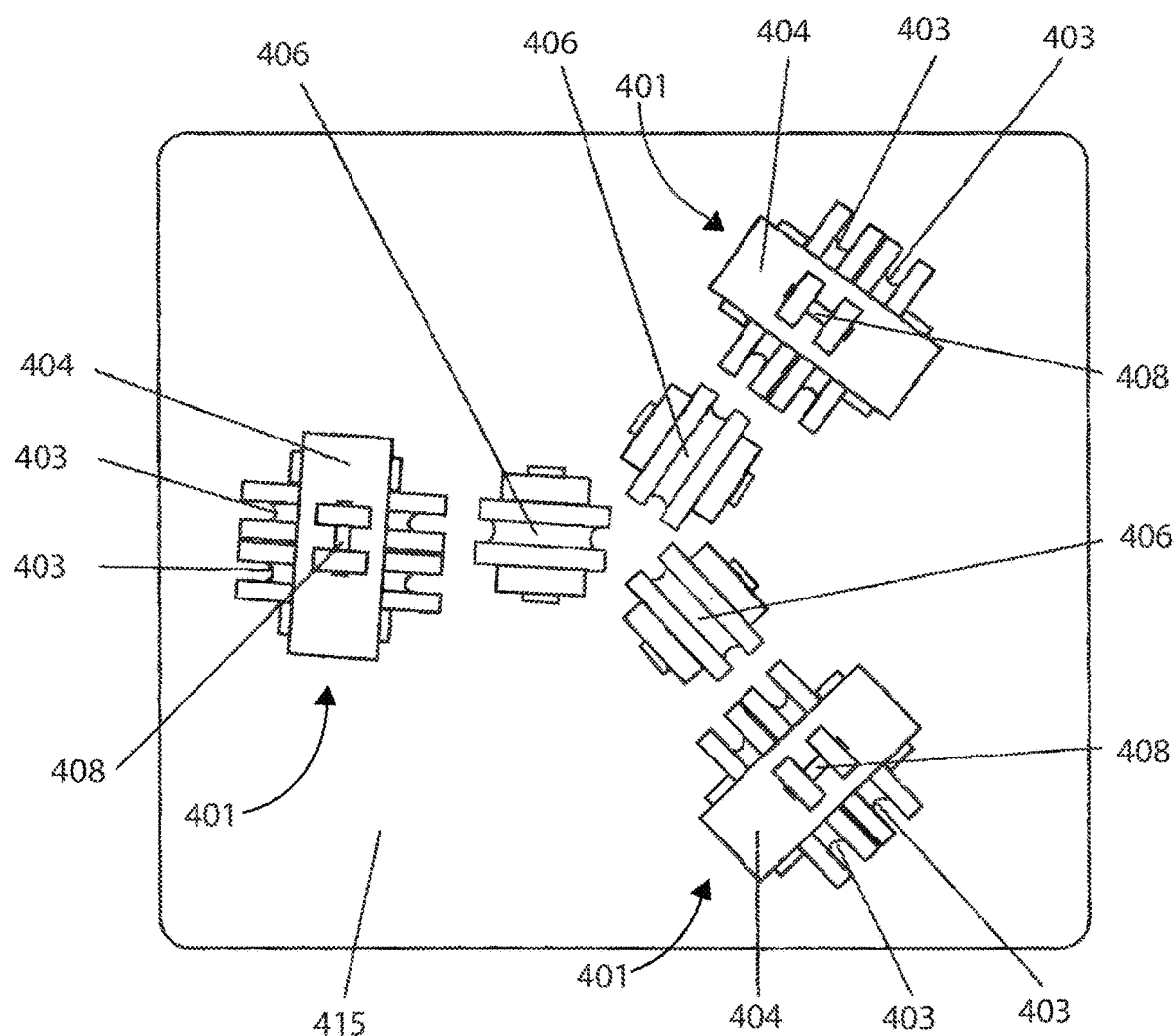
FIG. 5 is a plan view illustrating one or more aspects of an example, seabed structure with more than one seabed structure mounted subsea pulley assembly, according to an implementation.

FIGS. 4A and 5 are elevation and plan views illustrating one or more aspects of an example seabed structure 415 with more than one seabed structure mounted subsea pulley assembly. Subsea pulley assembly, referenced generally at 401 may be mounted to seabed structure 415 via weldment or hardware (nuts, bolts, studs, washers etc.). Illustrated for example in FIG. 5, three subsea pulley assembly 401, are shown mounted to seabed structure 415. Subsea pulley assembly 401, may be in any combination thereof, and/or number or configuration. Subsea pulley assembly 401 may, in whole or in part, comprise upper pulley assembly 410, and lower pulley assembly 404. Upper pulley assembly 410 may include pulley 411. Number of pulley 411 comprised within upper pulley assembly 410 may be in any combination thereof, and/or number or configuration. Lower pulley assembly 404 may include pulley 403. Number of pulleys 403 comprised within lower pulley assembly 404 may be in any combination thereof, and/or number or configuration. Seabed structure 415 may, in whole or in part, include cable guide pulley 406. Cable guide pulley 406 may be, in whole or in part, attached to seabed structure 415 via weldment or hardware (nuts, bolts, studs, washers etc.). Upper pulley assembly 410 may, in whole or in part, include a welded pad-eye or other suitable fixture to attach subsea cables, referenced at 412. Lower pulley assembly 404 may, in whole or in part, include a welded pad-eye or other suitable fixture to attach subsea cables, referenced at 408. Subsea pulley assembly 401 may, in whole or in part, include subsea interconnecting cable 414, which may route through upper pulley assembly 410, lower pulley assembly 404, and cable guide pulley 406.

Figure 4B:
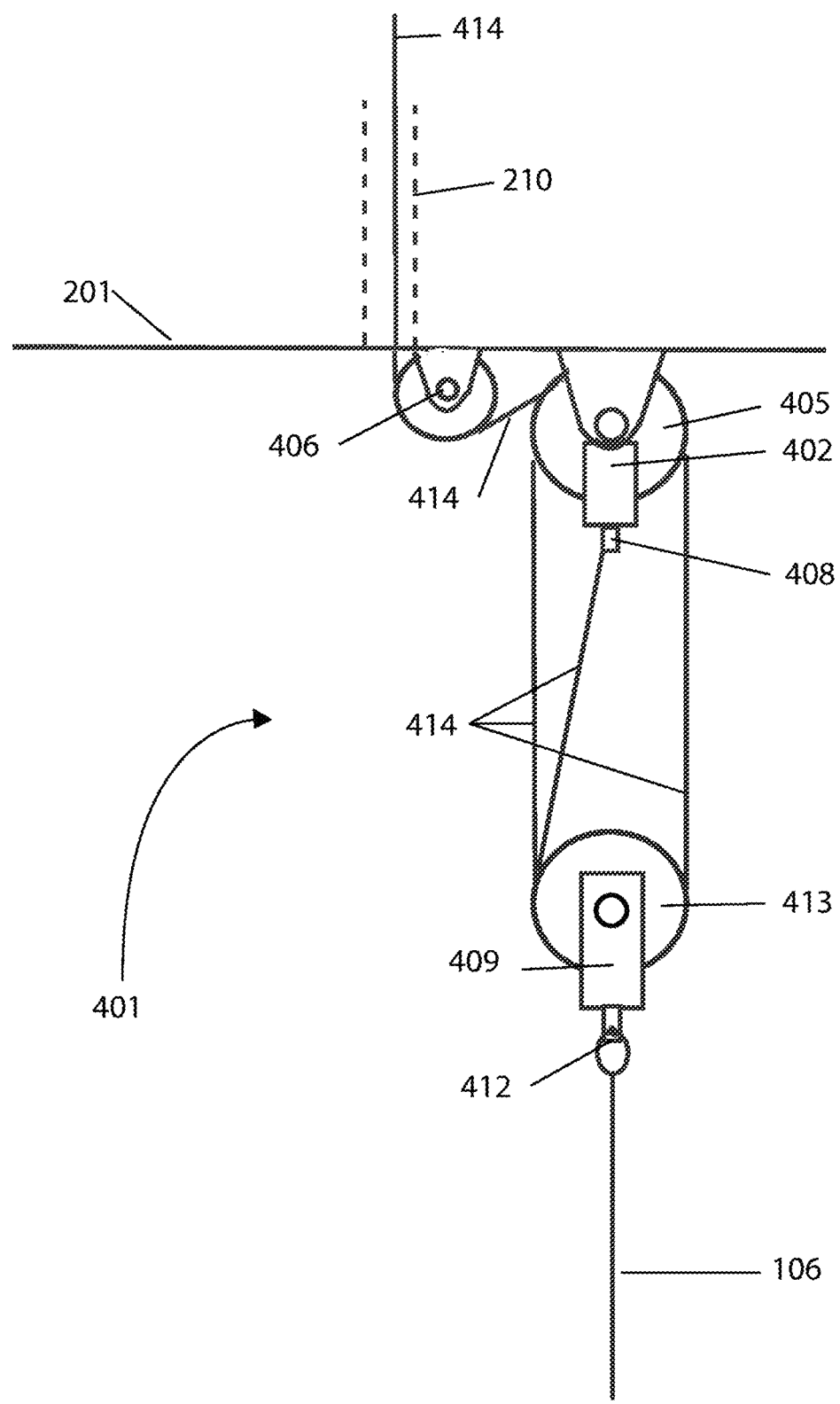
FIG. 4B is an elevation view illustrating one or more aspects of an example surface flotation apparatus mounted subsea pulley assembly, according to an implementation.
Figure 6:
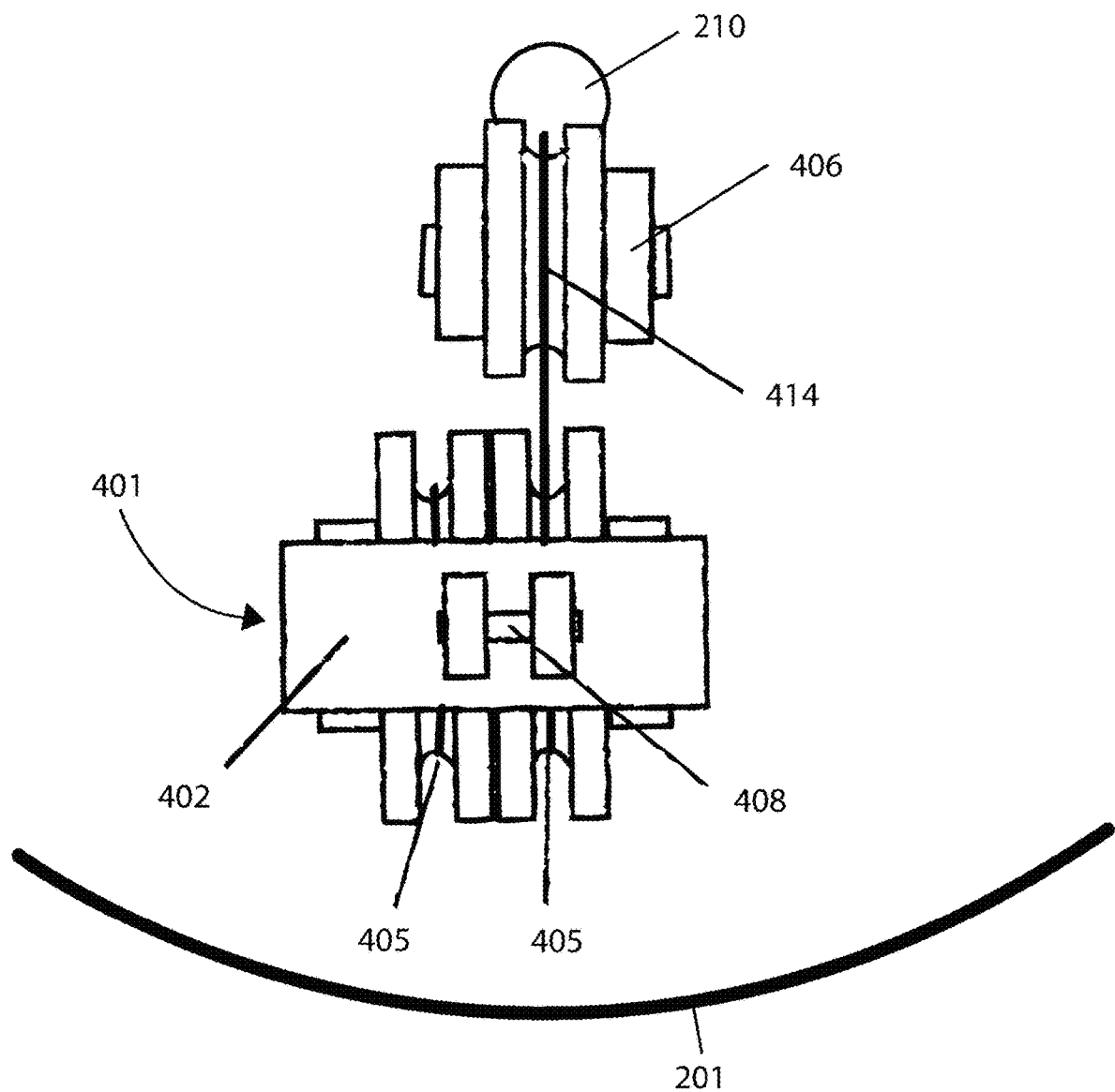
FIG. 6 is a plan view, illustrating one or more aspects of an example surface flotation apparatus mounted subsea pulley assembly, according to an implementation.

FIGS. 4B and 6 are elevation and plan views illustrating one or more aspects of an example surface flotation apparatus 201 mounted subsea pulley assembly. One or more subsea pulley assembly, referenced generally at 401 may be mounted to surface flotation apparatus 201 via weldment or hardware (nuts, bolts, studs, washers etc.). Subsea pulley assembly 401 may, in whole or in part, comprise upper pulley assembly 402, and lower pulley assembly 409. Lower pulley assembly 409 may include pulley 413. Number of pulley 413 comprised within lower pulley assembly 409 may be in any combination thereof, and/or number or configuration. Upper pulley assembly 402 may include pulley 405. Number of pulley 405 comprised within upper cable pulley assembly 402 may be in any combination thereof, and/or number or configuration. Surface flotation apparatus 201 may, in whole or in part, include one or more cable guide pulley 406. Cable guide pulley 406 may be, in whole or in part attached to surface flotation apparatus 201 via weldment or hardware (nuts, bolts, studs, washers etc.). Lower pulley assembly 409 may, in whole or in part, include a welded pad-eye or other suitable fixture to attach subsea cables, referenced at 412. Upper pulley assembly 402 may, in whole or in part, include a welded pad-eye or other suitable fixture to attach subsea cables, referenced at 408. Subsea pulley assembly 401 may, in whole or in part, include subsea interconnecting cable 414, which may route through lower pulley assembly 409, upper pulley assembly 402, and cable guide pulley 406.

Figure 7:
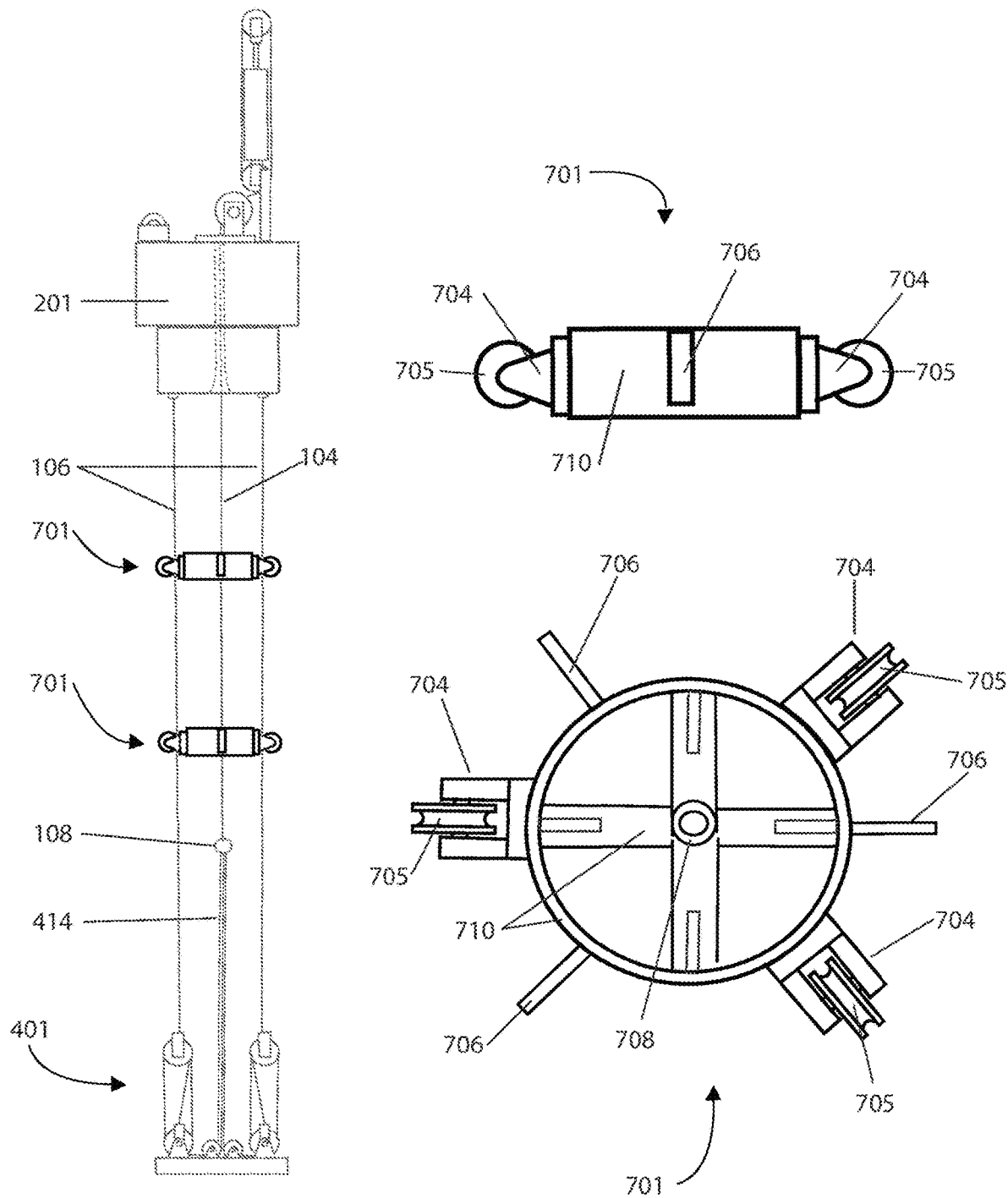
FIG. 7 is a schematic diagram illustrating one or more aspects of an example subsea cable guide assembly, according to an implementation.

FIG. 7 are elevation and plan view schematics illustrating one or more aspects of an example of subsea cable guide assembly, referenced generally at 701. Subsea cable guide assembly 701 may, in whole or in part, be embodied in a particular implementation of wave swell energy capture infrastructure. Subsea cable guide assembly 701, may include, in whole or in part, cable guide 704 and cable guide roller 705, structural frame 710, cable connector 708, and stabilizer fin 706. Subsea cable guide assembly 701 embodiments, mentioned above, may be absent or in any combination thereof, and/or number or configuration.

Briefly, FIGS. 8A-8I are schematics, illustrating views showing one or more aspects of examples of power conversion apparatus, such as discussed herein that may, in whole or in part, be embodied in a particular implementation of wave swell energy capture infrastructure. Embodiments in FIGS. 8A-8I which may be included, in whole or in part, in any combination or be absent in a particular implementation of a wave swell energy capture infrastructure within, are discussed in more detail below.

FIGS. 8A-8H illustrate, in whole or in part, power conversion apparatus, referenced generally at 801, that may, in whole or in part, be mechanically attached or otherwise coupled to dual cable drum apparatus, referenced generally at 209.

FIGS. 8A-8H are views illustrating one or more aspects of respective examples of a power conversion apparatus 801 may, in whole or in part, include disconnect apparatus 808. Disconnect apparatus 808 may be utilized, in whole or in part, to disconnect power conversion apparatus 801, from dual cable drum apparatus 209. Disconnect apparatus 808 may be, in whole or in part, operated automatically and/or manually. Disconnect apparatus 808 may be mechanical, electrical, and/or hydraulic, friction clutch, and/or fluid converter clutch type disconnect etc., in any configuration and/or combination thereof. Disconnect apparatus 808 may be, in whole or in part, operated by an equipment safeguard, and/or other type control system. Disconnect apparatus 808 may be, in whole or in part, operated locally or remotely.

Disconnect apparatus 808, may be in any combination thereof, and/or number or configuration.

Figure 8A:
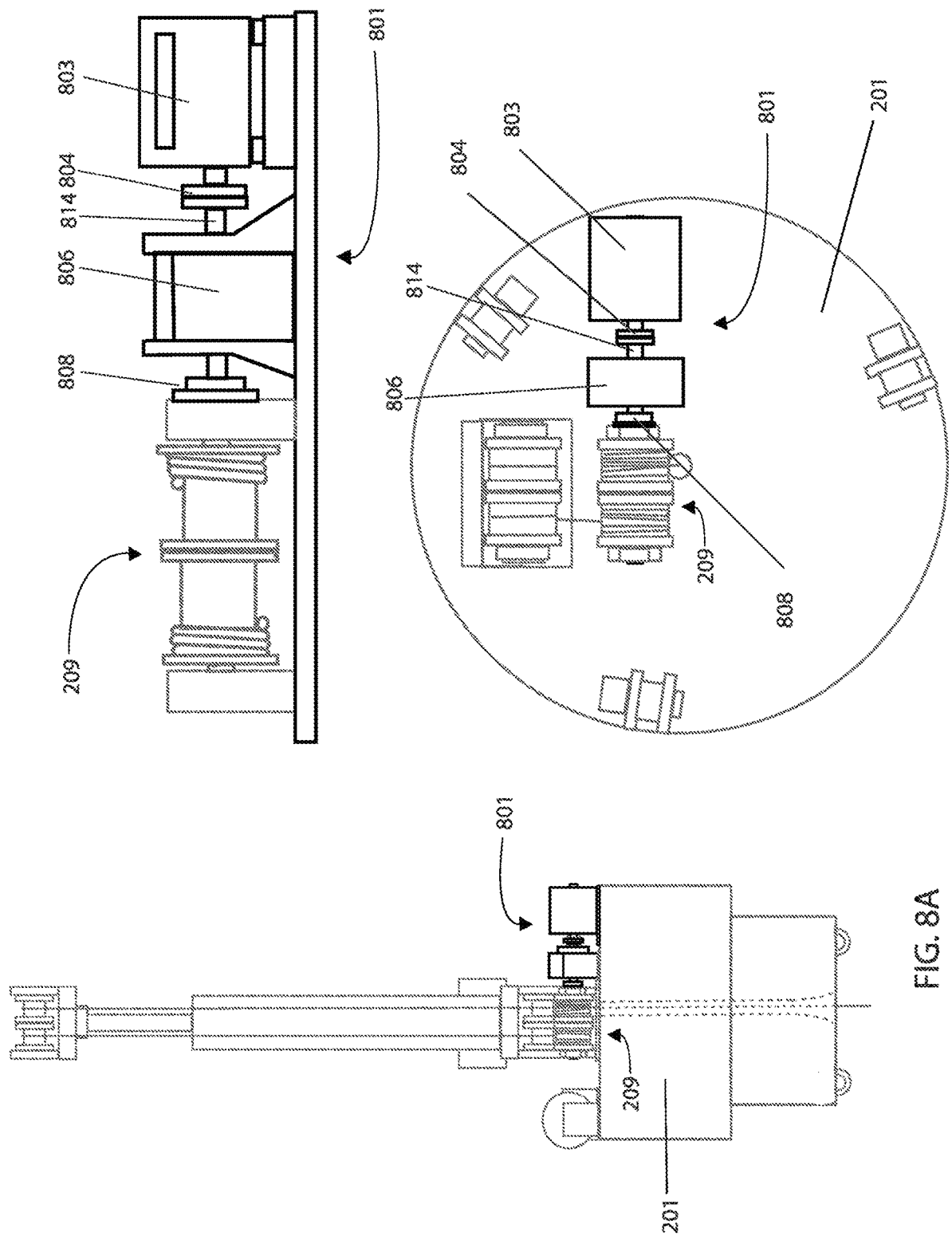
FIG. 8A is a schematic diagram illustrating one or more aspects of an example surface flotation apparatus mounted gear driven generator apparatus, which may utilize more than one seabed structure mounted subsea pulley assembly, according to an implementation.

FIG. 8A illustrates one or more aspects of an example surface flotation apparatus mounted power conversion apparatus 801, which may utilize seabed structure mounted subsea pulley assembly 401. Power conversion apparatus 801 may be in any combination thereof, and/or number or configuration, and may, in whole or in part, be mechanically attached or otherwise coupled to and driven by dual cable drum apparatus 209, via disconnect apparatus 808. An example of a power conversion apparatus 801 may, in whole or in part, comprise gear box 806, drive shaft 814, flexible coupling 804, and electric generator 803, per an implementation. Gear box 806 may, in whole or in part comprise one or more set of gear ratio combinations, which may, in whole or in part, allow changes to gearbox 806 output rotational speed and torque to electrical generator 803, based upon forecasted and/or seasonal sea conditions in order to increase generator efficiency and output, per an implementation. Changes in gearbox 803 output rotational speed and torque may, in whole or in part, be done manually or via remote operation, per an particular implementation.

Figure 8B:
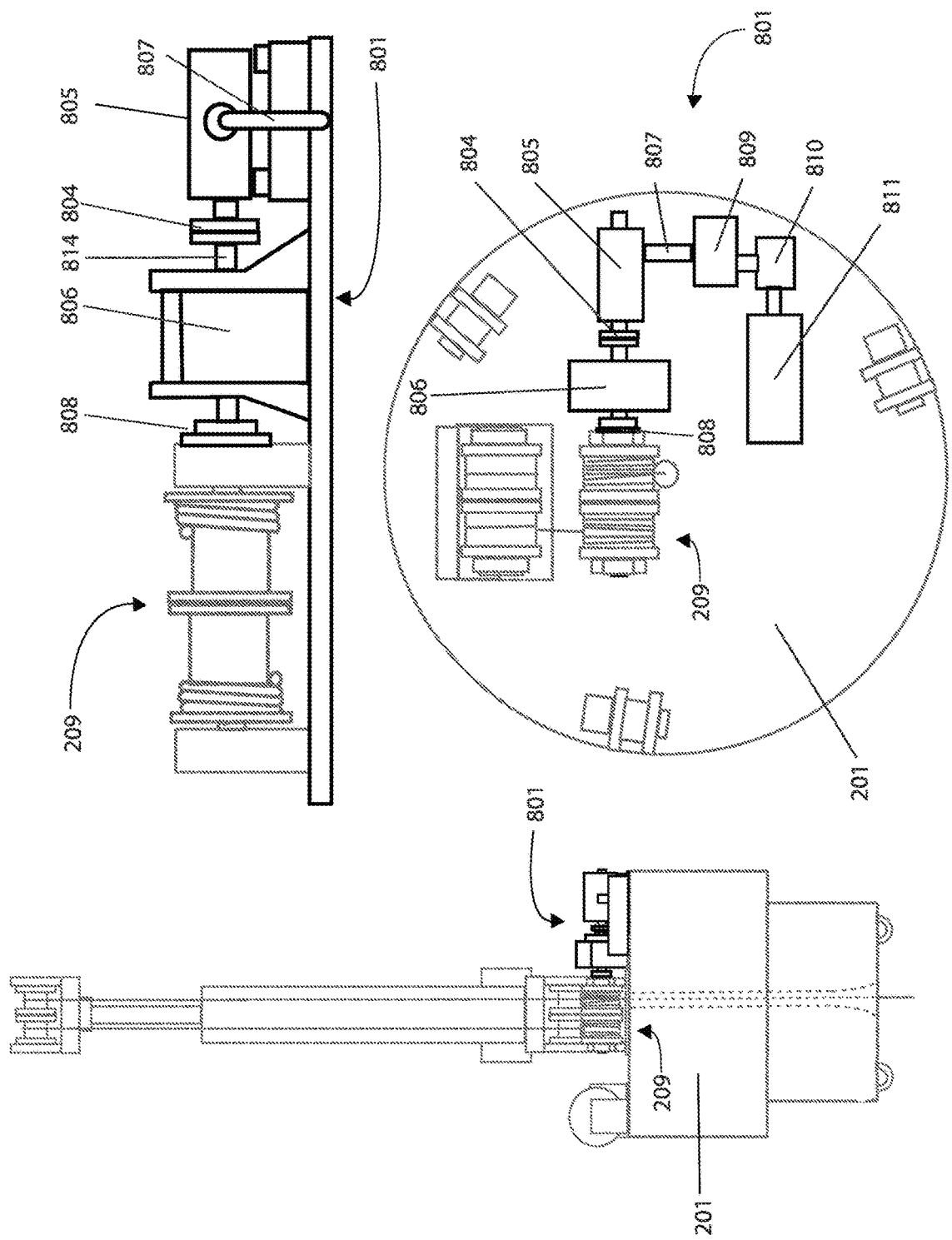
FIG. 8B is a schematic diagram illustrating one or more aspects of an example surface flotation apparatus mounted gear driven hydraulic apparatus, which may utilize more than one seabed structure mounted subsea pulley assembly, according to an implementation.

FIG. 8B illustrates one or more aspects of an example surface flotation apparatus mounted power-conversion apparatus 801, which may utilize seabed structure mounted subsea pulley assembly 401. Power conversion apparatus 801 may be in any combination thereof, and/or number or configuration, and may, in whole or in part, be mechanically attached or otherwise coupled to and driven by dual cable drum apparatus 209, via disconnect apparatus 808. Power conversion apparatus 801 may, in whole or in part, for example, comprise gear box 806, drive shaft 814, flexible coupling 804, hydraulic pump 805, interconnecting piping and valves 807, a set of controls 809, and hydraulic motor 810. Hydraulic motor 810 may, in whole or in part, drive electric generator 811, per an implementation. Gear box 806 may, in whole or in part comprise one or more set of gear ratio combinations, which may, in whole or in part, allow changes to gearbox 806 output rotational speed and torque to hydraulic pump 805, based upon forecasted and/or seasonal sea conditions in order to increase hydraulic pump efficiency and output, per an implementation. Changes in gearbox 806 output rotational speed and torque may, in whole or in part, be done manually or via remote operation, depending upon a particular implementation.

Figure 8C:
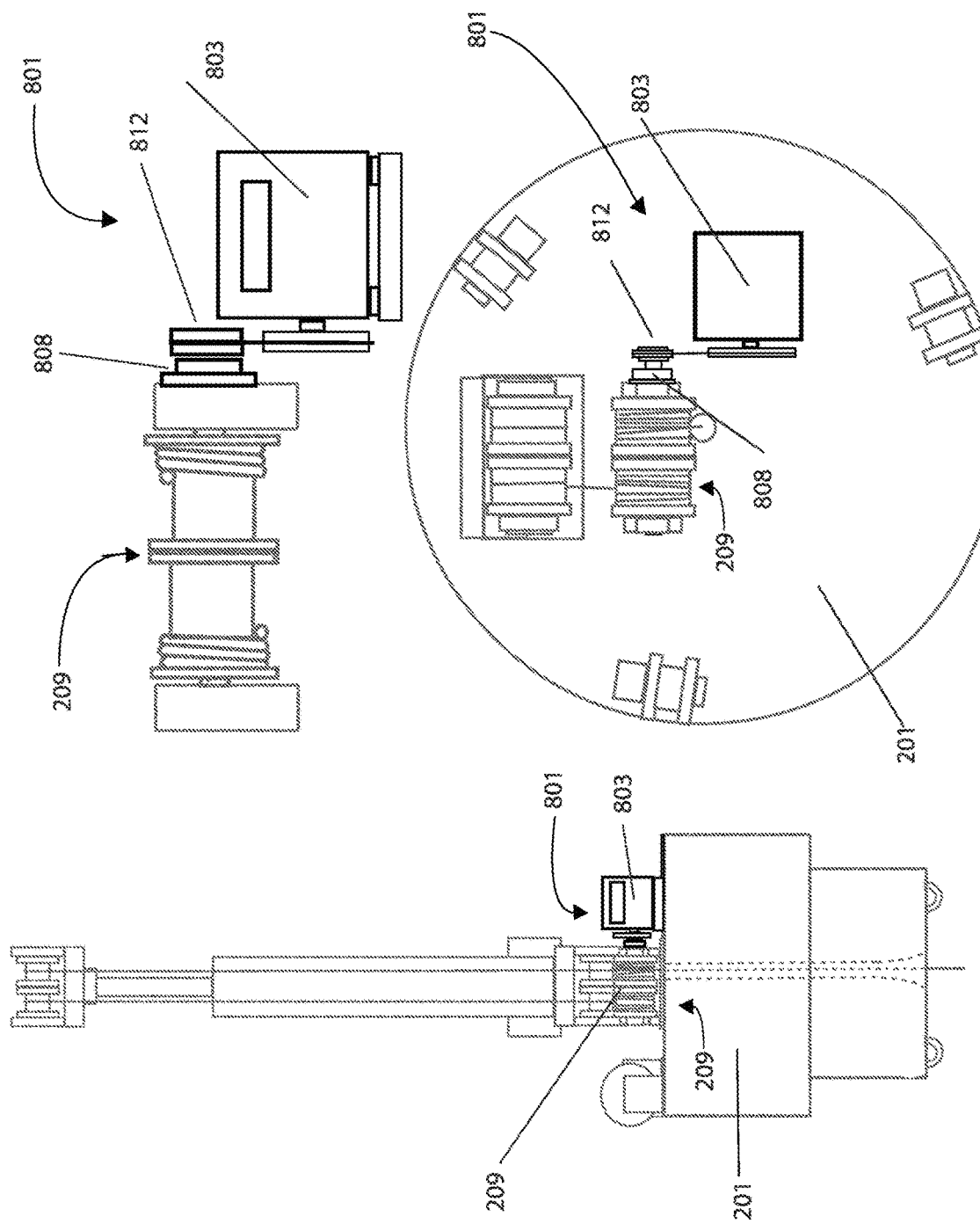
FIG. 8C is a schematic diagram illustrating one or more aspects of an example surface flotation apparatus mounted chain and sprocket or belt driven generator apparatus, which may utilize more than one seabed structure mounted subsea pulley assembly, according to an implementation.

FIG. 8C illustrates one or more aspects of an example surface flotation apparatus mounted power conversion apparatus 801, which may utilize seabed structure mounted subsea pulley assembly 401. Power conversion apparatus 801 may be in any combination thereof, and/or number or configuration, and may, in whole or in part, be mechanically attached or otherwise coupled to and driven by dual cable drum apparatus 209, via disconnect apparatus 808. Power conversion apparatus 801 may, in whole or in part, for example, comprise a gear and sprocket chain drive or belt/pully drive 812, that may, in whole or in part, drive electric generator 803, per an implementation. Power conversion apparatus 801 may, in whole or in part, comprise one or more set of sprocket or pulley ratio combinations that may, in whole or in part, allow changes to input rotational speed and torque to electric generator 803, based upon forecasted and/or seasonal sea conditions in order to increase electric generator efficiency and output, per an implementation. Changes in gear and sprocket chain drive or belt/pulley drive 812 output rotational speed and torque may, in whole or in part, be done manually or via remote operation, depending upon a particular implementation.

Figure 8D:
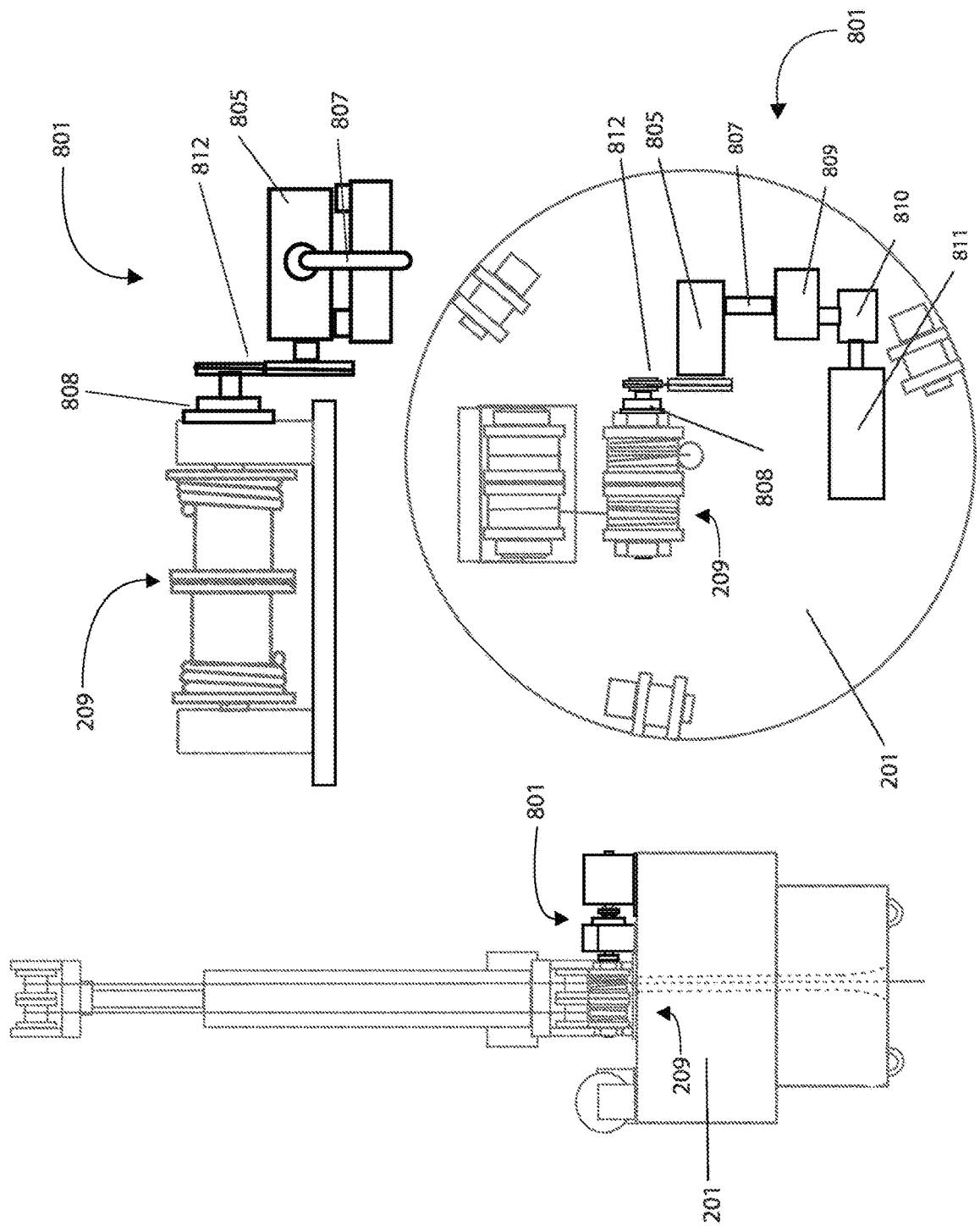
FIG. 8D is a schematic diagram illustrating one or more aspects of an example surface flotation apparatus mounted chain and sprocket or belt driven hydraulic apparatus, which may utilize more than one seabed structure mounted subsea pulley assembly, according to an implementation.

FIG. 8D illustrates one or more aspects of an example surface flotation apparatus mounted power conversion apparatus 801 that may utilize seabed structure mounted subsea pulley assembly 401. Power conversion apparatus 801 may be in any combination thereof, and/or number or configuration, and may, in whole or in part, be mechanically attached or otherwise coupled to and driven by dual cable drum apparatus 209, via disconnect apparatus 808. Power conversion apparatus 801 may, in whole or in part, for example, comprise a gear and sprocket chain drive or belt/pully drive 812, hydraulic pump 805, interconnecting piping and valves 807, set of controls 809, and hydraulic motor 810. Hydraulic motor 810 may, in whole in part, drive electric generator 811, per an implementation. Power conversion apparatus 801 may, in whole or in part comprise one or more set of sprocket or pulley ratio combinations that may, in whole or in part, allow changes to input rotational speed and torque to hydraulic pump 805, based upon forecasted or seasonal sea conditions in order to increase hydraulic pump efficiency and output, per an implementation. Changes in gear and sprocket chain drive or belt/pulley drive 812 output rotational speed and torque may, in whole or in part, be done manually or via remote operation, depending upon a particular implementation.

Figure 8E:
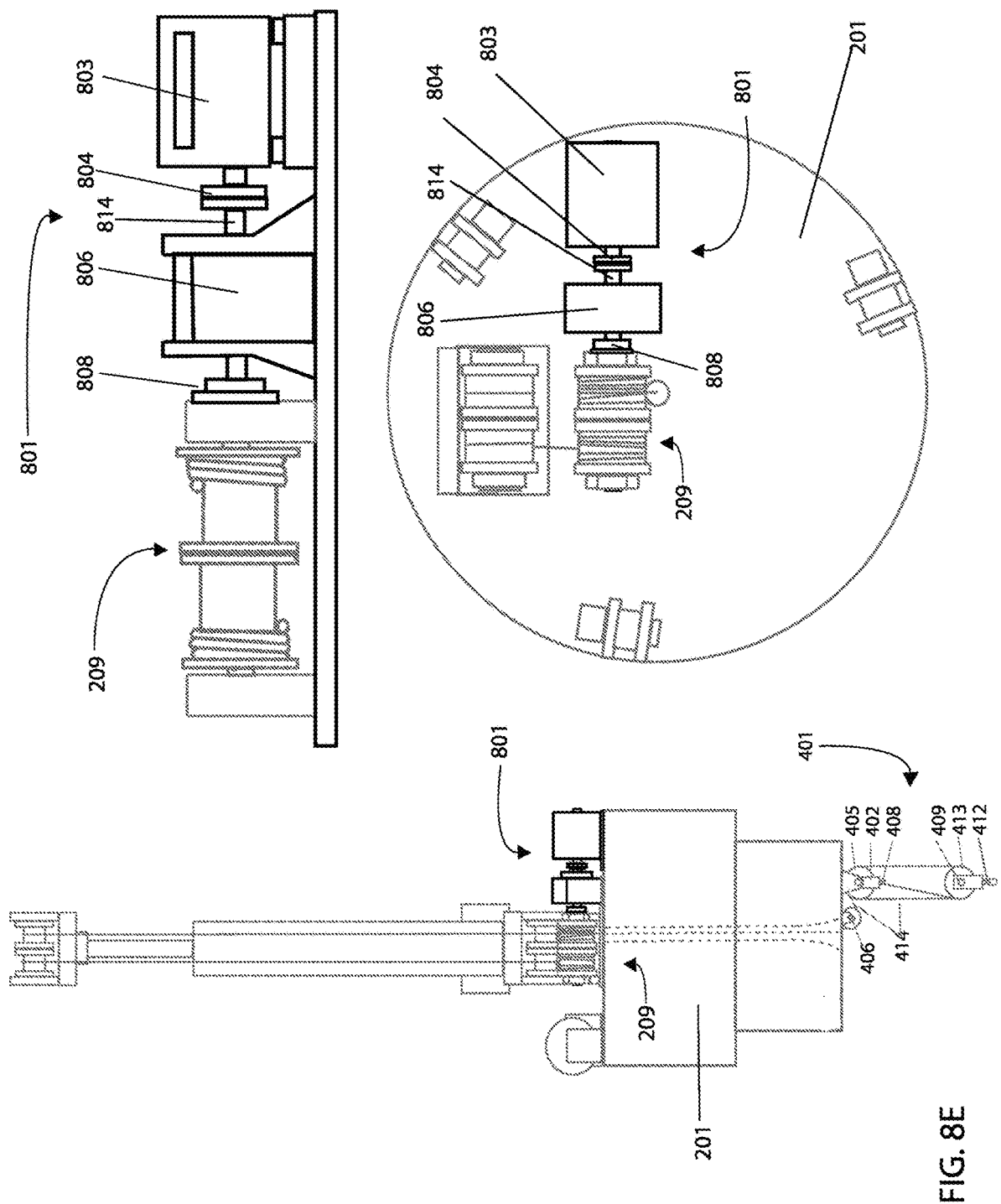
FIG. 8E is a schematic diagram illustrating one or more aspects of an example surface flotation apparatus mounted gear driven generator apparatus with surface flotation apparatus mounted subsea pulley assembly, which may utilize seabed anchored, subsea interconnecting cable, according to an implementation.

FIG. 8E illustrates one or more aspects of an example surface flotation apparatus mounted power conversion apparatus 801 that may utilize surface flotation apparatus mounted subsea pulley assembly 401. Power conversion apparatus 801 may be in any combination thereof, and/or number or configuration, and may, in whole or in part, be mechanically attached or otherwise coupled to and driven by dual cable drum apparatus 209, via disconnect apparatus 808. An example of a power conversion apparatus 801 that may, in whole or in part, for example, comprise gear box 806, drive shaft 814, flexible coupling 804, and electric generator 803, per an implementation. Gear box 806 may, in whole or in part, comprise one or more set of gear ratio combinations that may, in whole or in part, allow changes to gearbox 806 output rotational speed and torque to electrical generator 803, based upon forecasted or seasonal sea conditions in order to increase generator efficiency and output, per an implementation. Changes in gearbox 806 output rotational speed and torque may, in whole or in part, be done manually or via remote operation, depending upon a particular implementation.

Figure 8F:
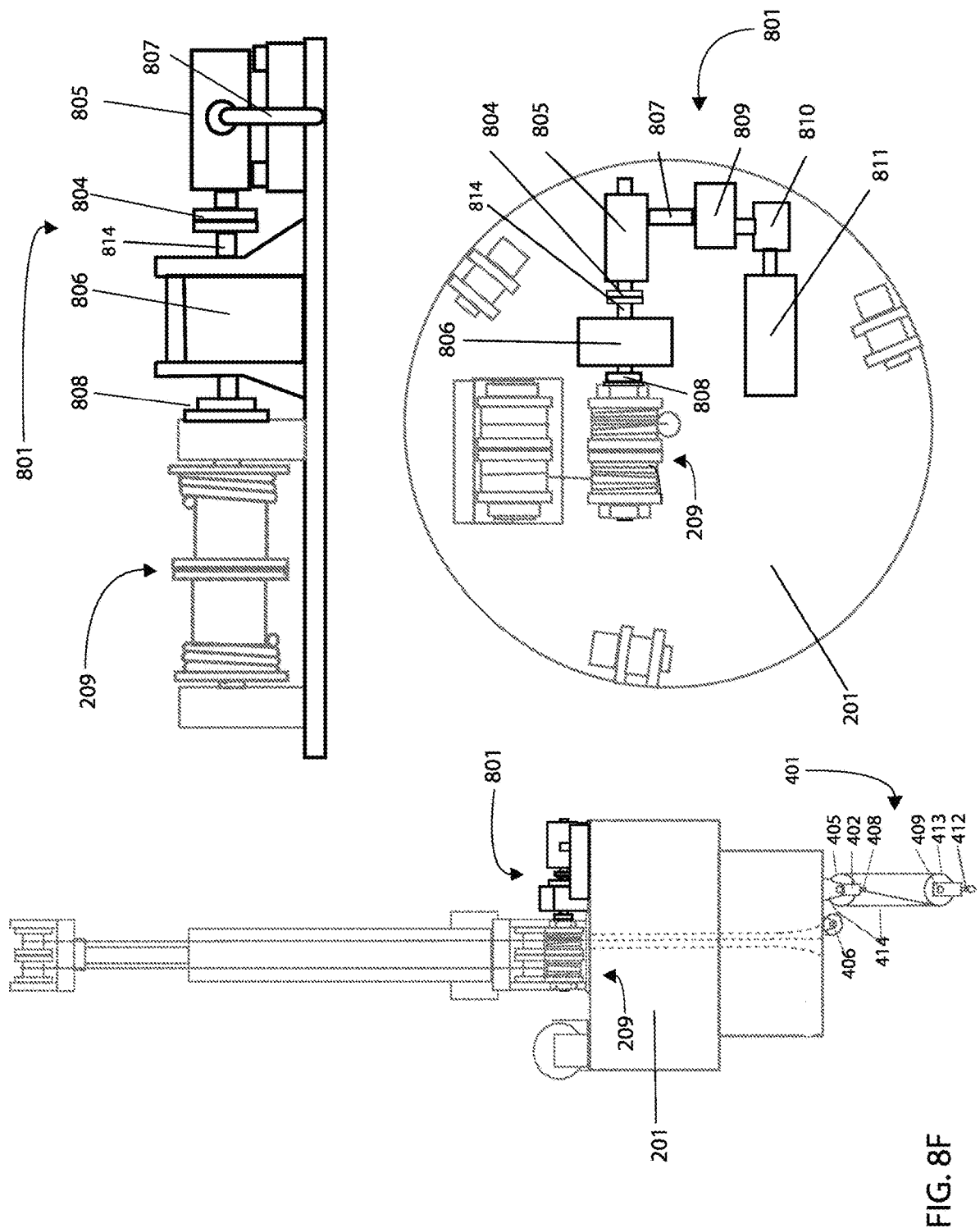
FIG. 8F is a schematic diagram illustrating one or more aspects of an example surface flotation apparatus gear driven hydraulic apparatus with surface flotation apparatus mounted subsea cable assembly, which may utilize seabed anchored, subsea interconnecting cable, according to an implementation.

FIG. 8F illustrates one or more aspects of an example surface flotation apparatus mounted power conversion apparatus 801, which may utilize surface flotation apparatus mounted subsea pulley assembly 401. Power conversion apparatus 801 may be in any combination thereof, and/or number or configuration, and may, in whole or in part, be mechanically attached or otherwise coupled to and driven by dual cable drum apparatus 209, via disconnect apparatus 808. Power conversion apparatus 801 may, in whole or in part, for example, comprise gear box 806, drive shaft 814, flexible coupling 804, hydraulic pump 805, interconnecting piping and valves 807, a set of controls 809, and hydraulic motor 810. Hydraulic motor 810 may, in whole or in part, drive electric generator 811, per an implementation. Gear box 806 may, in whole or in part, comprise one or more set of gear ratio combinations that may, in whole or in part, allow changes to gearbox 806 output rotational speed and torque to hydraulic pump 805, based upon forecasted or seasonal sea conditions in order to increase hydraulic pump efficiency and output, per an implementation. Changes in gearbox 806 output rotational speed and torque may, in whole or in part, be done manually or via remote operation, depending upon a particular implementation.

Figure 8G:
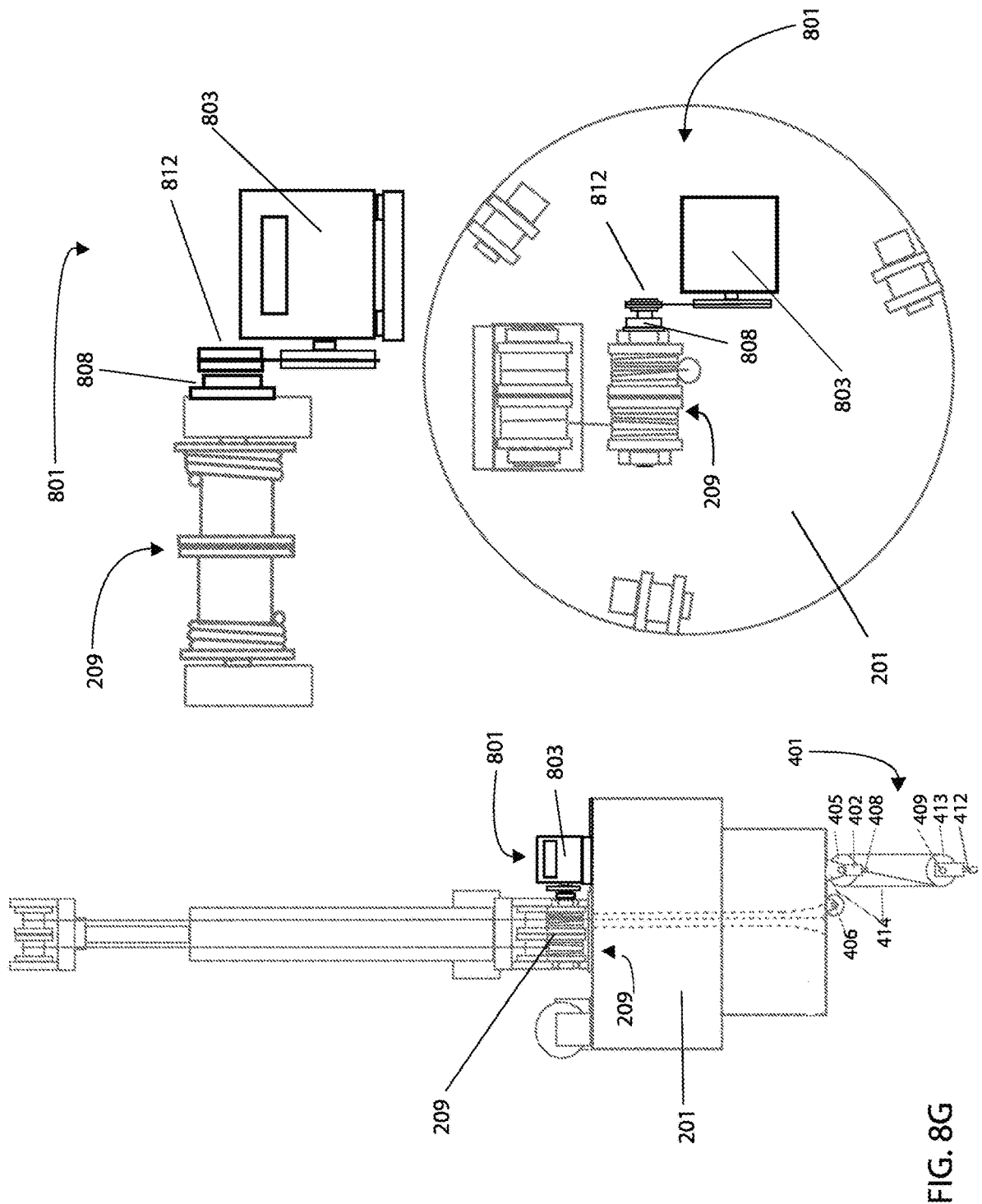
FIG. 8G is a schematic diagram illustrating one or more aspects of an example surface flotation apparatus mounted chain and sprocket or belt driven generator apparatus with surface flotation apparatus mounted subsea pulley assembly, which may utilize seabed anchored, subsea interconnecting cable, according to an implementation.

FIG. 8G illustrates one or more aspects of an example surface flotation apparatus mounted power conversion apparatus 801 that may utilize surface flotation apparatus mounted subsea pulley assembly 401. Power conversion apparatus 801 may be in any combination thereof, and/or number or configuration and may, in whole or in part, be mechanically attached or otherwise coupled to and driven by dual cable drum apparatus 209, via disconnect apparatus 808. Power conversion apparatus 801 may, in whole or in part, for example, comprise a gear and sprocket chain drive or belt/pully drive 812 that may, in whole or in part, drive electric generator 803, per an implementation. Power conversion apparatus 801 may, in whole or in part, comprise one or more set of sprocket or pulley ratio combinations that may, in whole or in part, allow changes to input rotational speed and torque to electric generator 803, based upon forecasted and/or seasonal sea conditions in order to increase electric generator efficiency and output, per an implementation. Changes in gear and sprocket chain drive or belt/pulley drive 812 output rotational speed and torque may, in whole or in part, be done manually or via remote operation, depending upon a particular implementation.

Figure 8H:
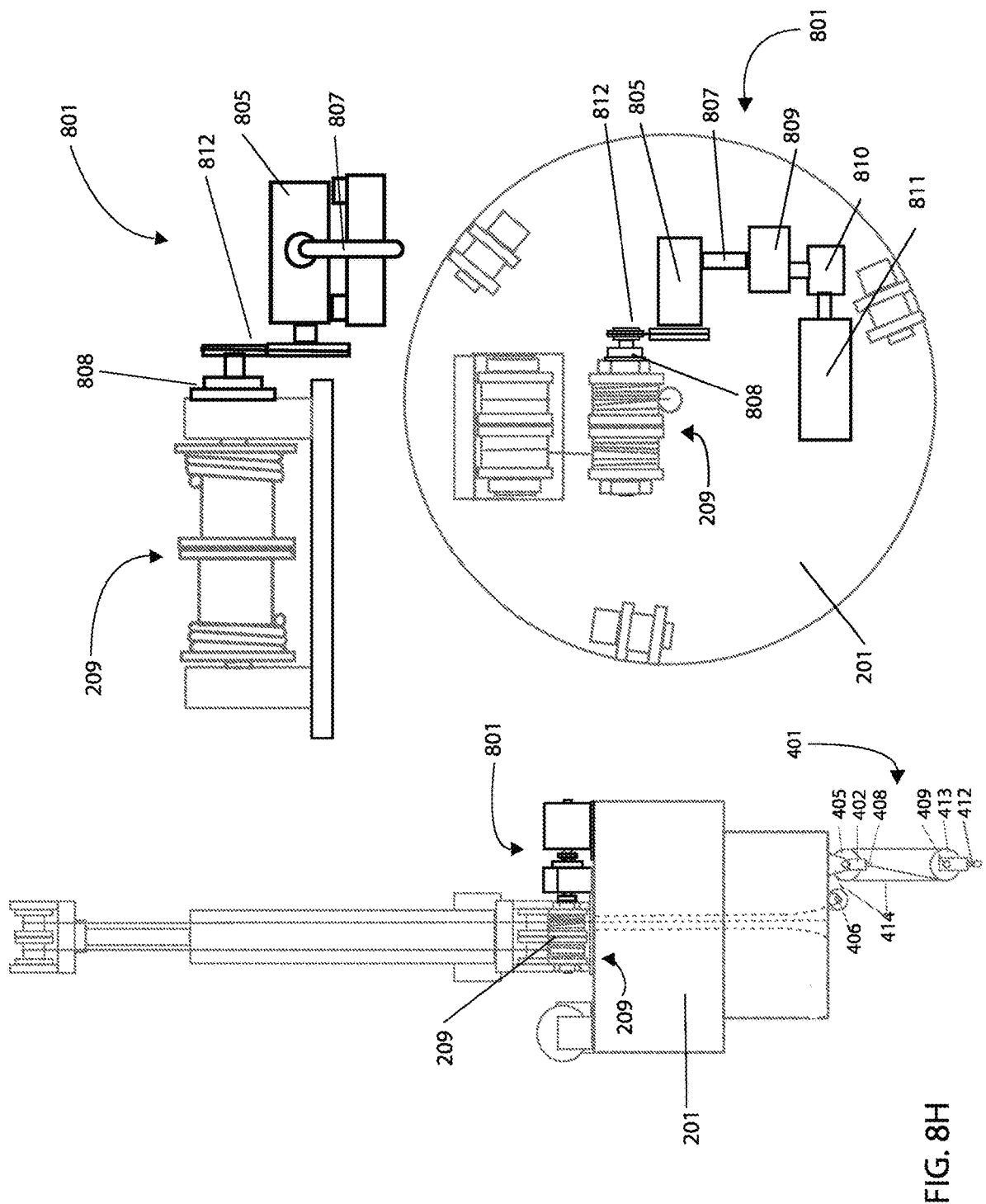
FIG. 8H is a schematic diagram illustrating one or more aspects of an example surface flotation apparatus mounted chain and sprocket or belt driven hydraulic apparatus with surface flotation apparatus mounted subsea pulley assembly, which may utilize seabed anchored, subsea interconnecting cable, according to an implementation.

FIG. 8H illustrates one or more aspects of an example surface flotation apparatus mounted power conversion apparatus 801 that may utilize surface flotation apparatus mounted subsea pulley assembly 401. Power conversion apparatus 801 may be in any combination thereof, and/or number or configuration and may, in whole or in part, be mechanically attached or otherwise coupled to and driven by dual cable drum apparatus 209, via disconnect apparatus 808. Power conversion apparatus 801 may, in whole or in part, for example, comprise a gear and sprocket chain drive or belt/pully drive 812, hydraulic pump 805, interconnecting piping and valves 807, set of controls 809, and hydraulic motor 810 that may, in whole in part, drive electric generator 811, per an implementation. Power conversion apparatus 801 may, in whole or in part, comprise one or more set of sprocket or pulley ratio combinations that may, in whole or in part, allow changes to input rotational speed and torque to hydraulic pump 805, based upon forecasted or seasonal sea conditions in order to increase hydraulic pump efficiency and output, per an implementation. Changes in gear and sprocket chain drive or belt/pulley drive 812 output rotational speed and torque may, in whole or in part, be done manually or via remote operation, depending upon a particular implementation.

Figure 8I:
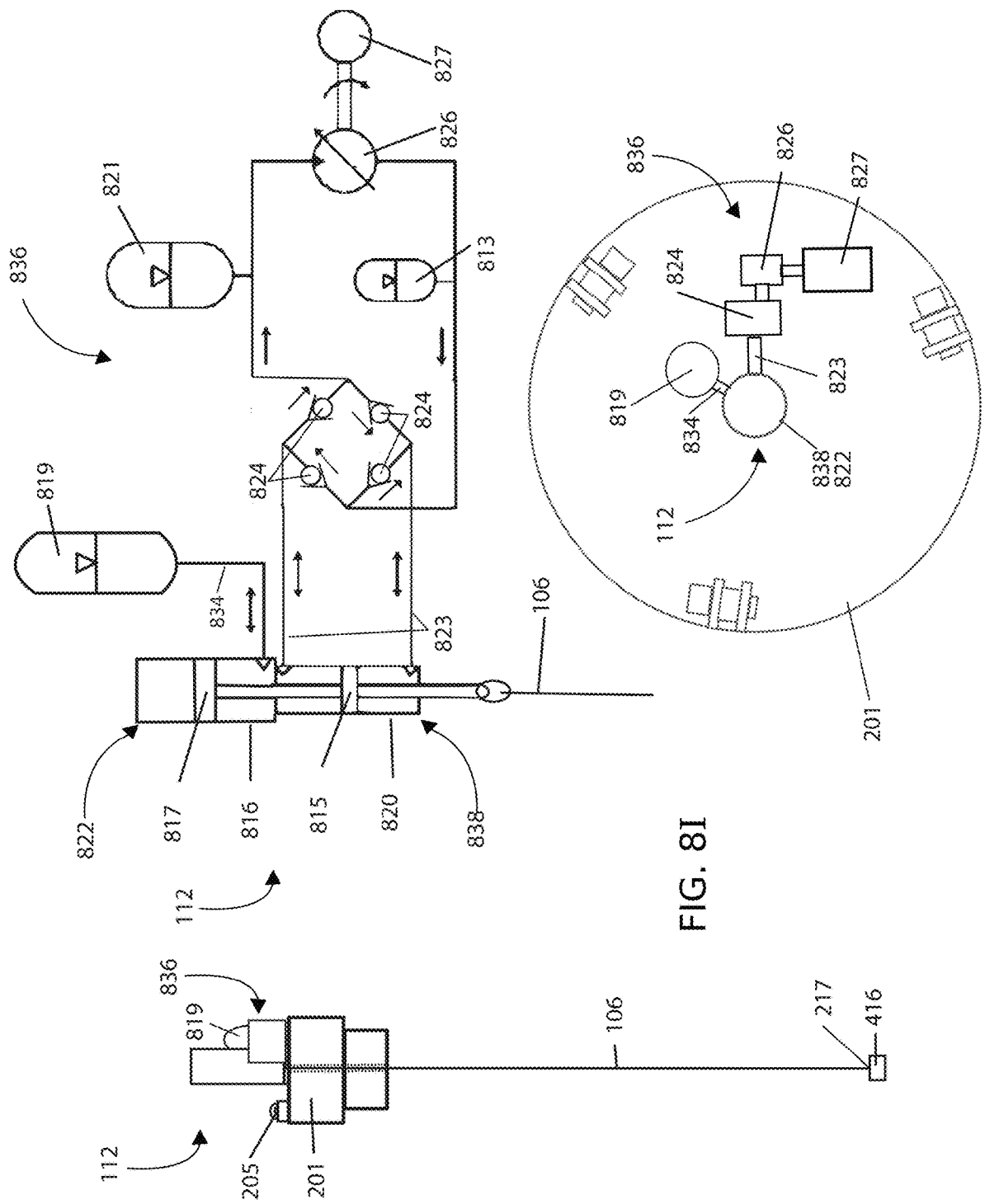
FIG. 8I is a schematic diagram illustrating one or more aspects of an example surface flotation apparatus mounted hydraulic power conversion apparatus, which may utilize a seabed anchored, subsea interconnecting cable, according to an implementation.

FIG. 8I illustrates one or more aspects of an example surface flotation apparatus mounted hydraulic power conversion apparatus 112 that may utilize, in whole or in part, a seabed anchored, subsea interconnecting cable 106, according to an implementation. As illustrated, a power conversion apparatus referenced generally at 112, may utilize, for example, a seabed anchored, subsea interconnecting cable referenced generally at 106 which may be, for example, be fixedly attached to seabed anchor 416. Hydraulic power conversion apparatus 112 may be implemented in any suitable combination thereof, and/or number or configuration, such as without deviating from the scope and spirit of the present disclosure. Hydraulic power conversion apparatus 112 may, in whole or in part, include, for example, hydraulic power assembly referenced generally at 838, and hydraulic cable tension assembly, referenced generally at 822. Hydraulic power assembly 838 may, in whole or in part, comprise hydraulic cylinder 820 and hydraulic piston 815, for example. Hydraulic cable tension assembly referenced at 822 may, in whole or in part, comprise hydraulic cylinder 816, hydraulic piston 817, interconnecting piping 834 and hydraulic accumulator 819. Hydraulic accumulator 819 may include a internal pressurized bladder and/or contain pressurized inert gas charge 841, depending on a particular implementation. Hydraulic power conversion system, referenced generally at 836 may, in whole or in part, include connecting piping 823 that may comprise, for example, flow control directional check valves 824, inlet accumulator 821, hydraulic motor outlet accumulator 813, and hydraulic motor 826. As discussed in more detail below, in some instances, energy generated, in whole or in part, during a first half of a wave period by relatively upward movement of surface flotation apparatus 201 may, in corporation with potential energy generated within the hydraulic accumulator during a first half of a wave period may, in whole or in part, to facilitate suitable utilization of hydraulic flow and pressure to drive hydraulic motor 826, and electric generator 827, per an implementation.

Figure 8J:
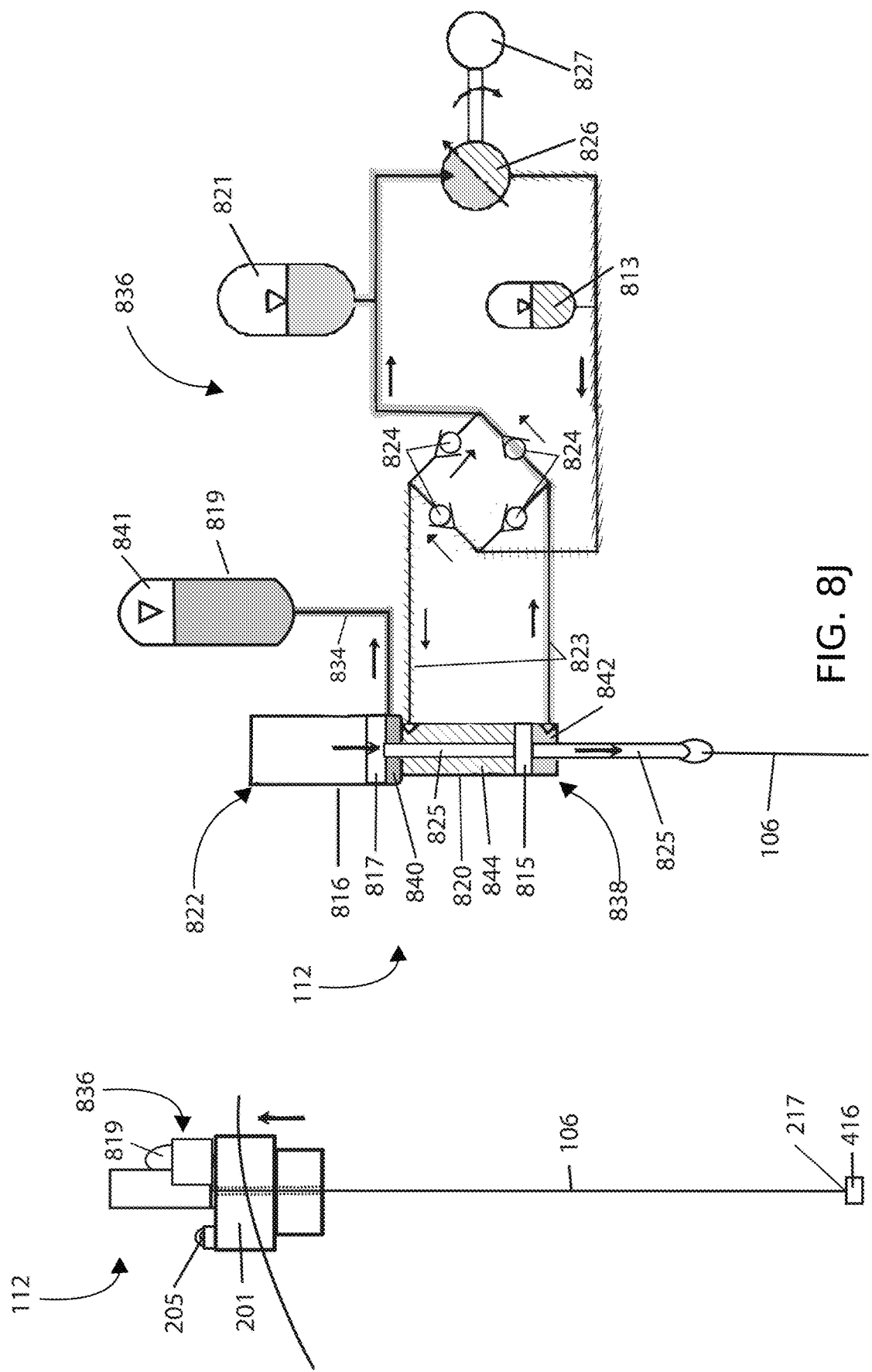
FIG. 8J is an illustration of an example operation of one or more aspects for a wave swell energy capture infrastructure during the first half of a wave period, which may include one or more aspects of an example surface flotation apparatus mounted hydraulic power conversion apparatus utilizing a seabed anchored, subsea interconnecting cable, according to an implementation.

FIG. 8J is an example implementation illustrating an operation of one or more aspects for a wave swell energy capture infrastructure during the first half of a wave period that may include, for example, one or more aspects of an example surface flotation apparatus 201 mounted hydraulic power conversion apparatus 112 that may utilize a seabed anchored, subsea interconnecting cable 106, according to an implementation. Shown as an example in FIG. 8J, hydraulic piston 815 and hydraulic piston 817 may, in whole or in part, be suitably attached to piston rod 825. Piston rod 825 may be fixedly attached to subsea interconnecting cable 106 via a suitable connector, such as steel ring and shackle, as one example, which may be attached to a choker anchor thimble style cable end connector of subsea interconnecting cable 106. As illustrated in FIG. 8J, subsea interconnecting cable 106, may be fixedly attached to a seabed anchor 416 and may, in whole or in part, operatively move piston rod 825, hydraulic piston 815, and hydraulic piston 817 in a relatively downward direction, such as while surface flotation apparatus 201 travels relatively upward during a first half of a wave period, for example. The downward movement of hydraulic piston 815 within hydraulic cylinder 820 may, in whole or in part, apply pressure to hydraulic fluid contained within hydraulic cylinder 820 below hydraulic piston 815. Pressurized hydraulic fluid 842 may, in whole or in part, be routed though connecting piping 823 that may include flow control directional check valves 824 and inlet-accumulator 821, and facilitate hydraulic flow and hydraulic pressure to hydraulic motor 826. Low pressure hydraulic fluid 844 leaving hydraulic motor 826 may, in whole or in part, return to hydraulic cylinder 820 above hydraulic piston 815, via connecting piping 823 that may include, flow-control directional check valves 824 and hydraulic motor outlet accumulator 813. Relative downward movement of hydraulic piston 817 within hydraulic cylinder 816 may, in whole or in part, apply pressure to hydraulic fluid 840 contained within hydraulic cylinder 816 below hydraulic piston 817. Pressurized hydraulic fluid 840 may, in whole or in part, be routed though interconnecting piping 834 and into hydraulic accumulator 819. And may, in whole or in part, operatively compress and pressurize a bladder and/or inert gas charge 841 within hydraulic accumulator 819.

Figure 8K:
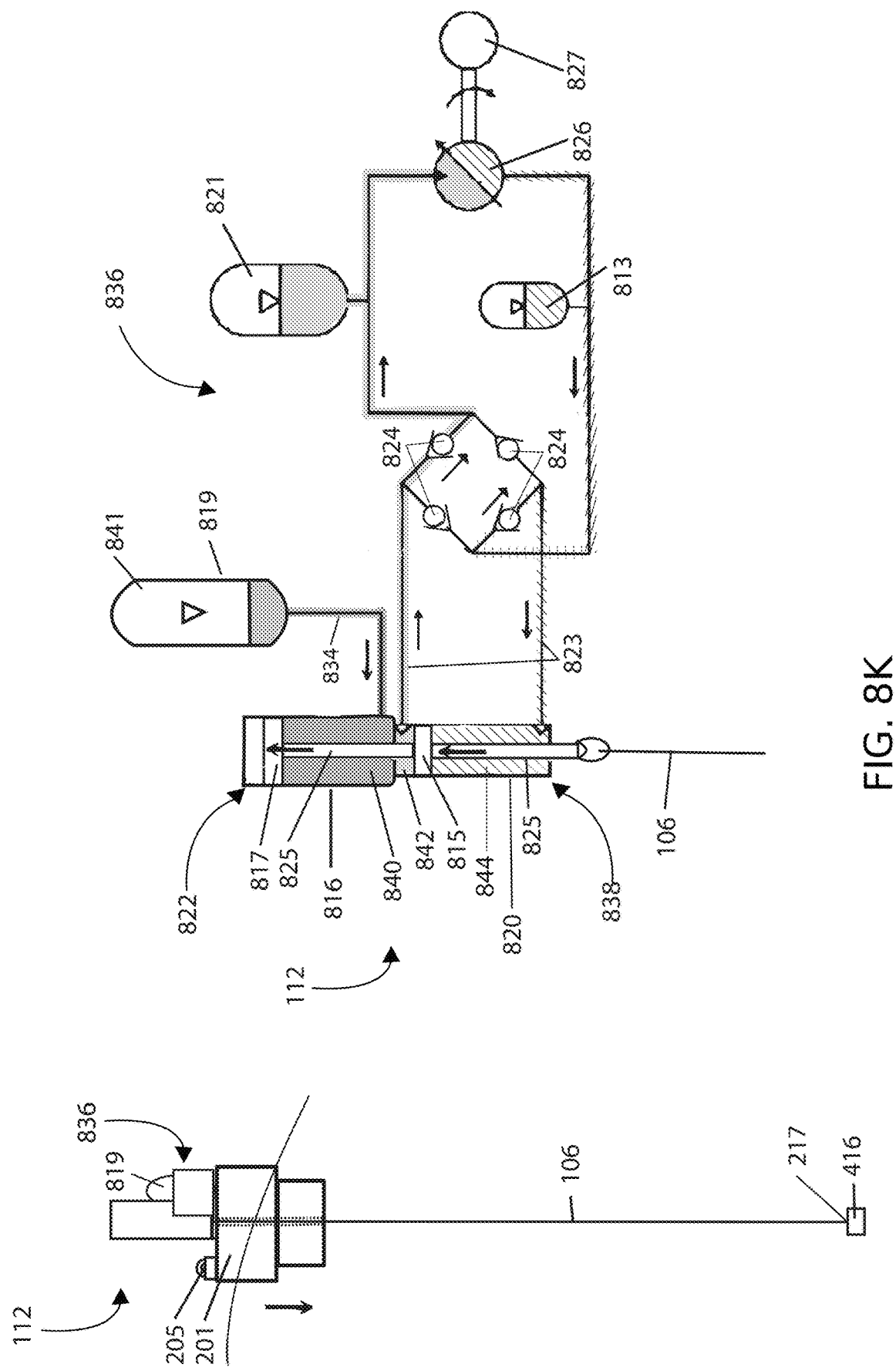
FIG. 8K is an illustration of an example operation of one or more aspects for a wave swell energy capture infrastructure during the second half of a wave period, which may include one or more aspects of an example surface flotation apparatus mounted hydraulic power conversion apparatus utilizing a seabed anchored, subsea interconnecting cable, according to an implementation.

FIG. 8K is an example implementation illustrating an operation of one or more aspects for a wave swell energy capture infrastructure during the second half of a wave period that may include one or more aspects of an example surface flotation apparatus 201, surface flotation apparatus mounted power conversion apparatus 112, and a seabed anchored, subsea interconnecting cable 106, according to an implementation. Shown as an example in FIG. 8K, hydraulic piston 815 and hydraulic piston 817 may, in whole or in part, be suitably attached to piston rod 825. Piston rod 825 may be fixedly attached to subsea interconnecting cable 106 via a suitable connector, such as steel ring and shackle, as one example, which may be attached to a choker anchor thimble style cable end connector of subsea interconnecting cable 106. As illustrated in FIG. 8K, subsea interconnecting cable 106, may be fixedly attached to a seabed anchor 416 and may, in whole or in part, release tension on subsea interconnecting cable 106 and operatively allow for piston rod 825, hydraulic piston 815, and hydraulic piston 817 to move in a relatively upward direction when the surface flotation apparatus 201 travels relatively downward during a second half of a wave period. Pressurized inert gas and/or pressurized bladder 841 within hydraulic accumulator 819 may, in whole or in part, operatively pressurize hydraulic fluid within hydraulic accumulator 819. Pressurized hydraulic fluid 840 within hydraulic accumulator 819, routed though interconnecting piping 834 may, in whole or in part, operatively move hydraulic piston 817, within hydraulic cylinder 816, in a relatively upward direction. Relative upward movement of hydraulic piston 815 within hydraulic cylinder 820 may, in whole or in part, apply pressure to hydraulic fluid contained within hydraulic cylinder 820 above hydraulic piston 815. Pressurized hydraulic fluid 842 may, in whole or in part, be routed though connecting piping 823, which may include flow control directional check valves 824, inlet accumulator 821 and facilitating hydraulic flow and hydraulic pressure to hydraulic motor 826. Low pressure hydraulic fluid 844 leaving hydraulic motor 826 may, in whole or in part, return to hydraulic cylinder 820 below hydraulic piston 815, via connecting piping 823 which may include, for example, flow control directional check valves 824, and hydraulic motor outlet accumulator 813.

Briefly, as mentioned previously, a particular implementation of wave swell energy capture infrastructure that may, at least or in part, be a suitable means for electrical generation, among other implementations discussed within, may comprise a hydro kinetic turbine. FIGS. 9-13A illustrate, at least or in part, examples of hydro kinetic turbine apparatus, according to an implementation.

Figure 9:
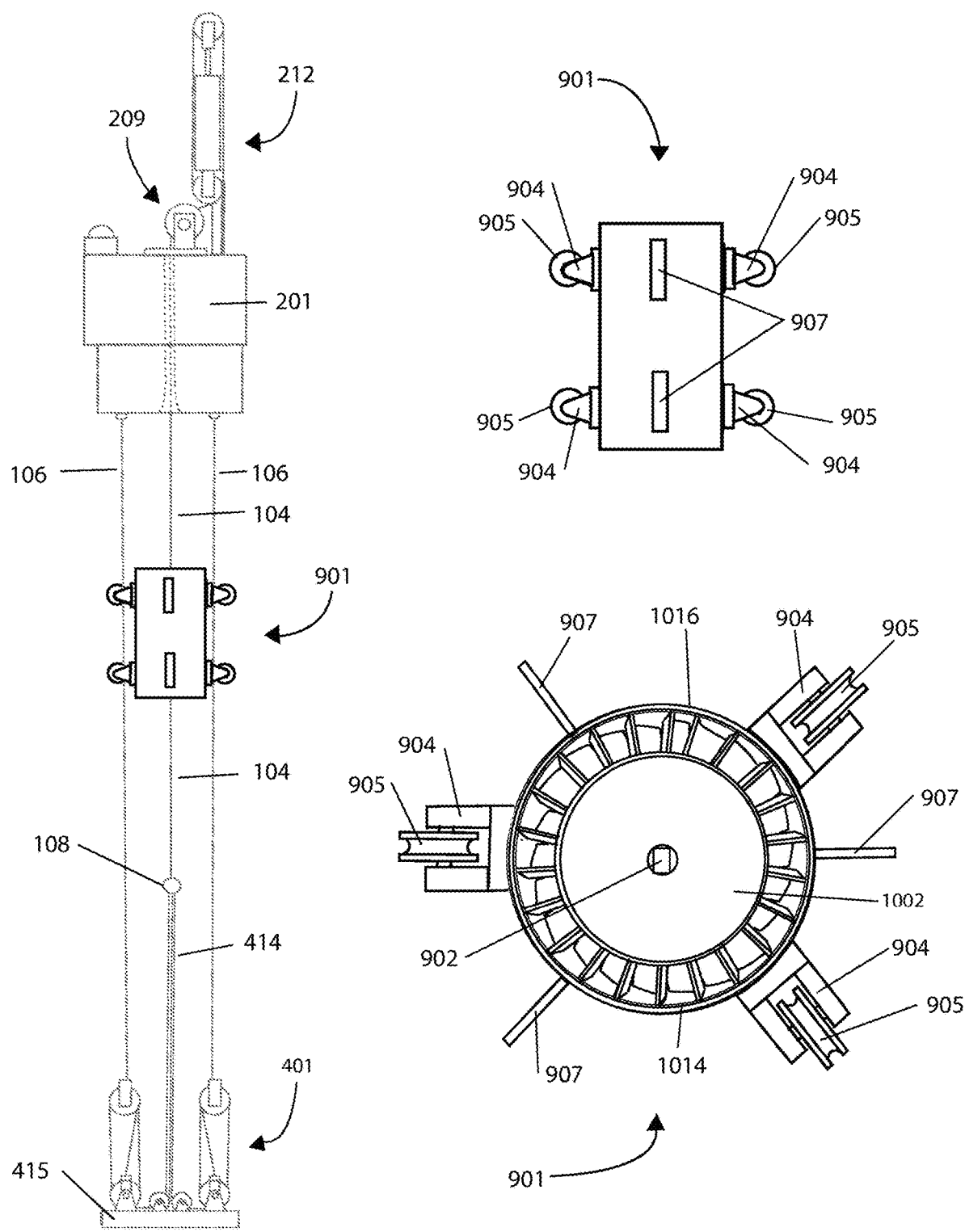
FIG. 9 is a schematic diagram illustrating one or more aspects of an example wave energy swell capture infrastructure hydro kinetic turbine apparatus, according to an implementation.
Figure 10:
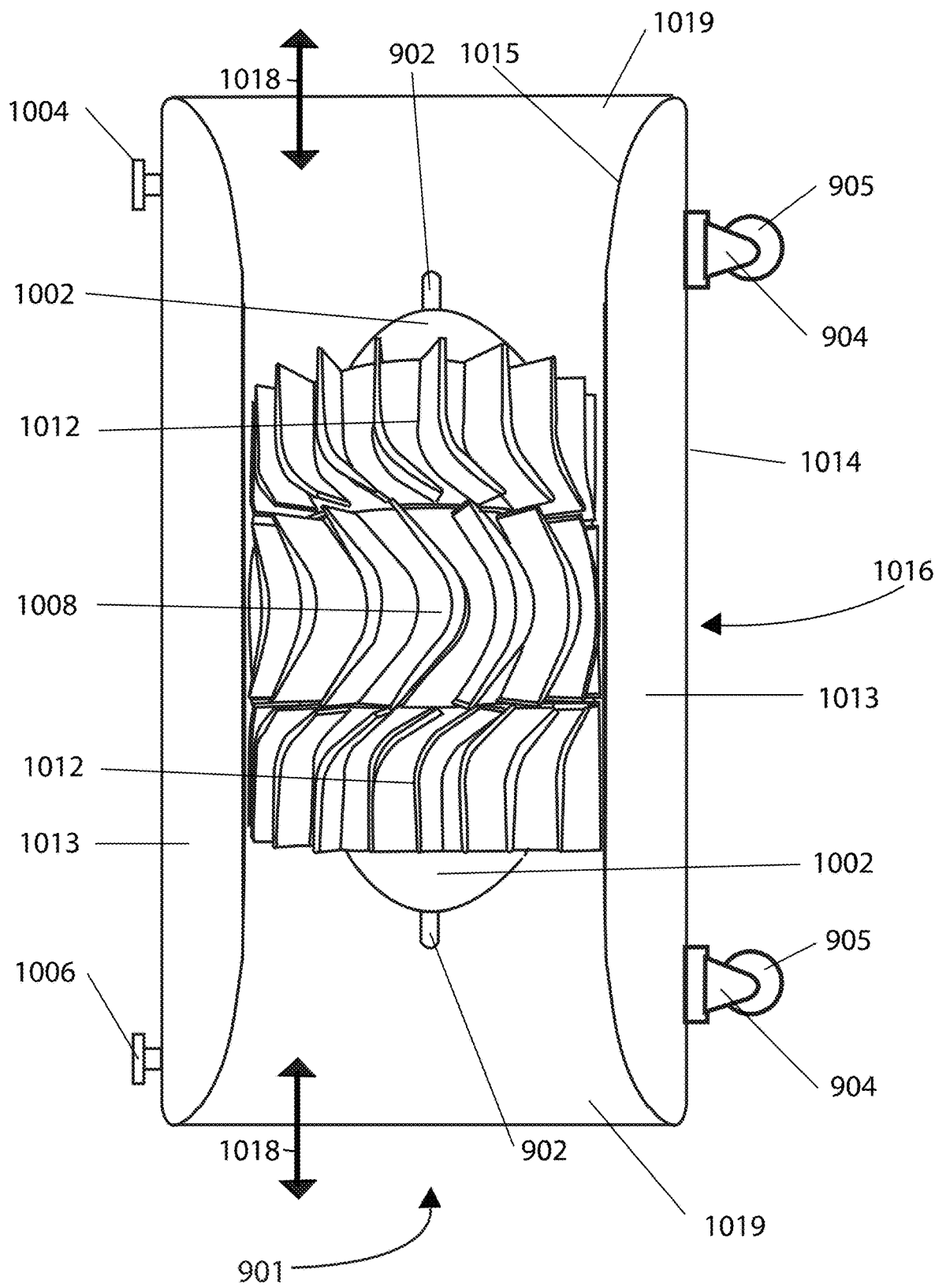

FIG. 9 is an elevation and plan view of wave swell energy capture infrastructure that illustrates one or more aspects hydro kinetic turbine apparatus, referenced generally at 901. Hydro kinetic turbine apparatus 901 may, in whole or in part, be physically attached to one or more upper and lower subsea interconnecting cable 104, proximate to pad-eye 902, via shackle to choker anchor thimble style cable end connector of subsea interconnecting cable 104. Pad-eye 902 for upper and lower subsea interconnecting cable 104 may be in any combination thereof, and/or number or configuration. Hydro kinetic turbine apparatus 901 may, in whole or in part, embody turbine housing 1016. Turbine housing 1016 may, for example, at least or in in part, include cable guide support 904 that may, in whole or in part, include cable roller 905 according to a particular implementation. Cable guide support 904 and cable roller 905 may be in any combination thereof, and/or number or configuration. Turbine housing 1016 may, at least or in in part may, include stabilization fin 907, that may be in any combination thereof, and/or number or configuration, according to a particular implementation. Illustrated for example, a cable guide support 904 and cable roller 905 may, at least or in part, maintain subsea interconnecting cables 106, in alignment with each other while maintaining, in whole or in part, hydro kinetic turbine apparatus 901 in alignment with seabed structure 415 and surface flotation apparatus 201, according to a particular implementation. Bi-directional flow turbine, referenced at 1002, illustrated as an example of a turbine utilizing impulse turbine technology that may be comprised within turbine housing 1016 that may, in whole or in part, include outer turbine casing 1014. Bi-directional flow turbine 1002, comprised within turbine housing 1016 may, in whole or in part, be comprised from and/or utilize another hydro kinetic turbine technology, and/or another configuration, such as to facilitate and/or support absorption of wave swell energy.

Figure 10:
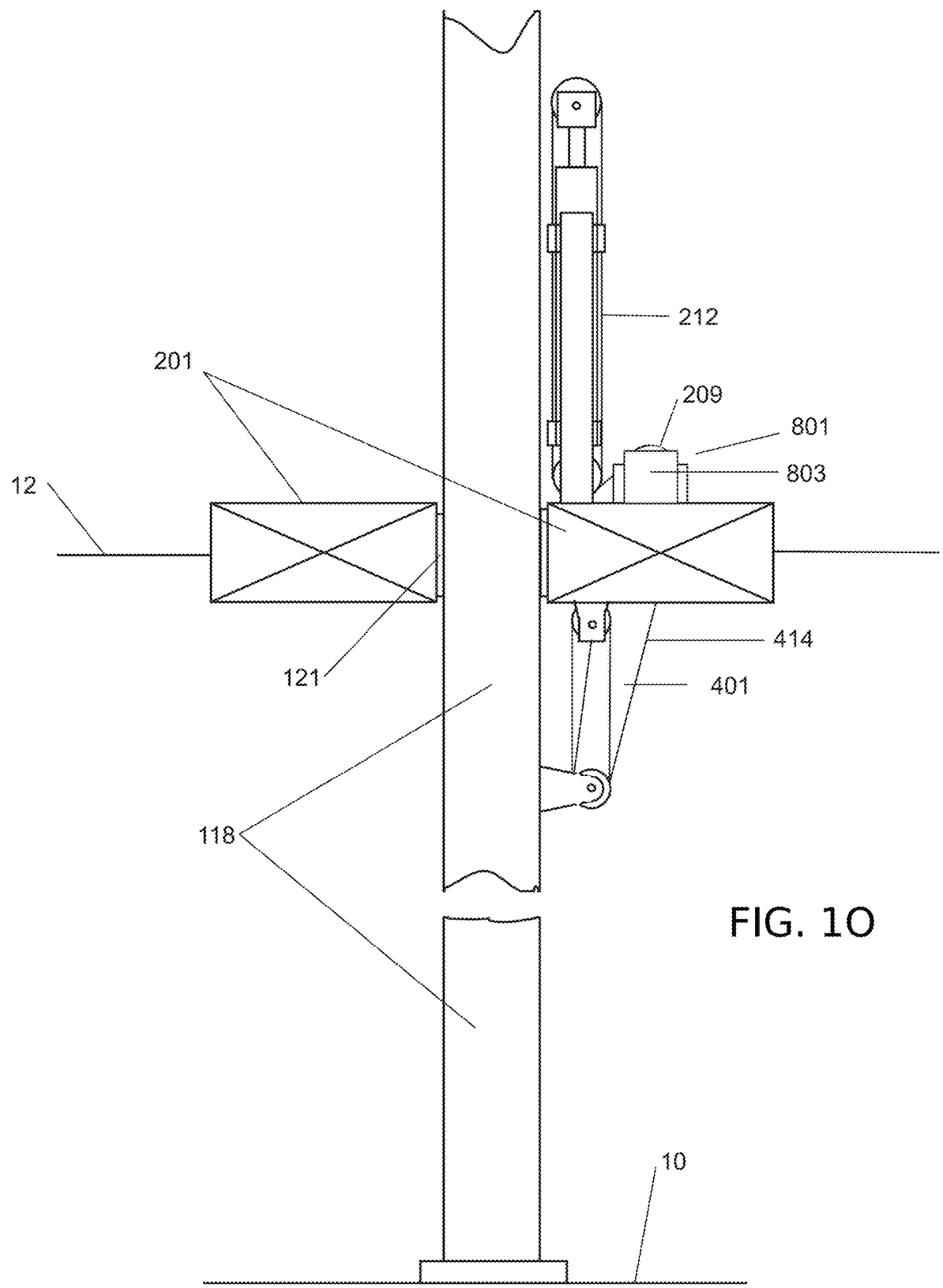
FIG. 10 is a cross-sectional schematic diagram illustrating one or more aspects of an example bi-directional flow hydro kinetic turbine, according to an implementation.

FIG. 10, shows a cross section view of wave swell energy capture infrastructure which illustrates one or more aspects, hydro kinetic turbine apparatus, referenced generally at 901. Hydro kinetic turbine apparatus 901, as illustrated as an example may include, in whole or in part, outer turbine casing 1014 that may, in whole or in part, include inner turbine casing 1015. An annulus that may, in whole or in part, be formed between outer turbine casing 1014 and inner turbine casing 1015 may, in whole or in part, form a buoyancy chamber, referenced generally at 1013. Buoyancy chamber 1013 may, in whole or in part, include connection 1004 and connection 1006 that may, at least or in part, operationally facilitate adding and/or removing liquid ballast to modulate hydro kinetic turbine apparatus 901 buoyancy. Connections 1004 and 1006 may utilize bolted flange, NPT threaded or quick-disconnect etc. style connections. Changes in hydro kinetic turbine apparatus buoyancy may, at least in part, be utilized to operationally balance pressure and/or tension requirements of cable tensioning apparatus 212, with mass (weight) and buoyancy of surface flotation apparatus 201, per a particular implementation of wave swell energy capture infrastructure. Hydro kinetic turbine apparatus 901 inlet/outlet opening, referenced generally at 1019, as illustrated as an example may, in whole or in part, be straight or venturi shaped. Hydro kinetic turbine apparatus inlet/outlet opening 1019 shape may, in whole or in part, be designed to optimize hydro kinetic turbine apparatus hydro flow and/or velocity as suitable to obtain desired performance, according to an implementation. In a particular implementation of wave swell energy capture infrastructure, amplified travel and/or velocity of subsea interconnecting cable 104 that may, at least in part, be physically attached to hydro kinetic turbine apparatus 901 and may result, in whole or in part, amplified travel and/or velocity of hydro kinetic turbine apparatus 901. Amplified travel and/or velocity of hydro kinetic turbine apparatus 901 may, at least in part, increase hydro flow and/or velocity through bi-directional flow turbine, referenced generally at 1002, in a particular implementation of wave swell energy implementation.

Briefly, as alluded to above, bi-directional flow turbine referenced at 1002 that may, at least or in part, be comprised within turbine housing 1016, and as shown in FIG. 10 (a particular implementation of wave swell energy capture infrastructure) may, in whole or in part, utilize impulse turbine technology. Bi-directional flow turbine 1002 that may be comprised within turbine housing 1016 may, in whole or in part, be comprised of alternate hydro turbine technology and/or configuration, depending on an implementation.

FIG. 10, which illustrates one or more aspects, of a bi-directional flow turbine 1002 that may, in whole or in part, include guide-vane nozzle set 1012, fixedly positioned within turbine housing 1016, and rotating bucket set 1008. Guide-vane nozzle set 1012 may, in whole or in part, direct hydro flow 1018 to operationally, in whole or in part, cause bucket set 1008 to rotate. Guide-vane nozzle set 1012, as illustrated, may be orientated, at least or in part, to rotate bucket set 1008 in a single direction regardless of hydro flow 1018 direction, according to an implementation.

A particular implementation of wave swell energy capture infrastructure may, for example comprise, in whole or in part, bi-directional flow turbine 1002 within turbine housing 1016 that may comprise, in whole or in part, a magnetically coupled bi-directional flow turbine that may, in whole or in part, comprise magnet (e.g., permanent magnets, etc.), generator apparatus, or other style generator apparatus etc., that may be in any combination thereof, and/or number or configuration, as suitable to harvest wave swell energy in a particular implementation.

Figure 11A:
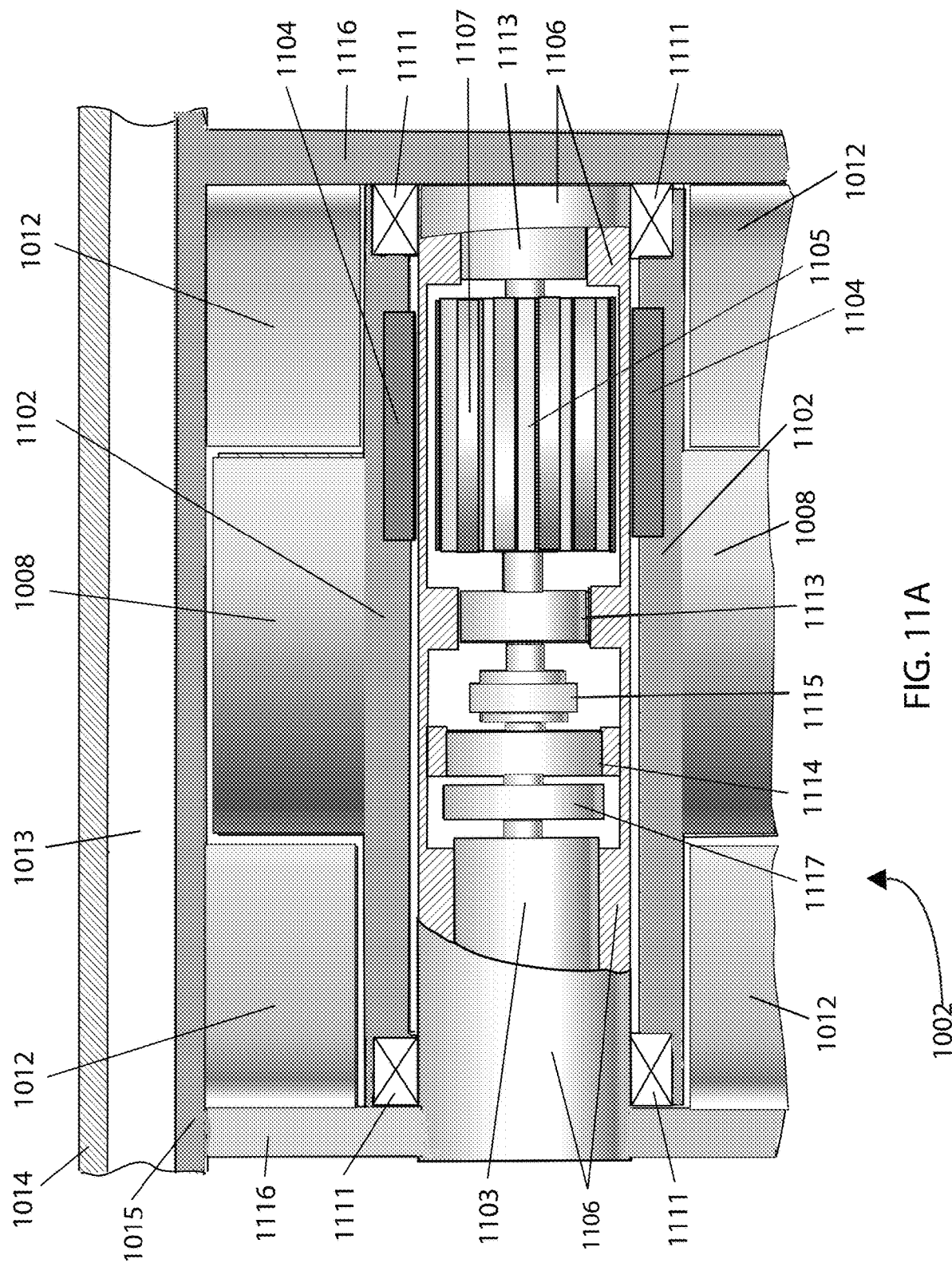
FIG. 11A is a cross-sectional schematic diagram illustrating one or more aspects of an example magnetically coupled bi-directional flow hydro kinetic turbine, according to an implementation.
Figure 11B:
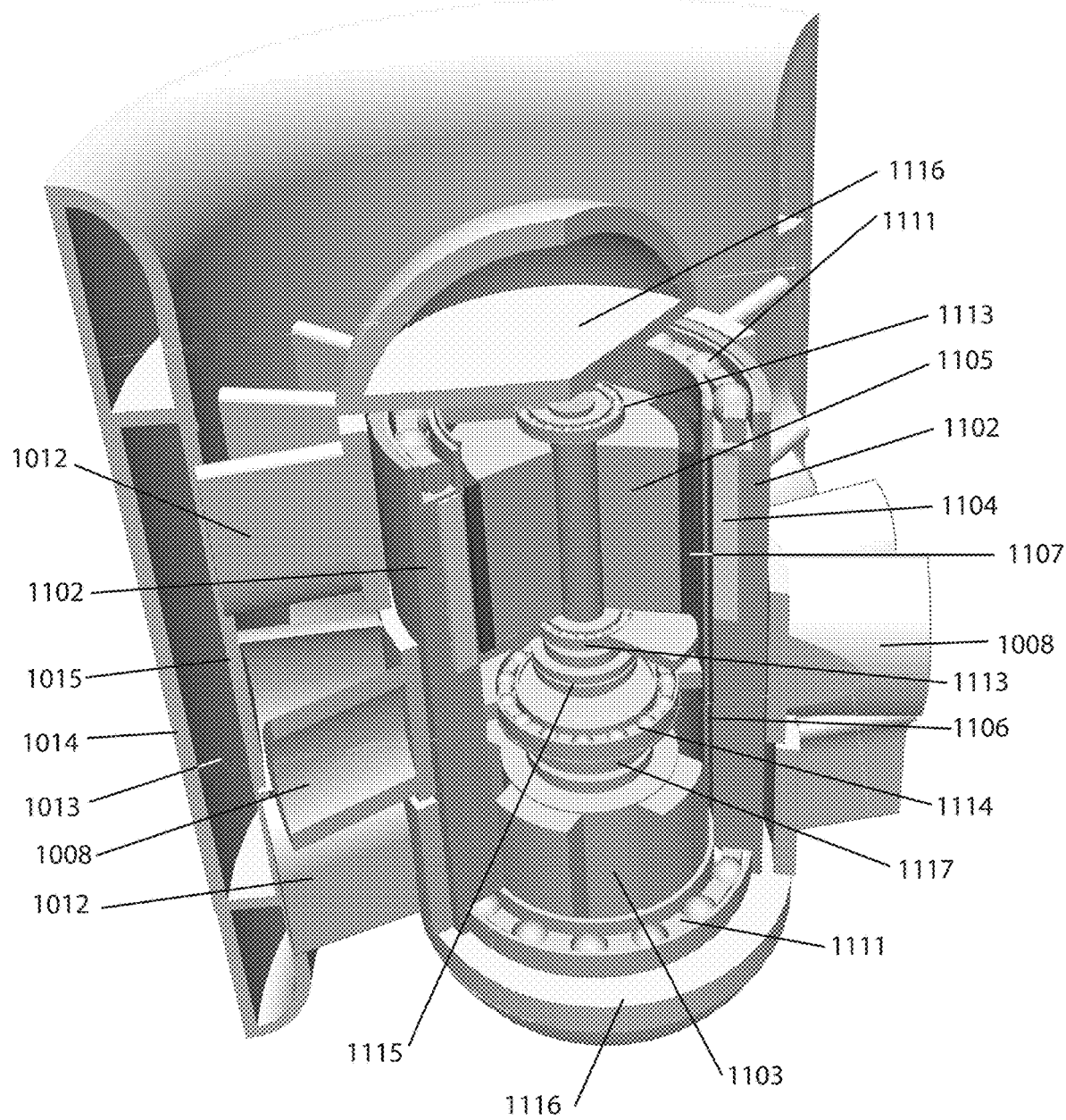
FIG. 11B is a 3D cross-sectional schematic diagram illustrating one or more aspects of an example magnetically coupled bi-directional flow hydro kinetic turbine, according to an implementation.

FIGS. 11A and 11B, are a cross section schematic and a 3D cross section view illustrating one or more aspects of an example magnetically coupled bi-directional flow turbine, in a particular implementation of bi-directional flow, turbine 1002.

FIGS. 11A and 11B, are cross sectional views of magnetically coupled bi-directional flow turbine 1002, comprising magnetically coupled rotor driven generator apparatus that may include, in whole or in part, rotating bucket set 1008 that may, in whole or in part, be physically attached to a substantially hollow cylinder 1102. Substantially hollow cylinder 1102 may, for example comprise, in whole or in part, a plurality of magnets (e.g., permanent magnets, etc.), 1104 that may be physically attached, via threaded bolting or other suitable hardware, in whole or in part, around inner diameter of substantially hollow cylinder 1102. Magnets 1104 (e.g., permanent magnets, etc.), may be in any combination thereof, and/or number or configuration. Bucket set 1008, and substantially hollow cylinder 1102 may, in whole or in part, be supported by bearings 1111. Bearings 1111 may be thrust, roller, ball or sleeve etc. type bearings, in any combination thereof, and/or number or configuration, as suitable to support and maintain alignment and/or support of substantially hollow cylinder 1102. Sealed bearings 1111 may be lubricated and sealed or open water lubricated type bearings that may, at least in part, include internal or external seals in any combination thereof, and/or number or configuration. Substantially hollow cylinder 1102, supported by bearings 1111 may, in whole or in part, be free to rotate. Substantially hollow cylinder 1102 rotation may, in whole or in part, be facilitated by rotational movement of bucket set 1008. Substantially hollow cylinder 1102, and bucket set 1008 may, in whole or in part, substantially extend over and rotate around an internal sealed chamber 1106, which in at least one particular implementation may comprise, for example, a stationary, sealed and pressurized, thin-walled, nonmagnetic, cylindrical chamber. Stationary internal sealed chamber 1106, may be structurally attached, at least or in part, via threaded bolting or other suitable hardware, to support frame 1116. Internal sealed chamber 1106 may, in whole or in part, be pressurized with an inert gas, such as nitrogen or similar gas, to prevent condensation and corrosion. Support frame 1116 may, in whole or in part, be attached via threaded bolting or other suitable hardware, to inner turbine casing 1015. Illustrated as an example, internal sealed chamber 1106 may, in whole or in part, include drive rotor assembly 1105 that may, in whole or in part, be supported by bearings 1113. Bearings 1113 may be thrust, roller, ball or liner etc. type bearings, in any combination thereof, and/or number or configuration, as suitable to maintain alignment and/or support of drive rotor assembly 1105. Drive rotor assembly 1105 may comprise a plurality of magnets 1107 (e.g., permanent magnets, etc.), that may be physically attached via threaded bolting or other suitable hardware, in whole or in part, around outer circumference of drive rotor assembly 1105. Substantially hollow cylinder 1102 magnets 1104 (e.g., permanent magnets, etc.), and drive rotor assembly magnets 1107 (e.g., permanent magnets, etc.) may, in whole or in part, be magnetically coupled (magnetic coupling transfers torque from one object to another, by using a magnetic field rather than a physical mechanical connection). Rotation of substantially hollow cylinder 1102 may, at least or in part, result in rotation of magnetically coupled drive rotor assembly 1105, according to an implementation.

As illustrated in FIGS. 11A and 11B, magnetically coupled drive rotor assembly 1105 may, in whole or in part, operatively couple to and drive at least one of the following: an electric generator 1103 or alternatively drive a hydraulic system or, such as suitable or desired, another energy harvesting option etc., in any combination thereof, to obtain a suitable output energy according to an implementation.

Continuing with FIGS. 11A and 11B, illustrated as an example, stationary internal sealed chamber 1106 may, as suitable or desired comprise, in whole or in part, flex drive coupling 1115, single direction rotary bearing 1114, and flywheel 1117. Stationary internal sealed chamber 1106 embodiments listed above may be absent or in any combination thereof, and/or number or configuration, according to an implementation.

Figure 12A:
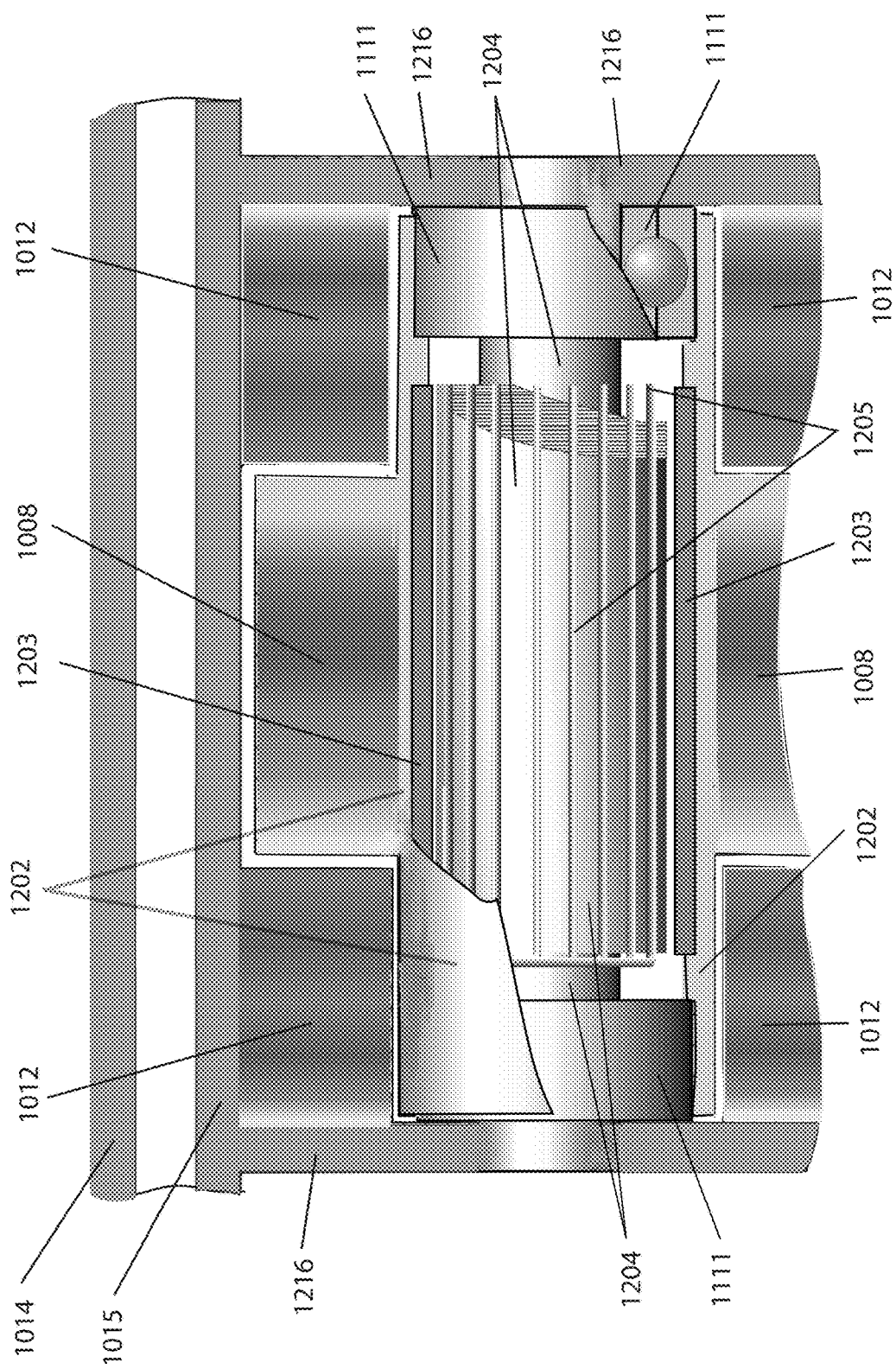
FIG. 12A is a cross-sectional schematic diagram illustrating one or more aspects of an example bi-directional flow single rotation hydro kinetic turbine, with a rotating permanent magnetic field, fixed stator, and generator, according to an implementation.
Figure 12B:
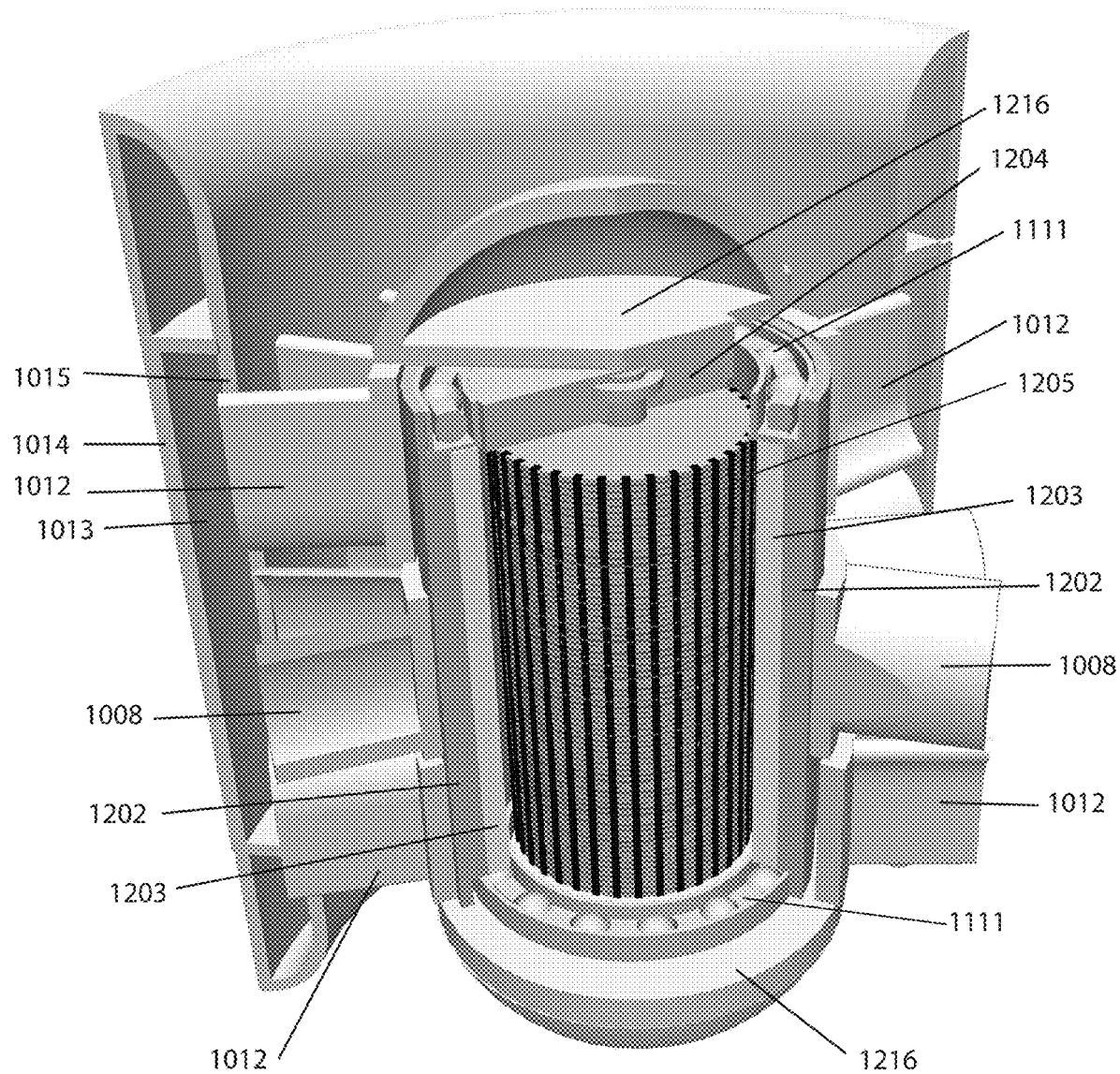
FIG. 12B is a 3D cross-sectional schematic diagram illustrating one or more aspects of an example bi-directional flow hydro kinetic turbine, with a stationary stator, according to an implementation.

FIGS. 12A and 12B, are cross section schematic and 3D cross section views illustrating one or more aspects of a internal stator assembly, in a particular implementation of bi-directional flow, turbine 1002, according to an implementation detailed within this disclosure. In this example, turbine 1002 comprises magnets 1203 (e.g., permanent magnets, etc.), and a stationary internal generator stator assembly 1204, according to a particular implementation. Bi-directional flow, turbine may comprise, in whole or in part, bucket set 1008 that may, in whole or in part, be physically attached to a substantially hollow cylinder 1202. Substantially hollow cylinder 1202 may comprise, in whole or in part, a plurality of magnets 1203 permanent magnets, etc.), that may be physically attached via threaded bolting or other suitable hardware, in whole or in part, around inner diameter of substantially hollow cylinder 1202. Magnets 1203 permanent magnets, etc.), may be in any combination thereof, and/or number or configuration. Bucket set 1008 and substantially hollow cylinder 1202 may, in whole or in part, be supported by bearings 1111. Bearings 1111 may be thrust, roller, ball or liner etc. type bearings, in any combination thereof, and/or number or configuration, as suitable to maintain alignment and/or support of substantially hollow cylinder 1202. Sealed bearings 1111 may be lubricated and sealed or open water lubricated type bearings, and may include, at least and in part, internal or external seals in any combination thereof, and/or number or configuration. Substantially hollow cylinder 1202, supported by bearings 1111, rotation may, in whole or in part, be facilitated by rotational movement of bucket set 1008. Plurality of magnets of substantially hollow cylinder 1202 may, in whole or in part, substantially extend over windings of an internal generator stator assembly 1204. Internal generator stator assembly may, in whole or in part, be stationary to inner turbine casing 1015. Internal generator stator assembly 1204 may be structurally attached, at least or in part, via threaded bolting or other suitable hardware, to support frame 1216. Support frame 1216 may, in whole or in part, be attached via threaded bolting or other suitable hardware, to inner turbine casing 1015. Stationary generator stator assembly 1204 may comprise, for example, winding 1205, which may, at least in part, comprise a three phase Y, or a three-phase delta, or a single phase, winding configuration. Stationary generator stator assembly 1204, may be coated and/or sealed, in whole or in part, to provide as required, electrical insulation and protection against surrounding hydro environment, according to an implementation.

Figure 13A:
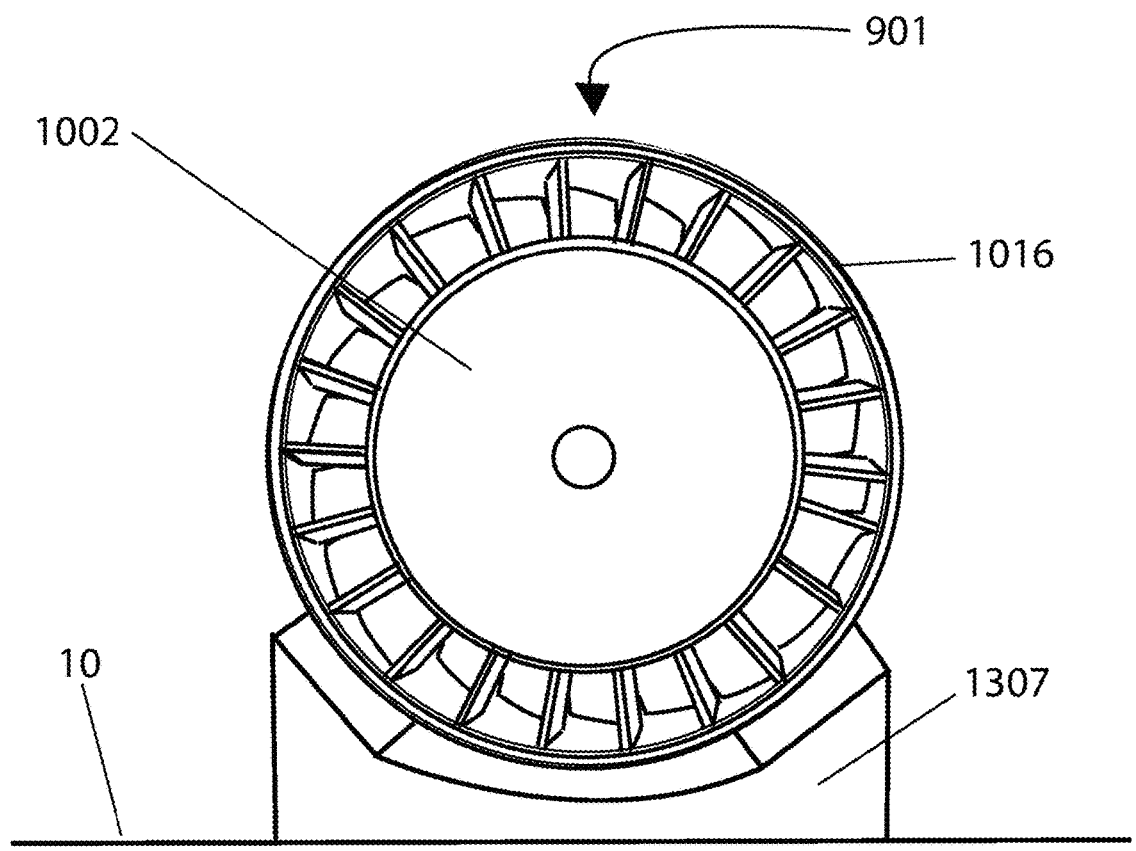
FIG. 13A is a schematic diagram illustrating one or more aspects of an example wave swell energy capture infrastructure bottom-located hydro kinetic turbine, according to an implementation.
Figure 13A:
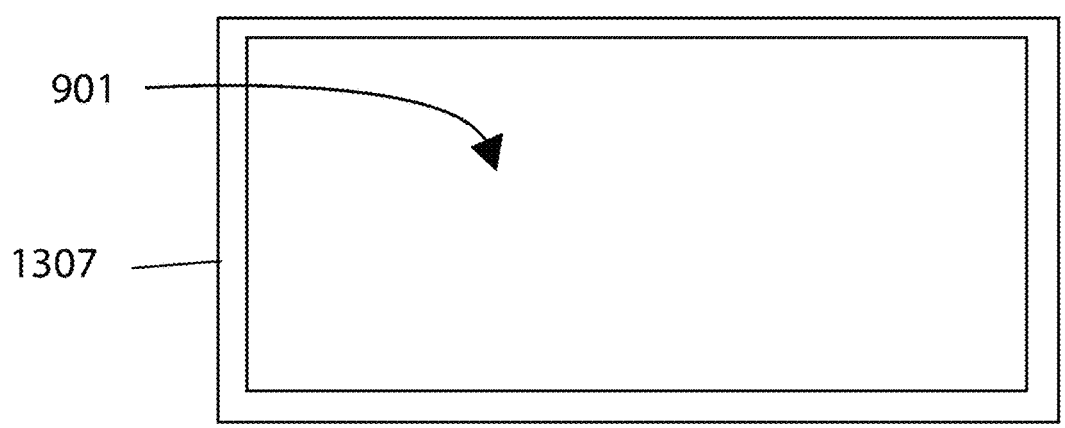

FIG. 13A is a plan and elevation view illustrating one or more aspects of an additional respective example of a particular implementation of wave swell energy capture infrastructure, utilizing hydro kinetic turbine apparatus according to a particular implementation detailed within this disclosure, referenced generally at 901. Illustrated in FIG. 13A, a particular implementation of wave swell energy capture infrastructure may comprise, in whole or in part, a bi-directional flow turbine 1002, within turbine housing 1016 of hydro kinetic turbine apparatus 901. Hydro kinetic turbine apparatus 901, may be physically attached, at least or in part, via threaded bolting or other suitable hardware, to a seabed structure referenced generally at 1307. Seabed structure 1307 may be suitably secured to seabed, ocean floor, lake bottom, or the like, referenced generally via an arrow at 10. Hydro kinetic turbine apparatus 901 may, at least or in part, be aligned parallel to a subsurface hydro flow, such as to facilitate and/or support absorption of wave swell or tidal, energy.

Figure 13B:
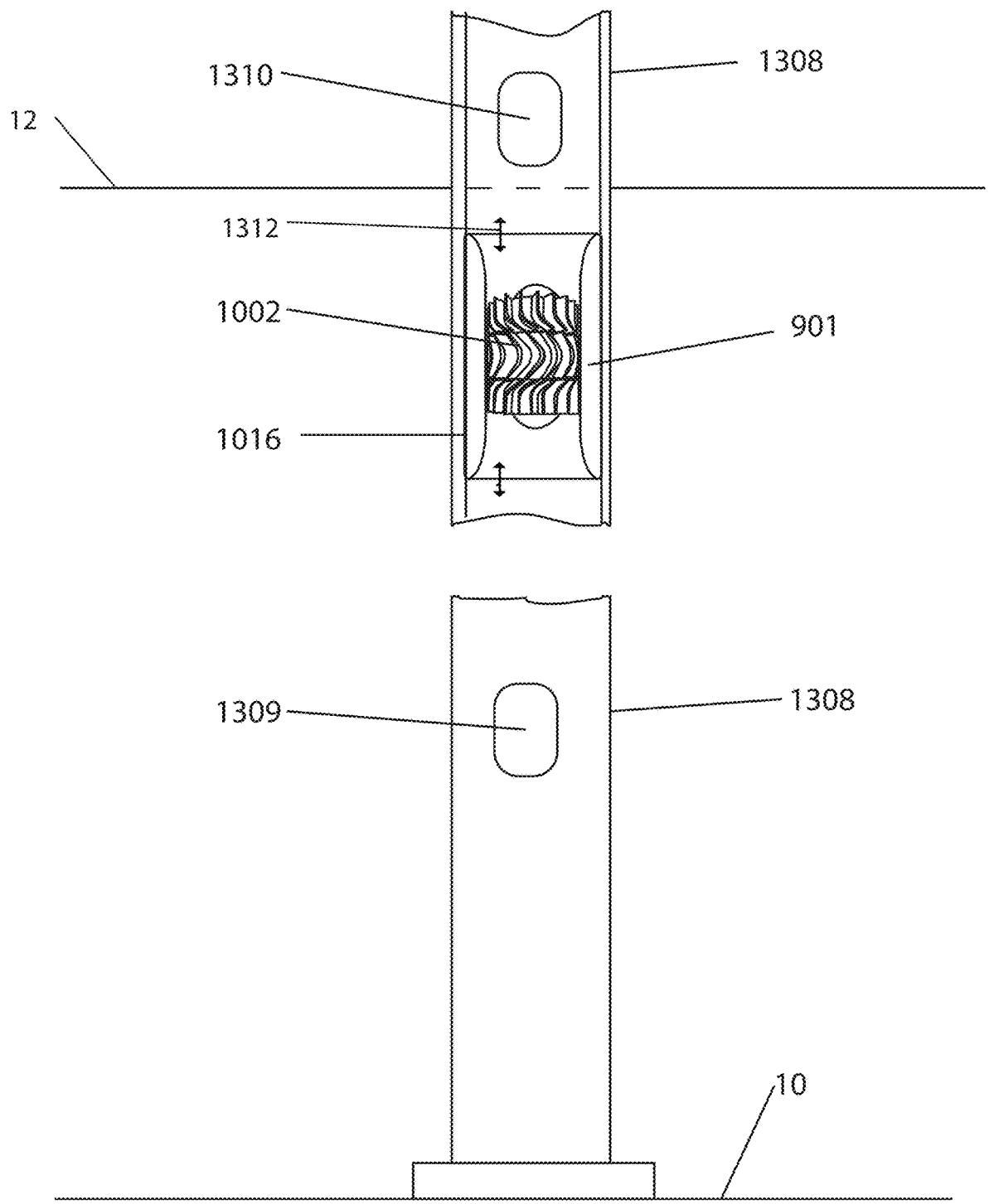
FIG. 13B is a schematic diagram illustrating one or more aspects of an example wave swell energy capture infrastructure, which may comprise a hydro kinetic turbine mounted within a bottom-located subsea structure, according to an implementation.

FIG. 13B is an elevation view illustrating one or more aspects of an additional respective example of a particular implementation of wave swell energy capture infrastructure with a hydro kinetic turbine apparatus, referenced generally at 901. Illustrated in FIG. 13B, hydro kinetic turbine apparatus 901 may comprise, in whole or in part, bi-directional flow turbine 1002, contained, in whole or in part, within turbine housing 1016. Hydro kinetic turbine apparatus 901, may be fixedly attached, for example, via threaded bolting or other suitable hardware, below water surface 12, within a bottom-located (seabed, ocean floor, lake bottom etc. referenced at 10) hollow structure, referenced generally at 1308. Hollow structure 1308 may be suitable secured, via concrete foundation and fasteners, to a seabed, ocean floor, lake bottom, and/or the like. Hollow structure 1308 may be, in whole or in part, a standalone structure, or part of a support substructure, as for example, a support substructure for a wind turbine tower. Hollow structure 1308 may, at least in part, be fitted with screened inlets 1309 and vents 1310, or other suitable openings to allow water, in whole or in part, to flow as indicated by arrows 1312, through bi-directional flow turbine 1002, with raise and fall of a water surface 12, such as to facilitate and/or support absorption of wave swell energy, according to an implementation.

Figure 14A:
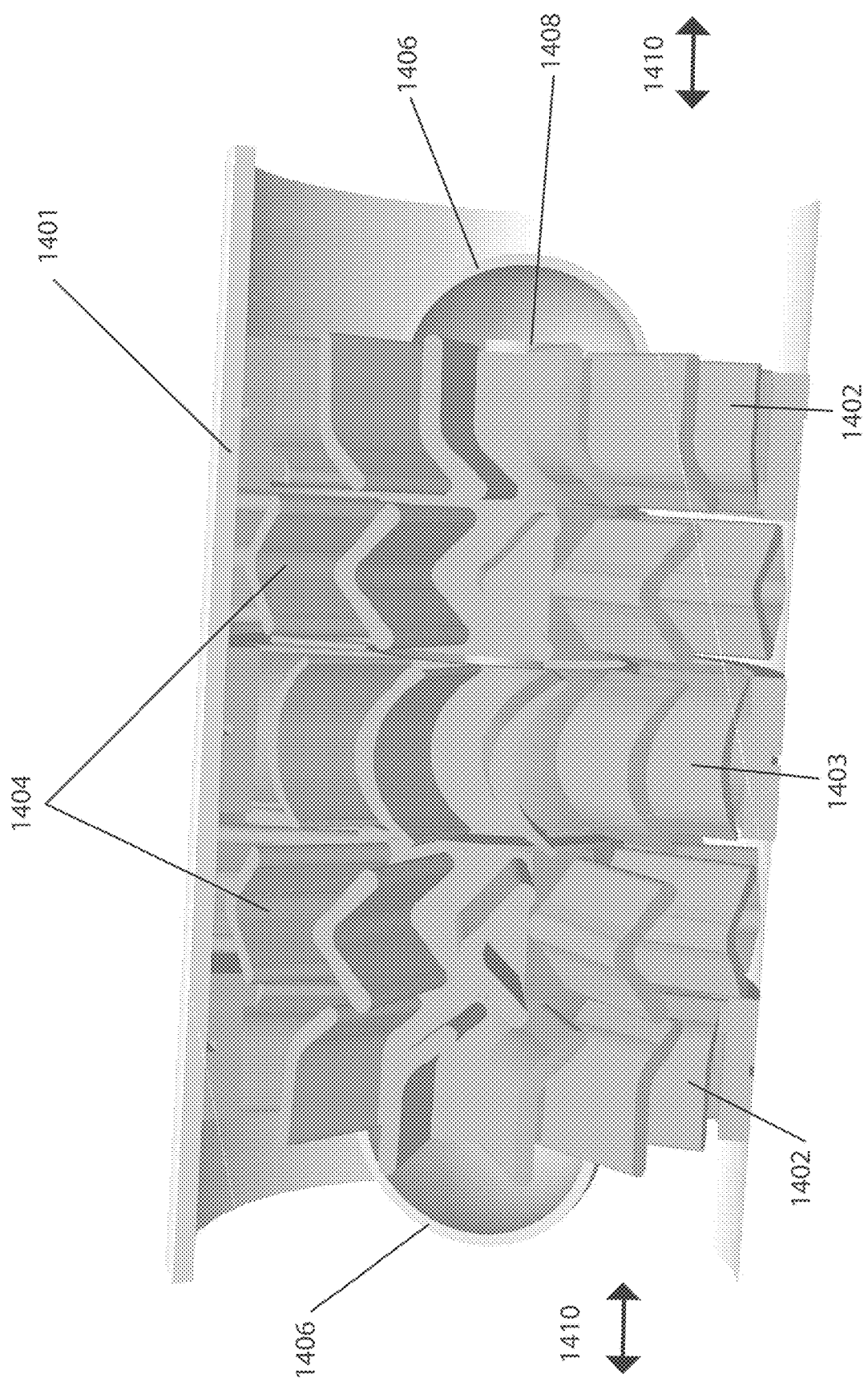
FIG. 14A is a 3D illustration of a test model of a single shaft two stage hydro kinetic impulse turbine, according to an implementation.
Figure 14B:
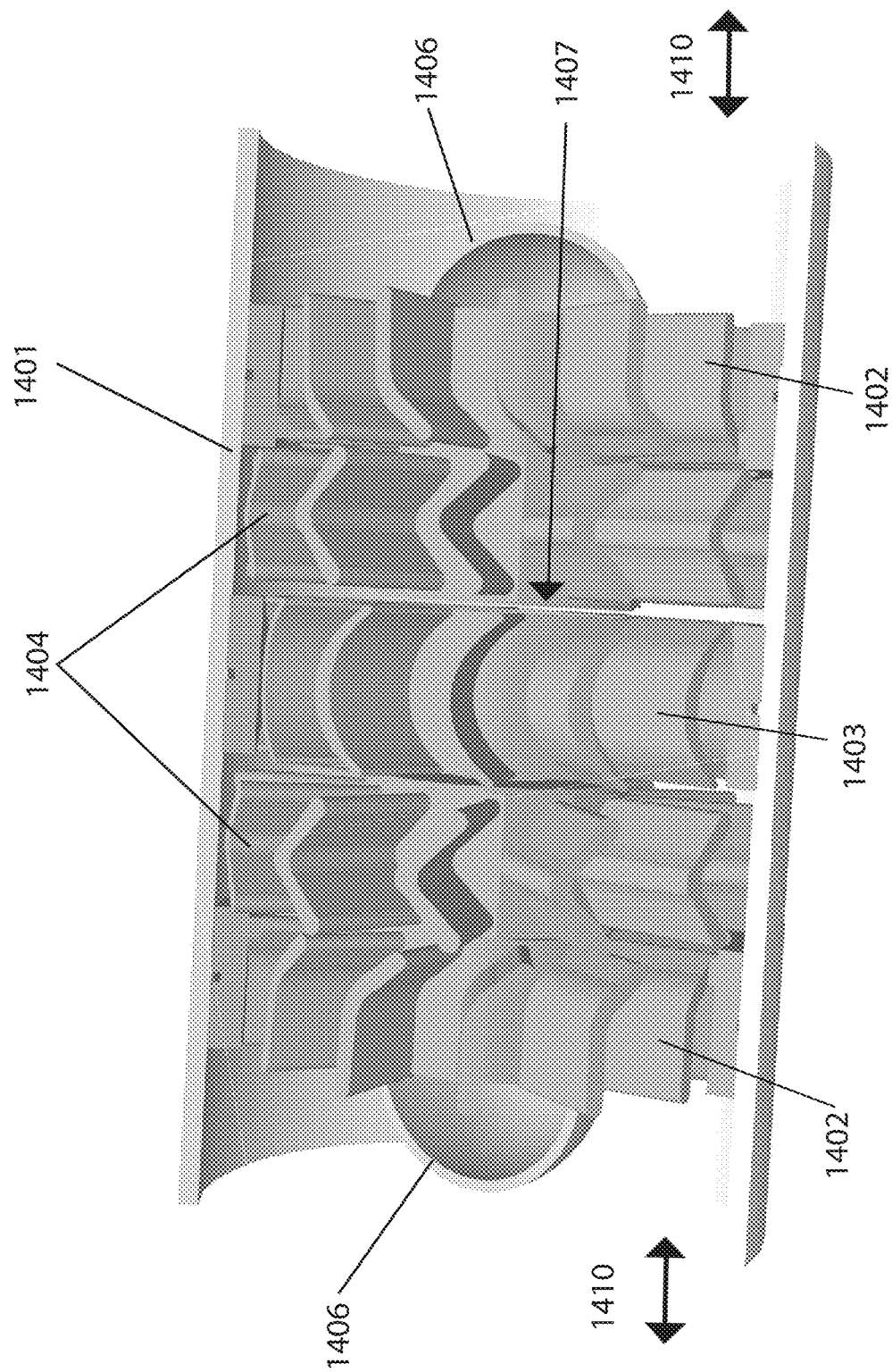
FIG. 14B is a 3D illustration of a test model of a dual shaft two stage hydro kinetic impulse turbine according to an implementation.
Figure 14C:
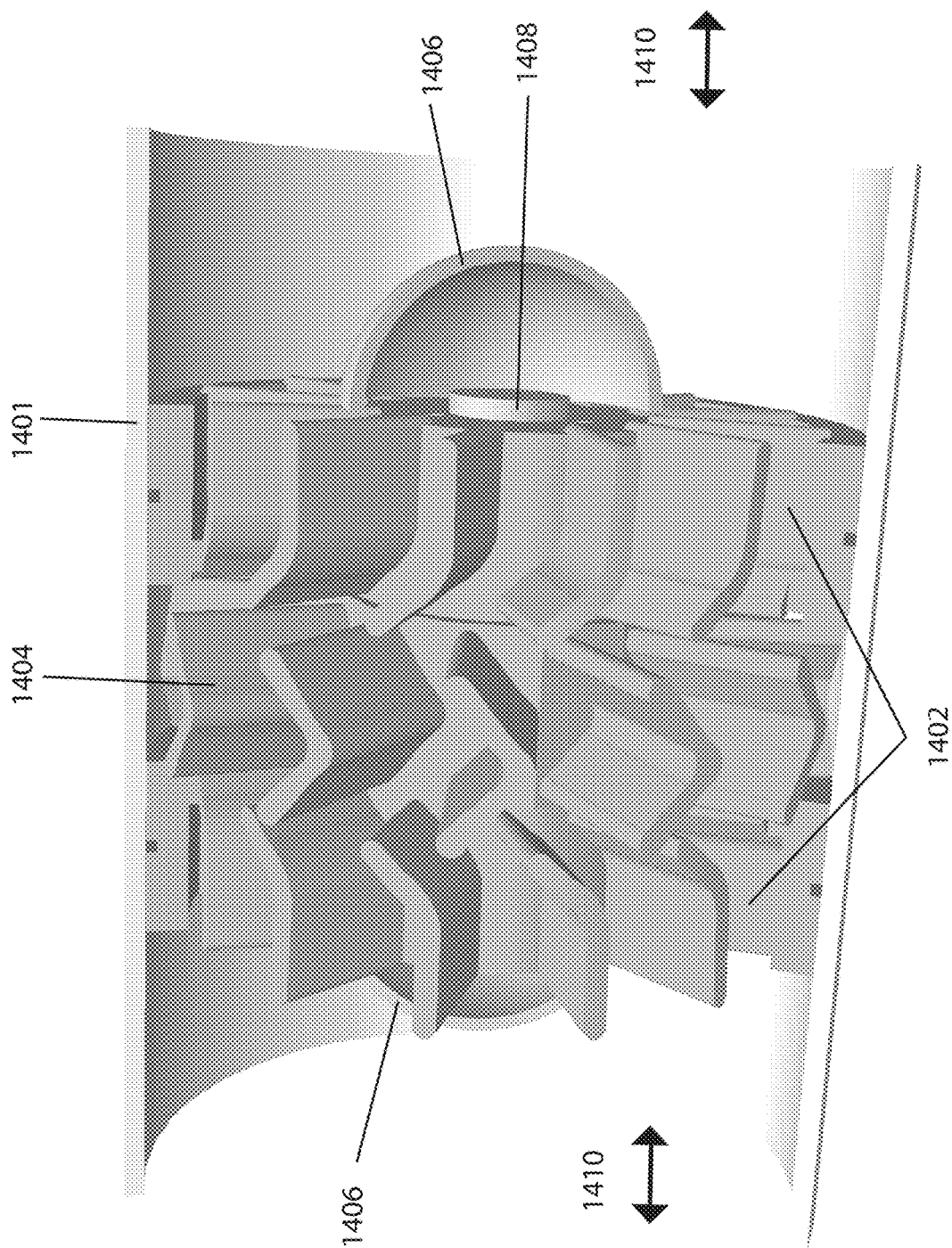
FIG. 14C is a 3D illustration of a test model of a single shaft single stage hydro kinetic impulse turbine, according to an implementation.

Test methods and procedures that may be capable of obtaining data that may be utilized to observe, compare, and analyze concepts, operation, configuration, features, physical attributes, and/or advantages thereof, of particular wave capture infrastructure implementations described within this disclosure, may best be understood by reference to the following detailed description of illustrations, if read with the accompanying FIGS. 14A through 18 in which:

FIGS. 14A through 14C are 3D illustrations of three examples of different hydro kinetic impulse turbine models according to particular implementations detailed within this disclosure. Turbine models may, in whole or in part, be capable of gathering data which may be utilized to analyze and evaluate possible benefits and/or limitations of different turbine bucket and guide-vane nozzle configurations for use in wave capture infrastructure implementations discussed within this disclosure.

FIG. 14A is a model of a single shaft two stage hydro kinetic impulse turbine according to a specific implementation. Single shaft two stage hydro kinetic impulse turbine comprises, as example, two sets of rotating buckets 1404, two sets of stationary guide-vane nozzles 1402, one set of stationary inter-stage guide-vane nozzles 1403, outer casing 1401, internal rotating shaft 1408, and non-rotating inlet cones 1406. Hydro flow 1410 through single shaft two stage hydro kinetic impulse turbine model may be, in whole or in part bi-directional. Stationary guide-vane nozzles 1402 and stationary inter-stage guide-vane nozzles 1403 are designed direct hydro flow in a way that may, in whole or in part, result in rotating buckets 1404 in a single direction, regardless of direction of hydro flow. Both sets of rotating buckets 1404 are attached to and rotate with internal rotating shaft 1408.

FIG. 14B is a model of a dual shaft two stage hydro kinetic impulse turbine according to a specific implementation. Dual shaft two stage hydro kinetic impulse turbine model comprises, as example, two sets of rotating buckets 1404, two sets of stationary guide-vane nozzles 1402, one set of stationary inter-stage guide-vane nozzles 1403, outer casing 1401, two independent internal rotating shafts, and nonrotating inlet cones 1406. Hydro flow 1410 through turbine may be, in whole or in part bi-directional. Stationary guide-vane nozzles 1402 and internal stationary inter-stage guide-vane nozzles 1403 are designed to direct hydro flow in a way that may, in whole or in part, result in rotating buckets 1404 in a single direction, regardless of direction of hydro flow. Both sets of rotating buckets 1404 are attached to and rotate independently from one another on their corresponding internal rotating shafts with shaft separation indicated by 1407 in illustration 14B.

FIG. 14C is a model of a single shaft single stage hydro kinetic impulse turbine according to a specific implementation. Single shaft single stage hydro kinetic impulse turbine model may, for example, comprises one set of rotating buckets 1404, two sets of stationary guide-vane nozzles 1402, outer casing 1401, one internal rotating shaft 1408, and non-rotating inlet cones 1406. Hydro flow 1410 through turbine may be, in whole or in part, bi-directional. Stationary guide-vane nozzles 1402 are designed to direct hydro flow in a way that may result in rotating buckets 1404 in a single direction, regardless of direction of hydro flow. Rotating buckets 1404 are attached to and rotate with internal rotating shaft 1408.

Figure 15A:
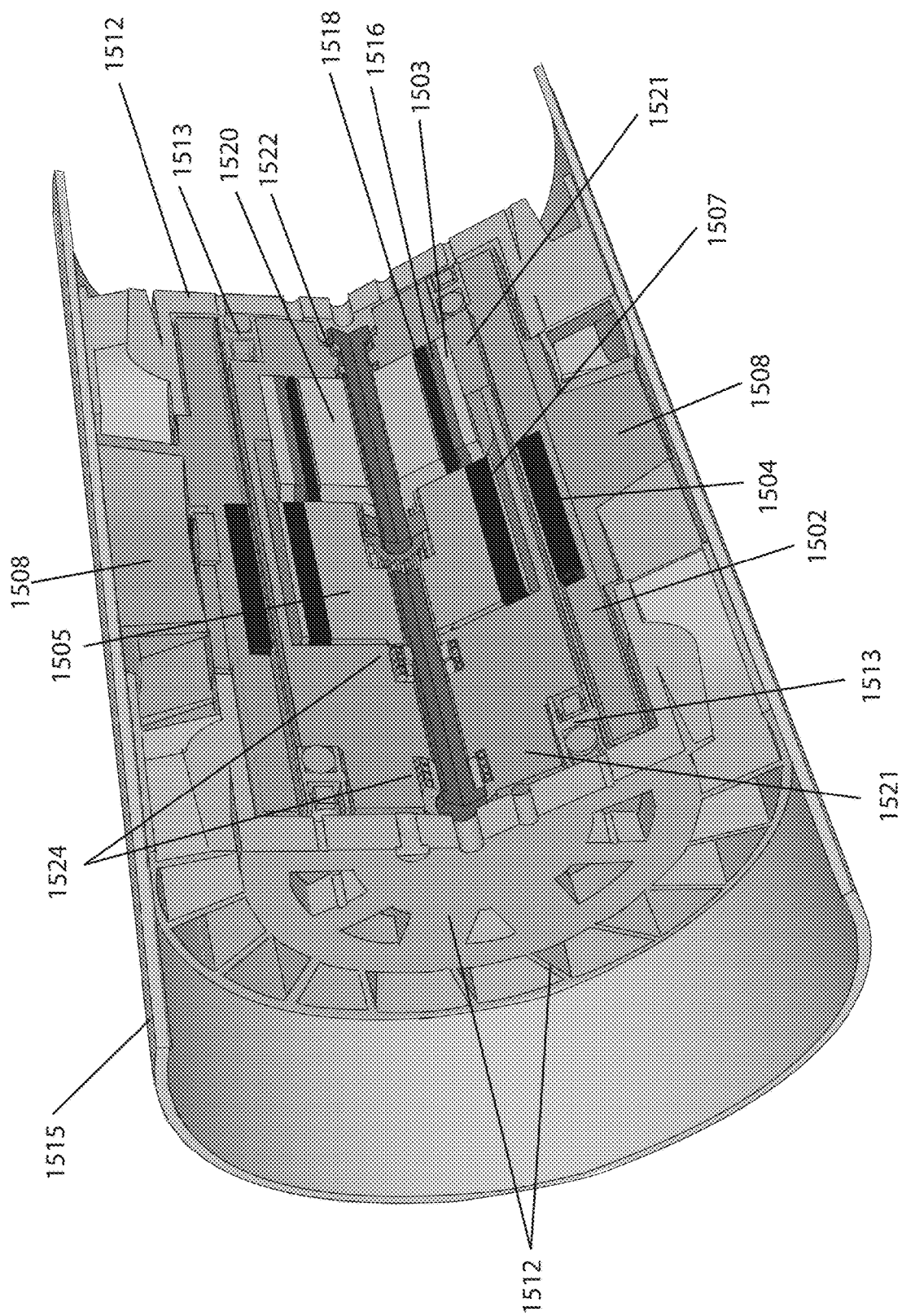
FIG. 15A is a 3D illustration of a cross-sectional diagram of a test model of a bi-directional flow hydro kinetic turbine with a magnetically coupled drive rotor assembly driven generator, according to an implementation.
Figure 15B:
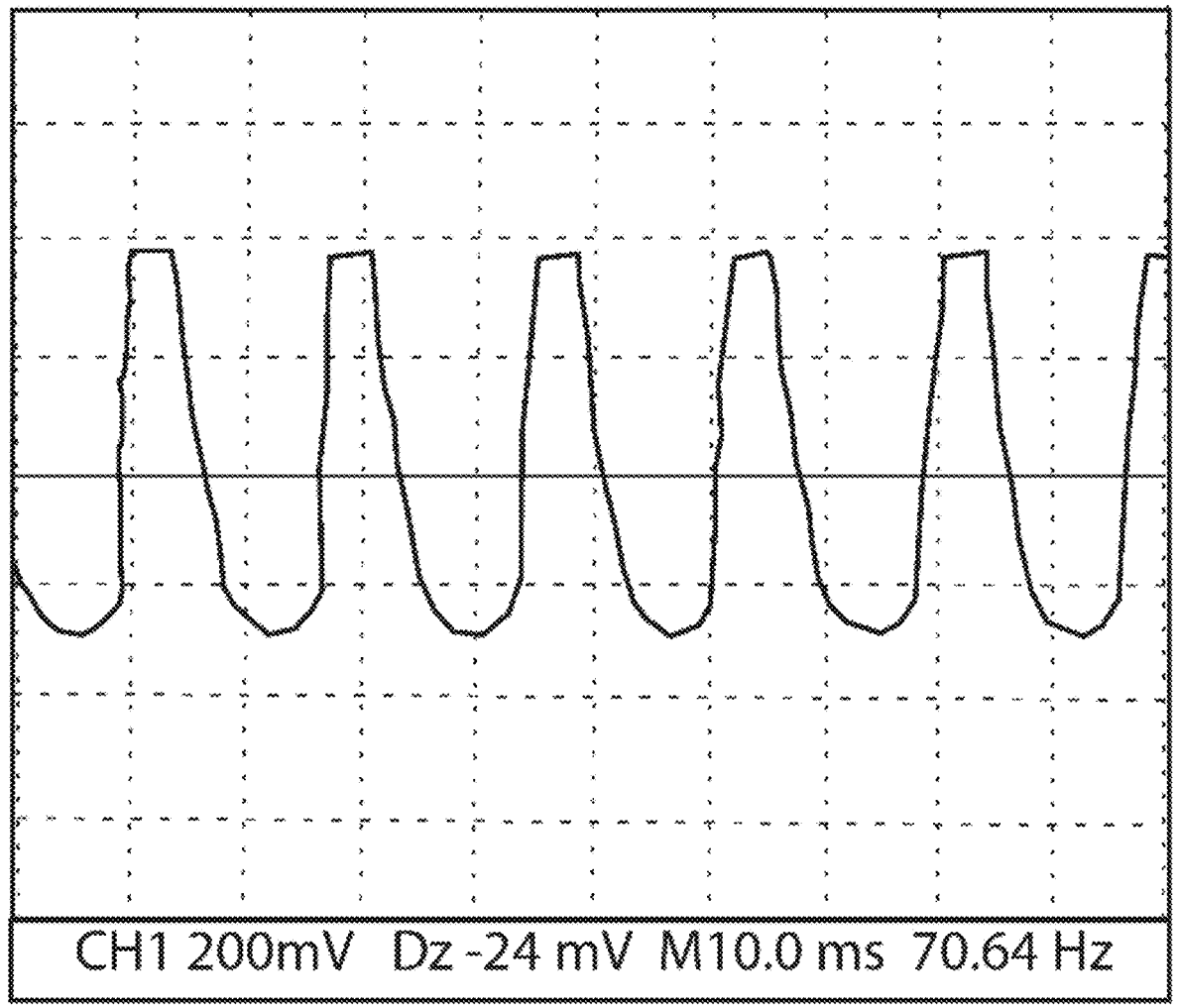
FIG. 15B is an illustration of trace of oscilloscope patterns observed during testing of a bi-directional flow hydro kinetic turbine with a magnetically coupled drive rotor assembly driven generator, according to an implementation.

FIG. 15A is a 3D illustration of a cross-section of a test model of a bi-directional flow, hydro kinetic turbine, with a magnetically coupled rotor assembly driven generator, according to a particular implementation detailed within this disclosure. A hydro kinetic turbine generator model, as illustrated, for example in FIG. 15A, may be capable of obtaining data, that may be utilized to observe, compare, and analyze concepts, operation, configuration, features, physical attributes, and/or advantages thereof, of a particular wave capture infrastructure implementation detailed within this disclosure. A hydro kinetic turbine generator model, as illustrated, for example in FIG. 15A may, in whole or in part, comprise an internal sealed stationary cylindrical chamber 1521. Stationary internal sealed cylindrical chamber 1521, may for example, be fixedly attached to stationary end guide-vane nozzle assemblies 1512. Stationary internal sealed cylindrical chamber 1521 may comprise, as illustrated in this example, a rotating drive rotor assembly 1505 and a permanent magnet generator 1503. One end of stationary internal sealed cylindrical chamber 1521 may comprise drive rotor assembly 1505 support bearings 1524.

Opposite end of stationary internal sealed cylindrical chamber 1521 may comprise permanent magnet generator 1503. Permanent magnet generator may, for example, comprise stationary stator 1516, and rotating field assemble 1520. Rotating field assembly 1520 contains permanent magnets 1518 and may, in whole or in part, be supported by bearings 1522. Permanent magnet generator 1503 may, in whole or in part, be connected to and driven by drive rotor assembly 1505. Drive rotor assembly 1505 includes permanent magnets 1507 that may be fixedly attached around circumference of drive rotor assembly 1505. Surrounding stationary internal sealed cylindrical chamber 1521, may be rotating hollow cylinder 1502 that may, in whole or in part, contain permanent magnets 1504. Rotating hollow cylinder 1502 may, in whole or in part, be supported by bearings 1513, located on end of hollow cylinder 1502. A set of rotating buckets 1508 may, in whole or in part, be attached to and rotate with hollow cylinder 1502. End guide-vane nozzle assemblies 1512 may, in whole or in part, be attached to turbine outer, non-rotating, casing 1515. End guide-vane nozzle assembly 1512 may, in whole or in part, direct hydro flow into rotating buckets 1508. Rotating buckets 1508 may result in rotation of hollow cylinder 1502. Permanent magnets 1504 that may, in whole or in part, be attached to hollow cylinder 1502 may, in whole or in part, magnetically couple with permanent magnets 1507, attached, in whole or in part, to drive rotor assembly 1505, and operationally result in drive rotor assembly 1505 to rotate in sync with hollow cylinder 1502. Rotation of drive rotor assembly 1505 may, in whole or in part, operationally rotate permanent magnet generator 1503.

Figure 16A:
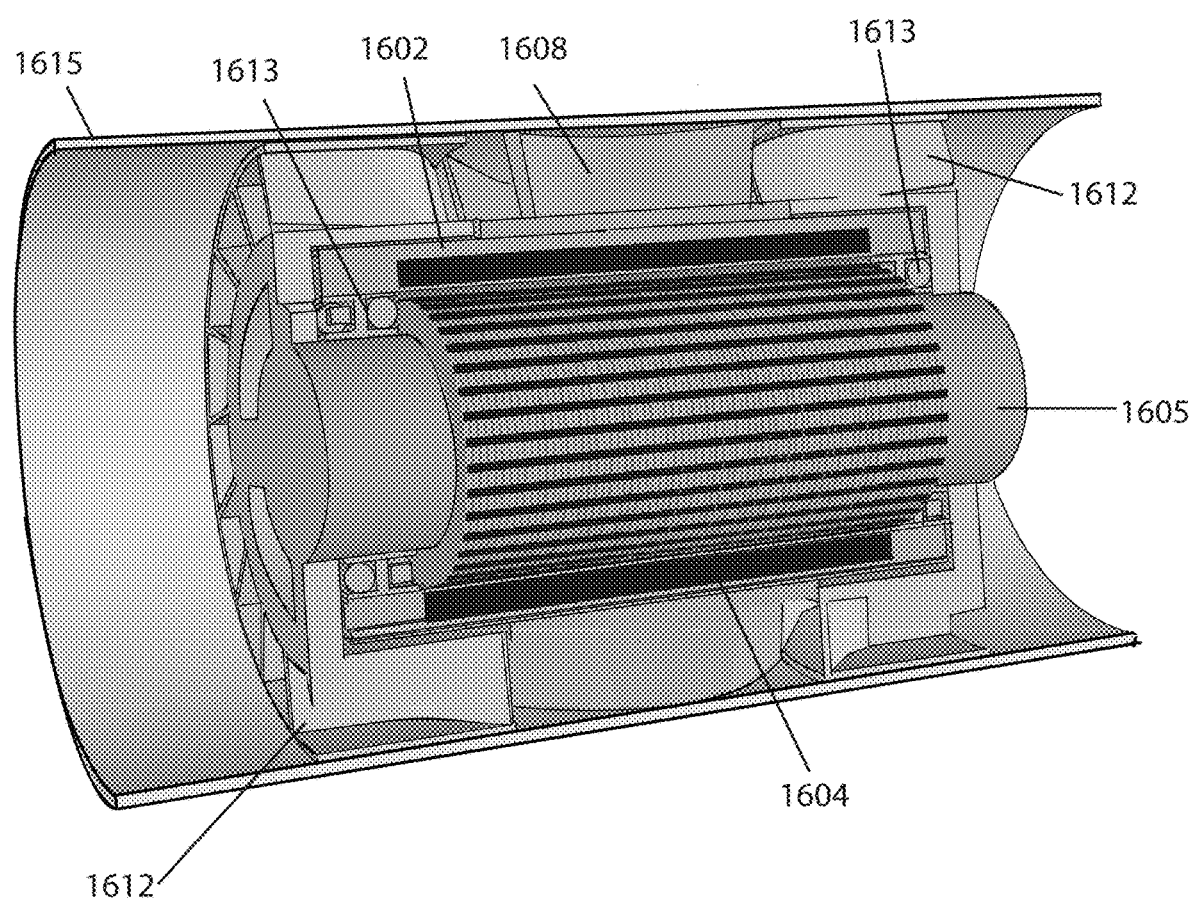
FIG. 16A is a 3D illustration of a cross-sectional diagram of a test model of a bi-directional flow hydro kinetic turbine with an internal generator stator assembly, according to an implementation.

FIG. 16A is a cross-section 3D illustration of a test model bi-directional flow, hydro kinetic turbine, with a internal stationary stator assembly, according to a particular implementation detailed within this disclosure. A hydro kinetic turbine generator model as illustrated, for example in FIG. 16A, may be capable of obtaining data that may be utilized to observe, compare, and analyze concepts, operation, configuration, features, physical attributes, and/or advantages thereof, of a particular wave capture infrastructure implementation detailed within this disclosure. A hydro kinetic turbine generator model, illustrated as an example in FIG. 16A may, in whole or in part, comprise a stationary stator 1605 that may, in whole or in part, be attached to and supported by non-rotating end guide-vane nozzle assemblies 1612. Surrounding stationary stator 1605 may, for example, be rotating hollow cylinder 1602 that may comprise permanent magnets 1604. Rotating hollow cylinder 1602 may, in whole or in part, be supported by bearings 1613, located on end of hollow cylinder 1602. A set of rotating buckets 1608 may, in whole or in part, be attached to and rotate with hollow cylinder 1602. End guide-vane nozzle assemblies 1612 may, in whole or in part, be attached to turbine outer, non-rotating casing 1615. End guide vanes-nozzle assemblies 1612 may, in whole or in part, direct hydro flow into rotating buckets 1608. Rotating buckets 1608 may, at least and in part, result in rotation of hollow cylinder 1602. Rotating of permanent magnets 1604, comprised within hollow cylinder 1602 may, in whole or in part, form a rotating magnetic field around stationary stator 1605. Stationary stator 1605 may, for example, be constructed out of thin laminated steel plates each separated by insulating paper. Stationary stator 1605 may have, at least in part, one or more parallel grooves cut around periphery of stationary stator 1605. In one example model, twelve parallel grooves were cut around periphery of stationary stator 1605. In example model, six coils comprising of two insulated copper wires per coil, were secured within outer parallel grooves of stationary stator 1605. A rotating magnetic field, formed as a result of plurality of magnets 1604 within rotating hollow cylinder 1602 may, in whole or in part, produce electromagnetic induction induced voltage in stator coils located in internal stationary stator assembly 1605.

Figure 16B:
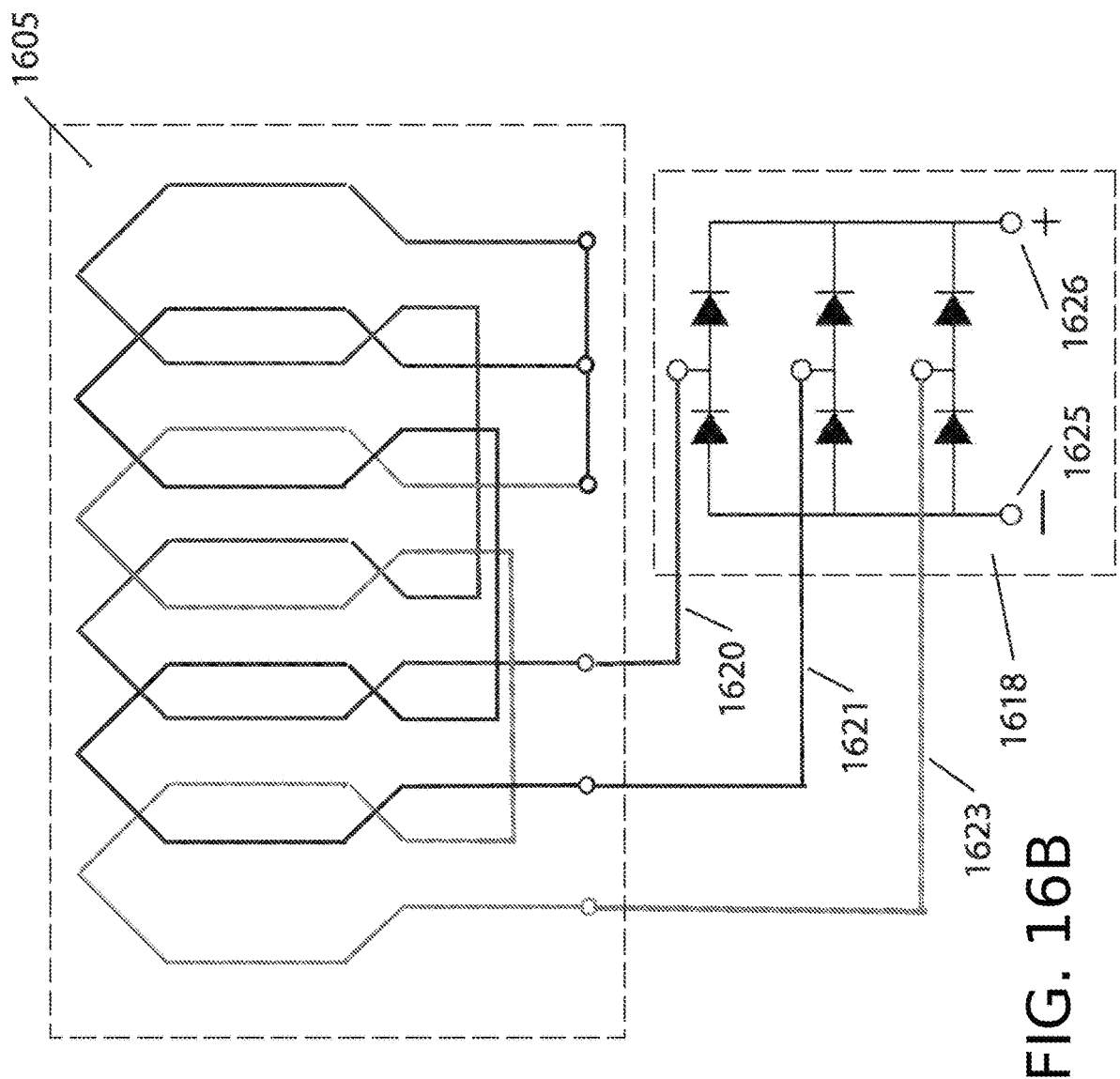
FIG. 16B is a schematic diagram of an example stationary three phase wound stator, including a three-phase rectifier, according to an implementation.
Figure 16C:
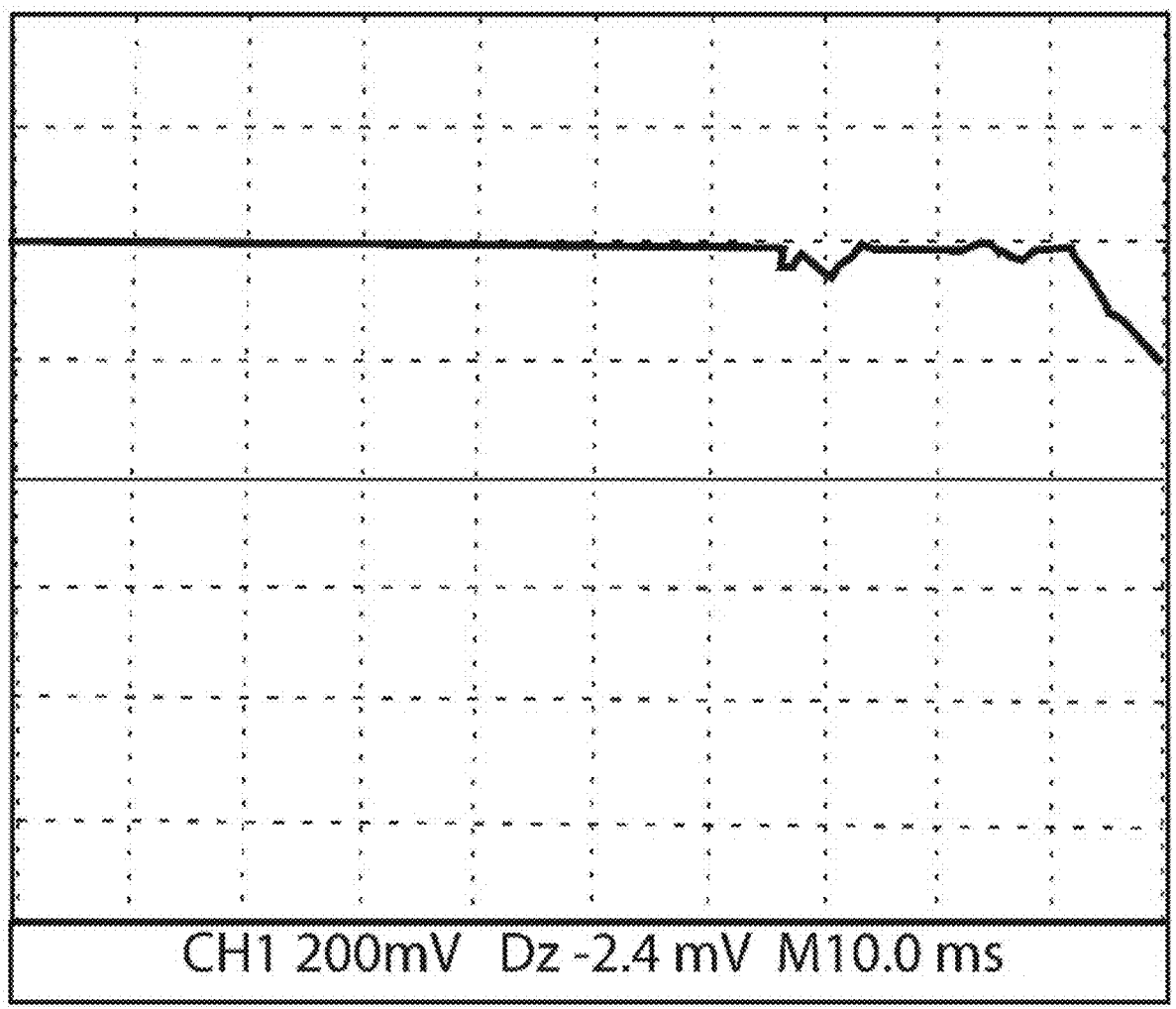
FIG. 16C is an illustration of trace of oscilloscope patterns observed during testing of a model of a bi-directional flow hydro kinetic turbine with an internal generator stator assembly, according to an implementation.

FIG. 16B is an example electrical schematic of stationary three phase wound stator, including a three-phase rectifier, according to a particular implementation detailed within this disclosure. Illustrated for example, in FIG. 16B, stationary stator referenced at 1605 may, for example, comprise a three phase Y wound stator, with phase one referenced at 1620, phase two referenced at 1621, and phase three referenced at 1623. All three phases, in this illustrated example of stator 1605, are shown connected to rectifier referenced at 1618, with rectifier DC positive voltage connection referenced at 1626 and DC negative voltage connection referenced at 1625.

FIG. 17A through FIG. 17I are illustrations of a test stand that may be capable of simulating and testing one or more operations of different example configurations of wave swell energy capture infrastructure implementations discussed within this disclosure. Different configurations use different combinations of components that may include, in whole or in part, surface flotation apparatus, dual cable drum apparatus, seabed mounted subsea pulley assembly, or surface flotation apparatus mounted subsea pulley assembly, tensioning apparatus, and power conversion apparatus.

Figure 17A:
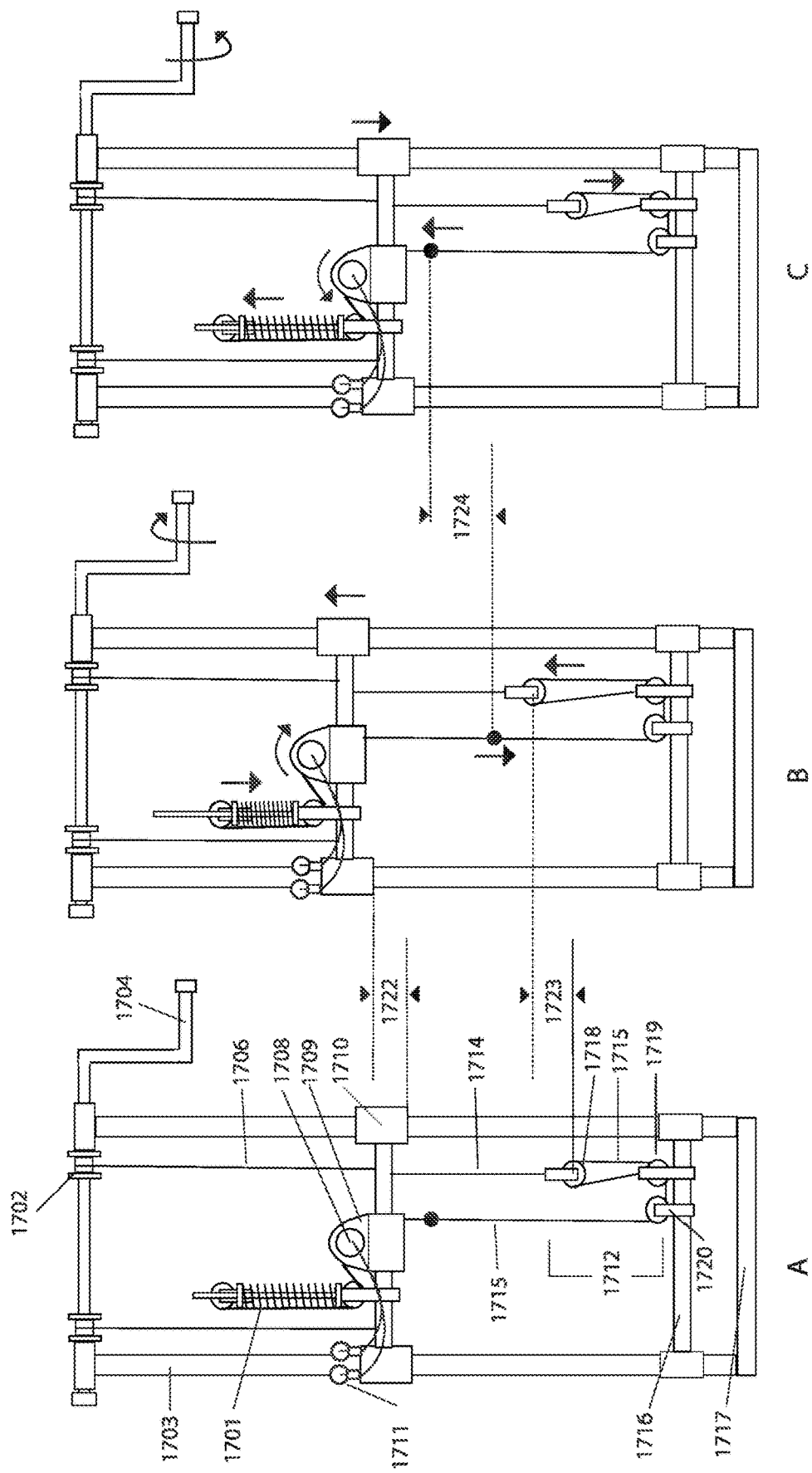
FIG. 17A is an illustration of equipment that may be employed to simulate, observe, and/or test operation of a wave swell energy capture infrastructure comprising a surface flotation apparatus, dual cable drum apparatus, seabed mounted subsea pulley assembly, tensioning apparatus, and electric generator, according to an implementation.
Figure 17B:
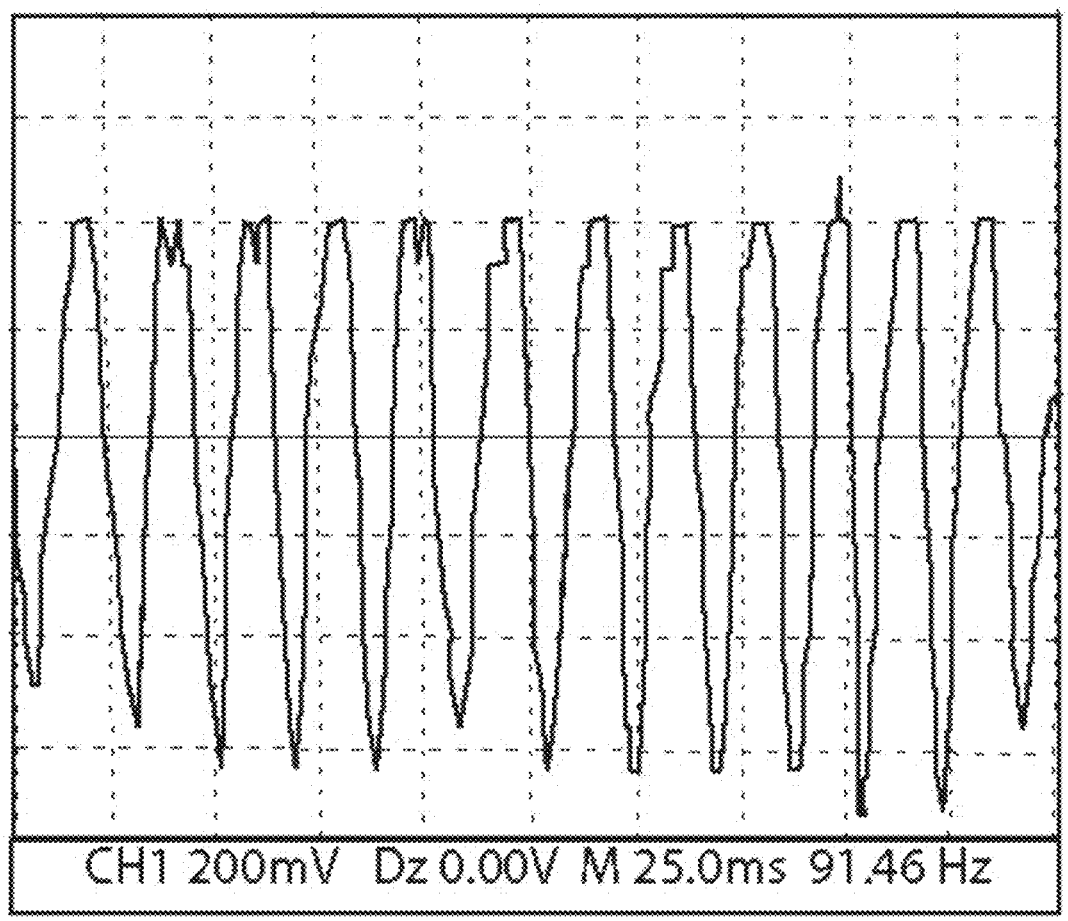
FIG. 17B is an illustration of a trace of oscilloscope patterns observed during testing of equipment used to simulate, observe, and/or test operation of a wave swell energy capture infrastructure comprising a surface flotation apparatus, dual cable drum apparatus, seabed mounted subsea pulley assembly, tensioning apparatus, and electric generator, according to an implementation.
Figure 17C:
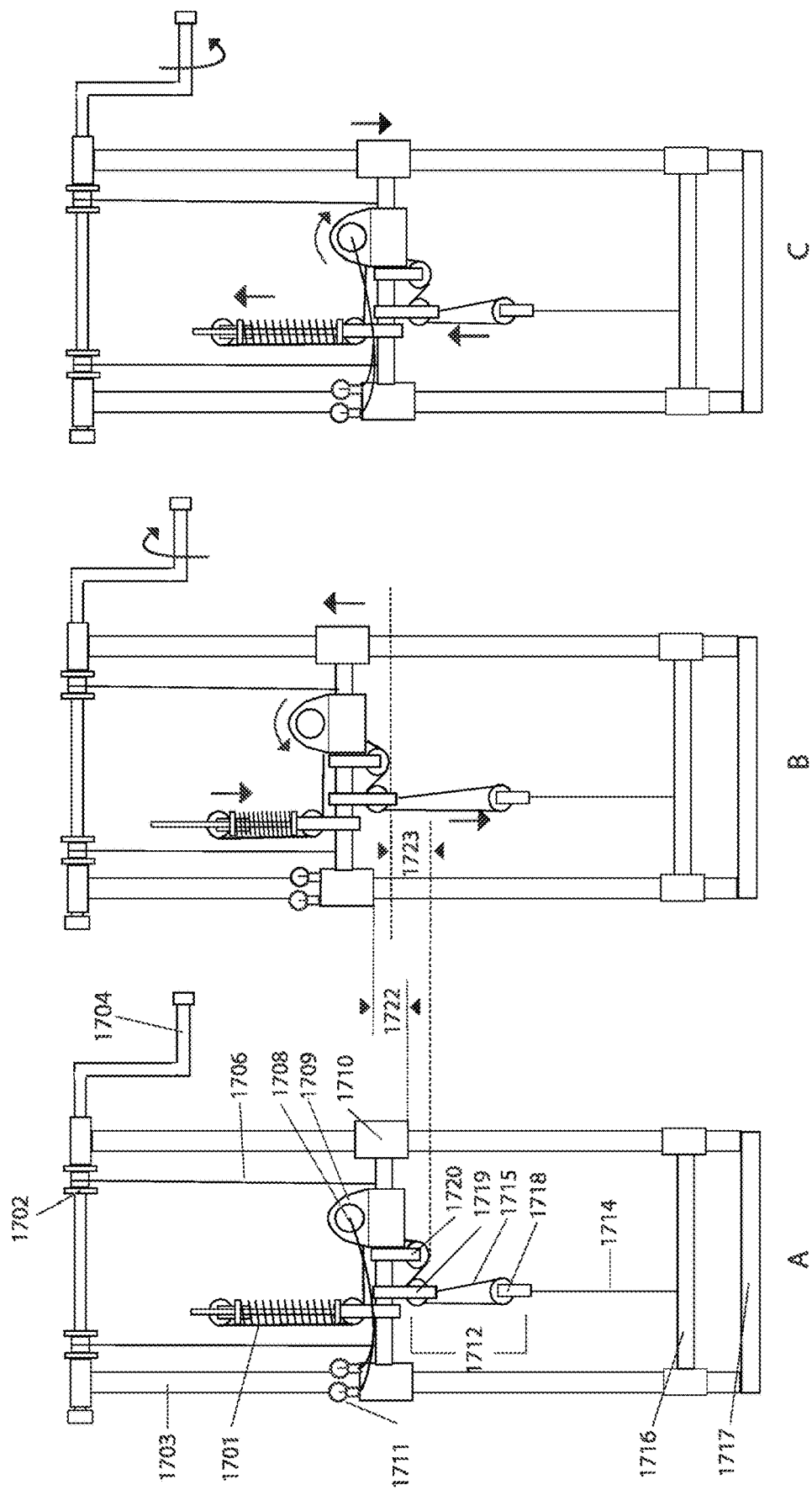
FIG. 17C is a sequence of illustrations of equipment used to simulate, observe, and/or test operation of a wave swell energy capture infrastructure comprising surface flotation apparatus, dual cable drum apparatus, surface flotation apparatus mounted subsea pulley assembly, tensioning apparatus, and electric generator, according to an implementation.
Figure 17D:
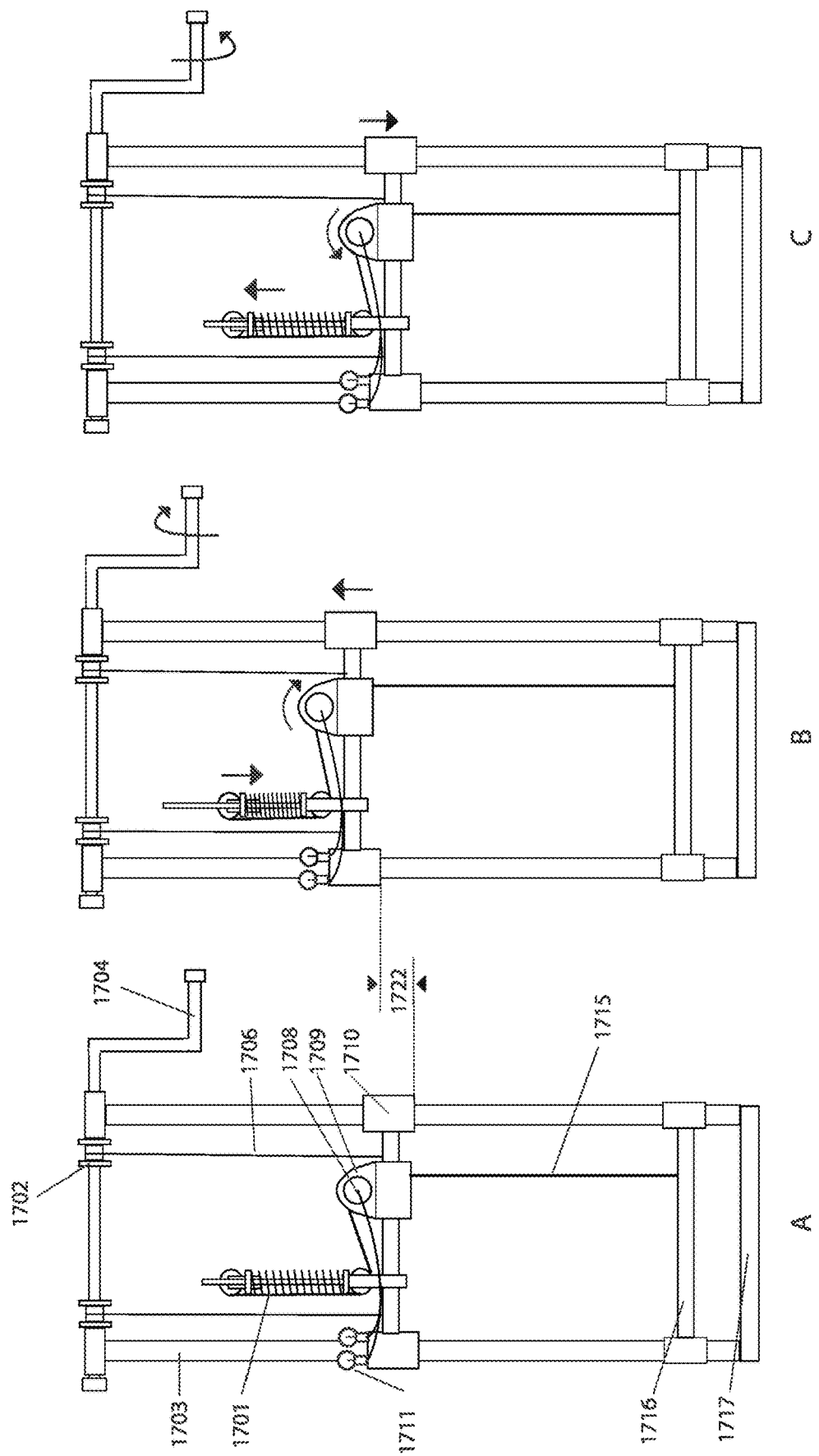
FIG. 17D is a sequence of illustrations of equipment used to simulate, observe and/or test operation of a wave swell energy capture infrastructure comprising surface flotation apparatus, dual cable drum apparatus, tensioning apparatus, and electric generator, according to an implementation.
Figure 17E:
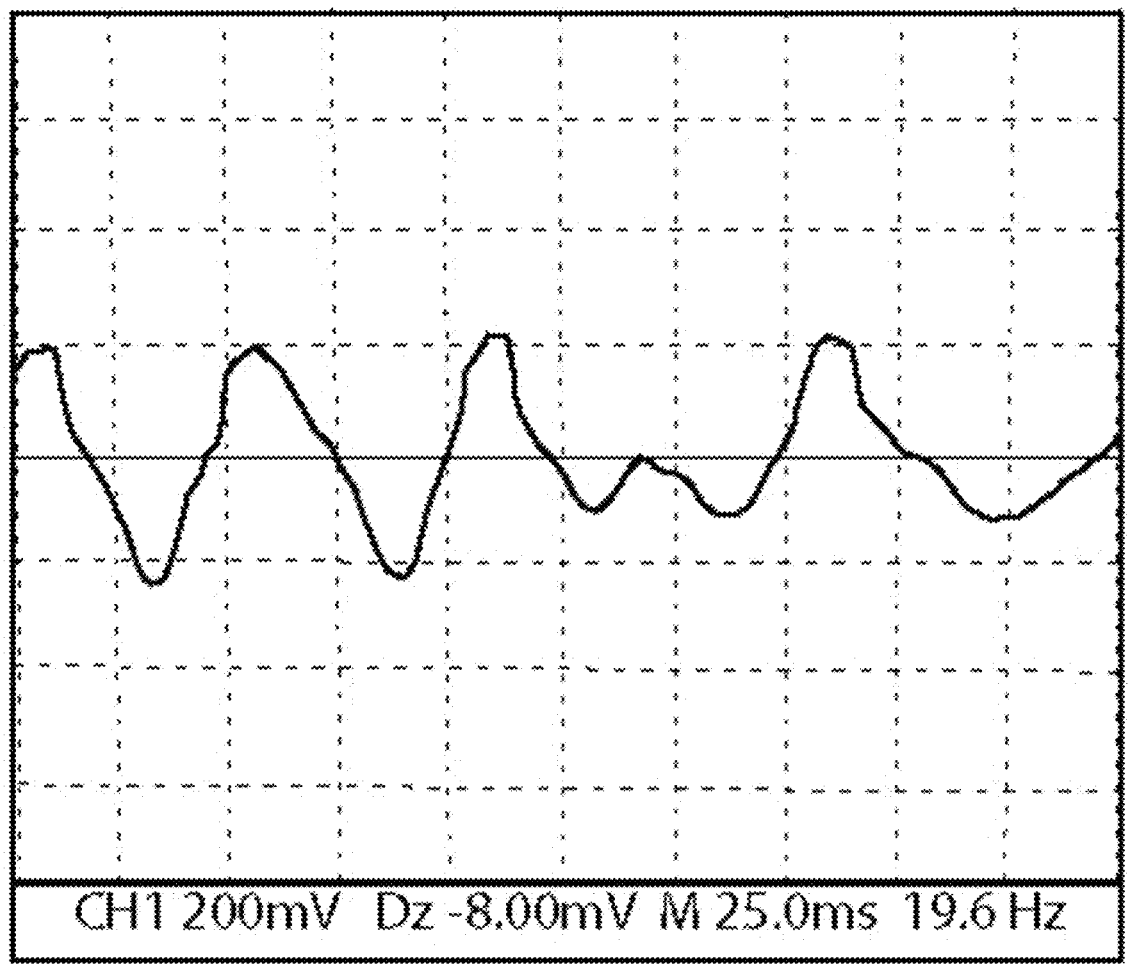
FIG. 17E is an illustration of trace of oscilloscope patterns observed during testing of equipment used to simulate, observe, and/or test operation of a wave swell energy capture infrastructure comprising surface flotation apparatus, dual cable drum apparatus, and electric generator, according to an implementation.
Figure 17F:
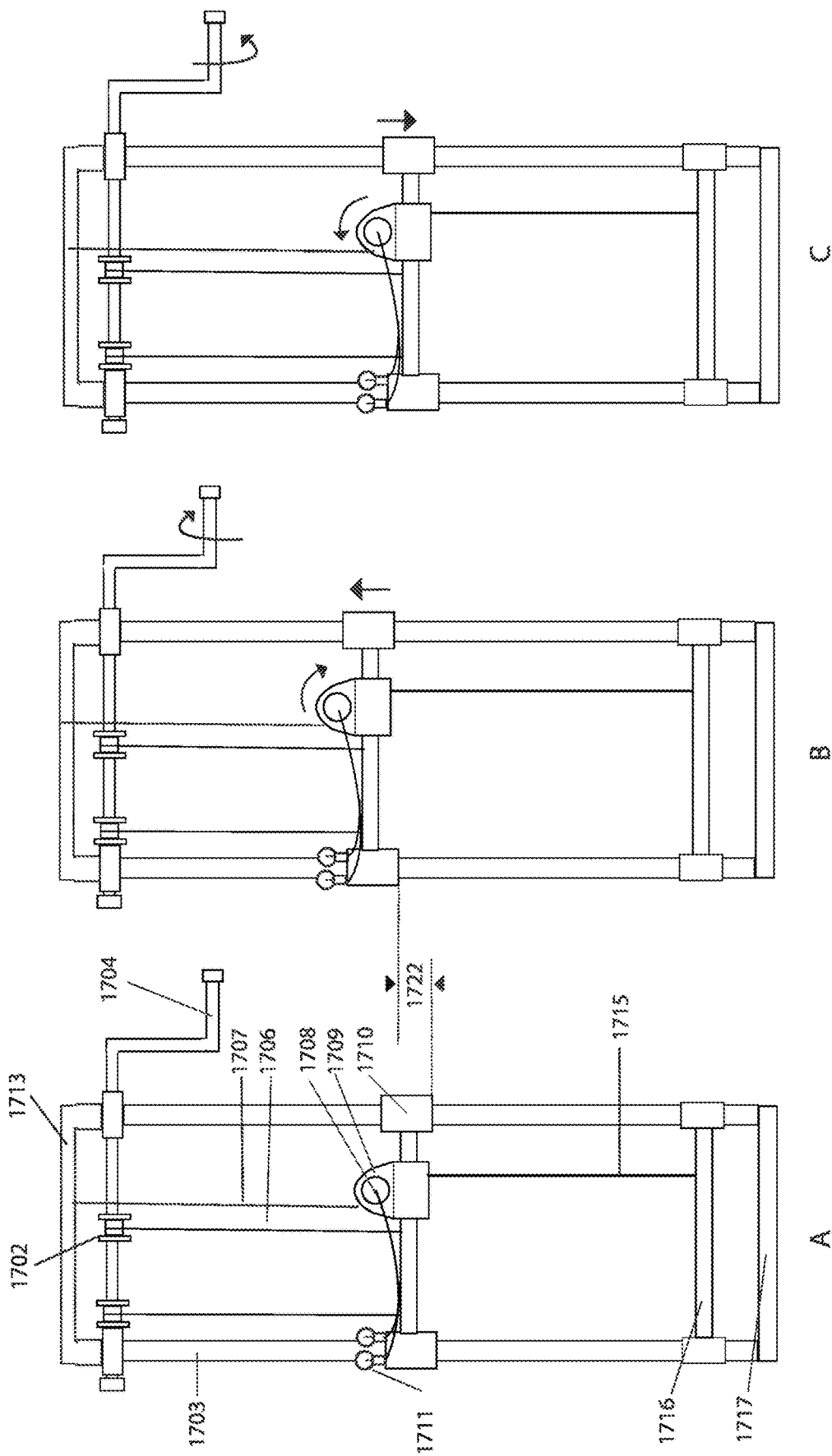
FIG. 17F is a sequence of illustrations of equipment used to simulate, observe, and/or test operation of a wave swell energy capture infrastructure comprising surface flotation apparatus, dual cable drum apparatus, and electric generator, according to an implementation.
Figure 17G:
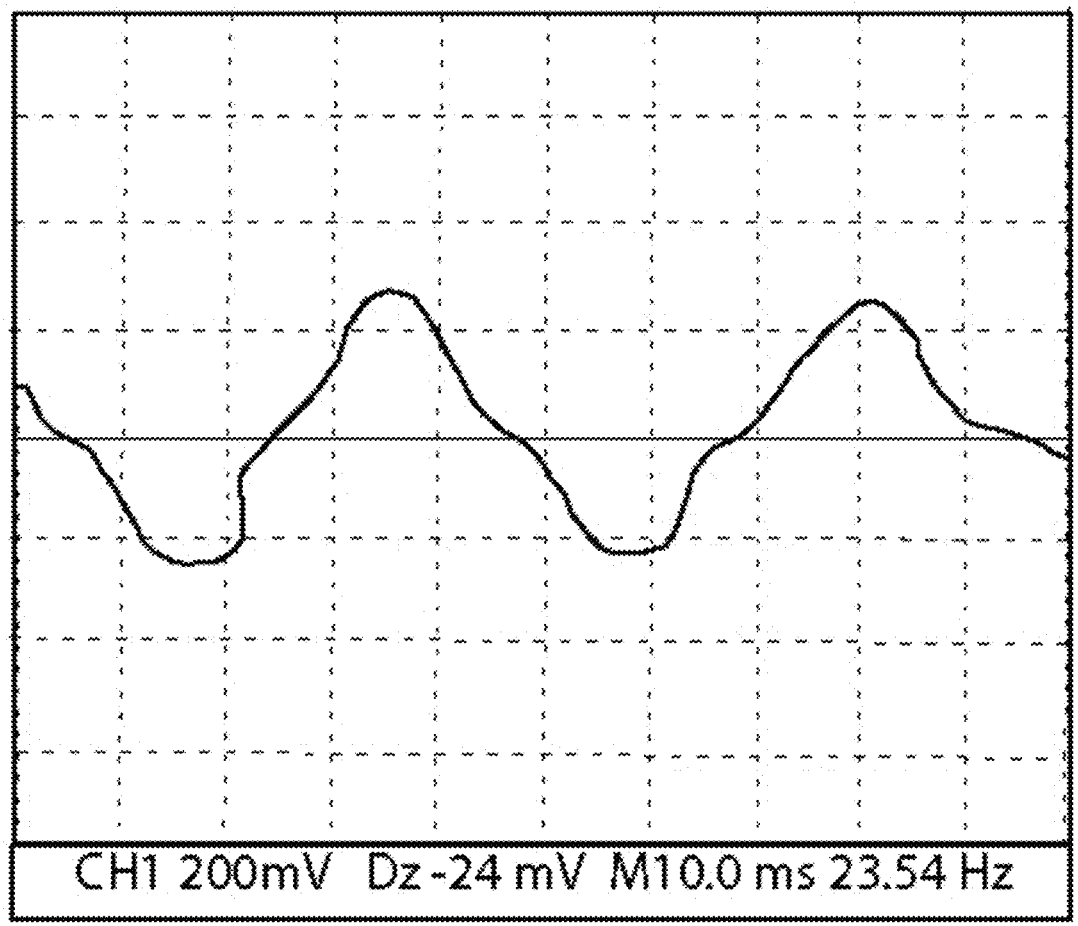
FIG. 17G is an illustration of trace of oscilloscope patterns observed during first part of testing cycle of equipment used to simulate, observe and/or test operation of a wave swell energy capture infrastructure comprising surface flotation apparatus, dual cable drum apparatus, and electric generator, according to an implementation.
Figure 17H:
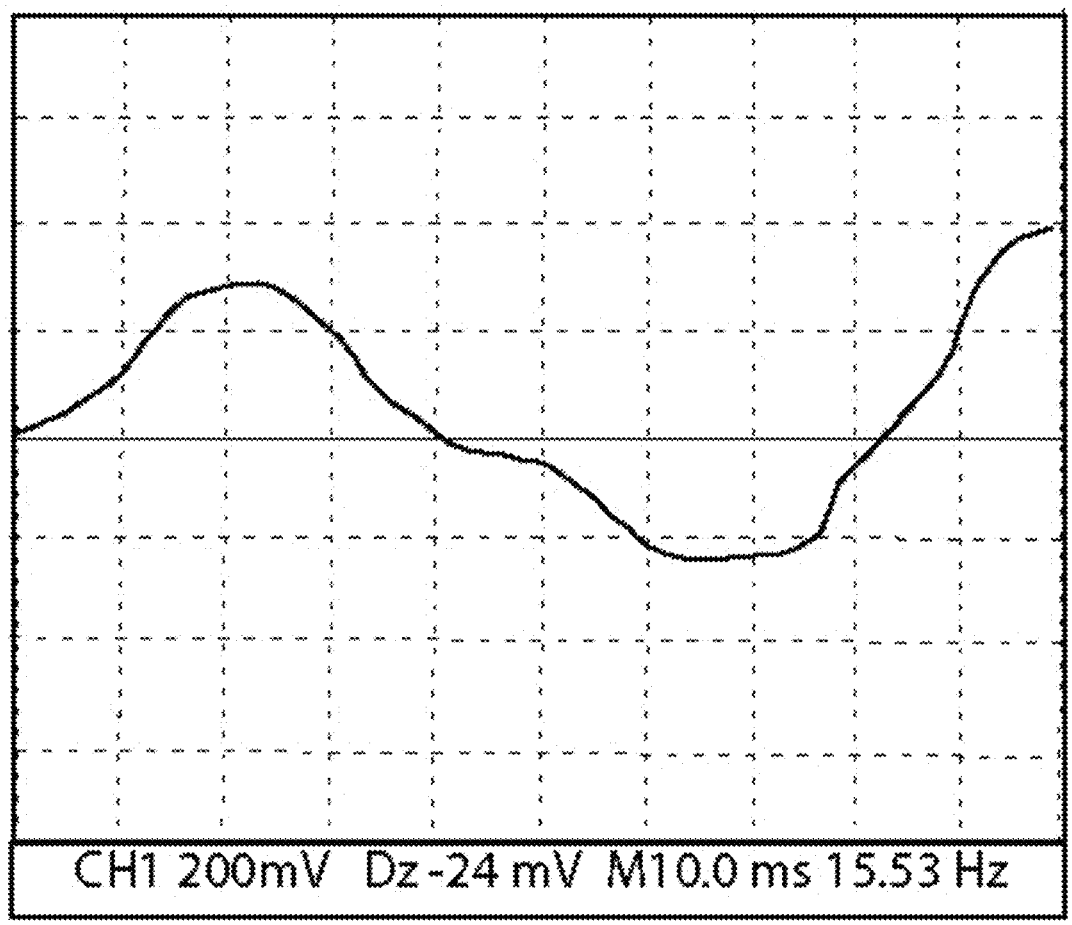
FIG. 17H is an illustration of a trace of oscilloscope patterns observed during second part of testing cycle of equipment used to simulate, observe, and/or test operation of a wave swell energy capture infrastructure comprising surface flotation apparatus, dual cable drum apparatus, and electric generator, according to an implementation.
Figure 17I:
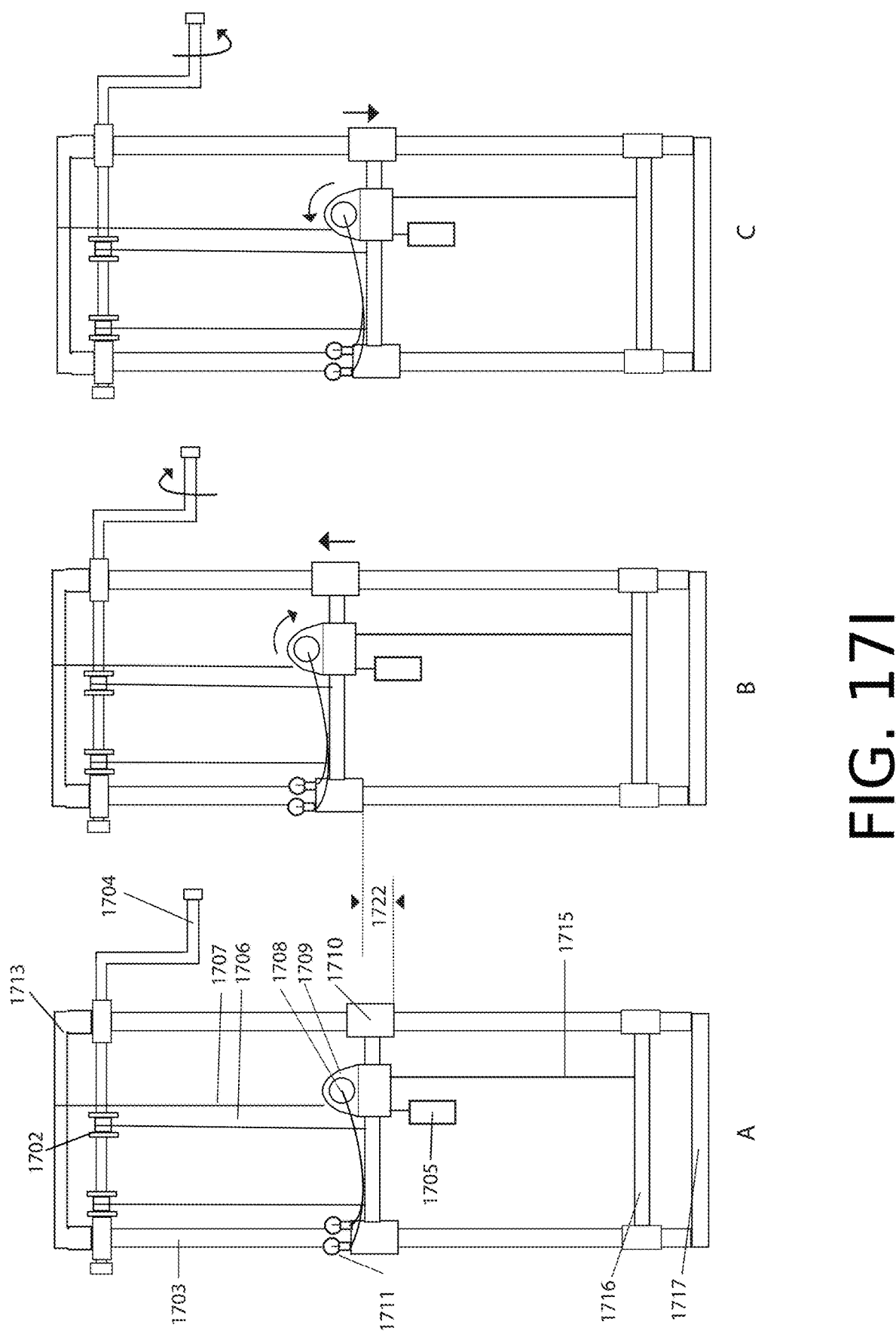
FIG. 17I is a sequence of illustrations of equipment used to simulate, observe, and/or test operation of a wave swell energy capture infrastructure comprising a weighed surface flotation apparatus, dual cable drum apparatus, and electric generator, according to an implementation.
Figure 17J:
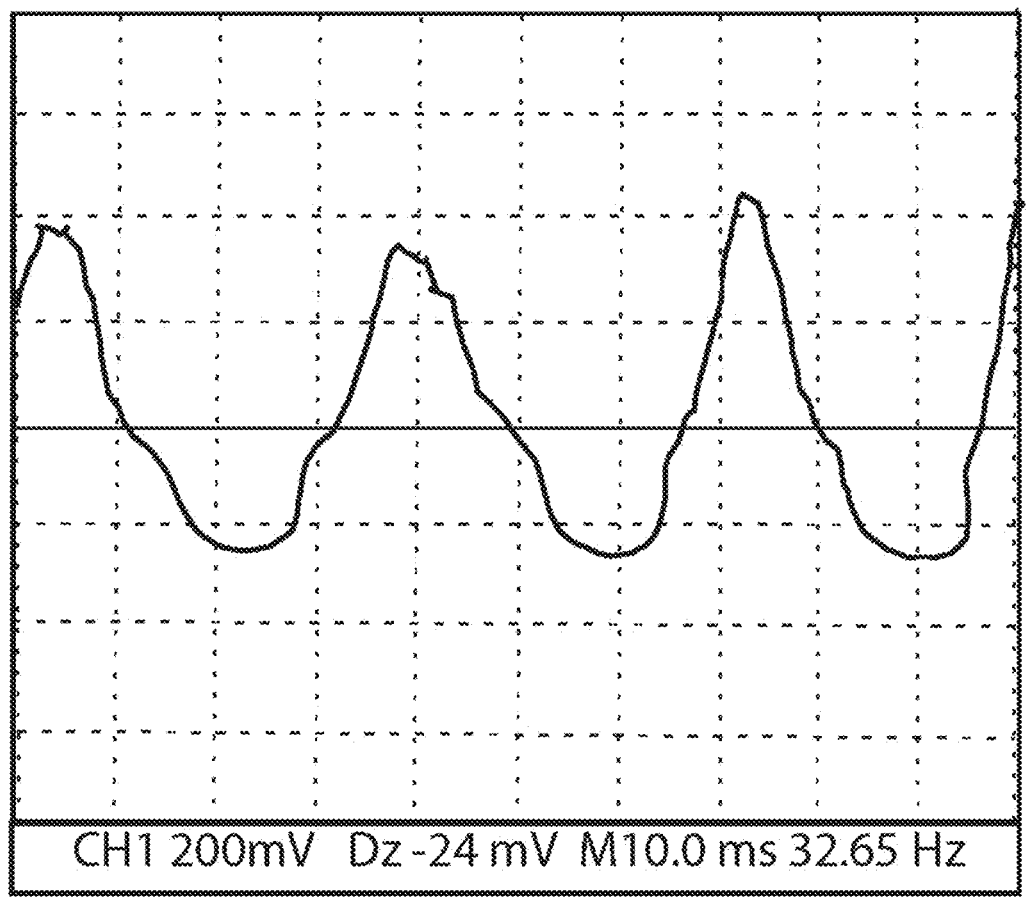
FIG. 17J is an illustration of a trace of oscilloscope patterns observed during testing of equipment used to simulate, observe, and/or test operation of a wave swell energy capture infrastructure comprising a weighted surface flotation apparatus, dual cable drum apparatus, and electric generator, according to an implementation.

In FIG. 17A though FIG. 17I, the test stand may, for example, be comprised of base structure 1717 and sliding crossbar 1710, which can be moved up and down on parallel vertical rails 1703, via connecting cable 1706, connected to cable drum 1702, according to particular implementations. As illustrated, in some instances, sliding crossbar 1710 may be designed, for example, to simulate the relative up and down movement of a surface flotation apparatus transitioning across a full wave period. Crossbar 1716 may be used to represent the seabed or floor for securing a subsea cable 1715 or subsea pulley assembly 1712. A dual cable drum apparatus 1709 may be capable of replicating one or more operations of a dual cable drum apparatus alluded to in this disclosure. Subsea pulley assembly 1712 and subsea interconnecting cables 1714, and 1715, are used to simulate one or more operations of subsea cable and pulley systems discussed within this disclosure. Cable 1715 terminates in and may be, in whole or in part, connected to one of two cable drums within dual cable drum apparatus 1709. Second of two cable drums, within dual cable drum apparatus 1709, connects via cable, to tension apparatus 1701. Two permanent magnet generators 1708 are attached to each end of dual cable drum apparatus 1709. Each generator 1708 provides variable frequency voltage and current to a socket comprising two lights each, referenced at 1711.

FIG. 17A is a sequence of illustrations of equipment used which may be capable of simulating, and testing one or more operations of wave capture infrastructure comprising surface flotation apparatus, dual cable drum apparatus, seabed mounted subsea pulley assembly, tensioning apparatus, and electric generator according to a specific implementation.

As illustrated in FIG. 17A illustration A, seabed mounted subsea pulley assembly 1712 attached to crossbar 1716, may, for example, be comprised of a set of single pulleys, 1718 and 1719 that are connected together in a "block and tackle" configuration (block and tackle may be defined as two or more pulleys assembled to form paired blocks, with a rope or cable threaded between them). Connecting cable 1715, after passing through a guide pulley 1720 may, in whole or in part, be terminated within one of two cable drums within dual cable drum apparatus 1709.

As depicted in FIG. 17A illustration B, turning handle 1704 in a clockwise direction, rotating cable drum 1702, causes sliding crossbar 1710, connected to cable drum 1702 via cable 1706, to travel vertically upward a distance referenced at 1722. Upward movement of sliding crossbar 1710 results in upper pulley 1718 of subsea pulley assembly 1712 to travel a distance referenced as 1723, which may be equal to distance 1722, traveled by sliding crossbar 1710. Connecting cable 1715 linear downward travel distance, referenced as 1724, may be greater than travel distance of sliding crossbar 1710, referenced as 1722, due to the "block and tackle" configuration of subsea pulley assembly 1712 (block and tackle may be defined as two or more pulleys assembled to form paired blocks, with a rope or cable threaded between them). Vertical travel of connecting cable 1715, connected to one drum of dual cable drum apparatus 1709, causes dual cable drum apparatus 1709 to rotate in clockwise direction. Clockwise direction rotation of a second cable drum, of dual cable drum apparatus 1709, connected via cable to tension apparatus 1701, results in retraction of tension apparatus 1701. Retraction of tension apparatus 1701 results in energy being buildup within tension apparatus 1701, due to compression of tensioner spring. Rotation of dual cable drum apparatus 1709 provides rotatory motion and torque to two connected generators 1708.

As illustrated in FIG. 17A illustration C, turning handle 1704 in counter-clockwise direction, rotating cable drum 1702, causes sliding crossbar 1710, connected to cable drum 1702 via cable 1706, to travel vertically downward equal to distance referenced at 1722 in FIG. 17A illustration A. Downward travel of sliding crossbar 1710, allows upper pulley 1718 of subsea pulley assembly 1712 to travel vertically downward equal to a distance referenced at 1723 in FIG. 17A illustration A. Linear upward travel of cable 1715 may be equal to distance referenced at 1724. Downward travel of upper pulley 1718, releases tension on cable 1715, allowing cable 1715 to pulled vertically upward by compressed spring energy within tension apparatus 1701 and results in counter-clockwise rotation of dual cable drum apparatus 1709. Release of compressed spring energy within tension apparatus 1701 applies counter-clockwise rotational torque to dual cable drum apparatus 1709. Rotational torque applied to dual cable drum apparatus 1709, by release of compressed spring energy within tension apparatus 1701, provides rotatory motion and torque to two connected generators 1708.

FIG. 17C is a sequence of illustrations of equipment which may be capable of simulating, and testing one or more operations of wave swell energy capture infrastructure comprising surface flotation apparatus, surface flotation apparatus mounted subsea pulley assembly, dual cable drum apparatus, tensioning apparatus, and electric generator according to a specific implementation detailed within this disclosure.

As illustrated in FIG. 17C illustration A, surface flotation apparatus mounted subsea pulley assembly 1712, attached to sliding crossbar 1710, which may, for example be comprised of a set of single pulleys, 1718 and 1719, which are connected together in "block and tackle" configuration. (block and tackle may be defined as two or more pulleys assembled to form paired blocks, with a rope or cable threaded between them). Subsea interconnecting cable 1714 attaches to lower pulley assembly of subsea pulley assembly 1712 at one end and crossbar 1716 at the other end. Connecting cable 1715, after passing through guide pulley 1720, may be, in whole or in part, terminated within one of two cable drums within dual cable drum apparatus 1709.

As depicted FIG. 17C illustration B, turning handle 1704 in clockwise direction, rotating cable drum 1702, causes sliding crossbar 1710, connected to cable drum 1702 via cable 1706, to travel vertically upward a distance referenced at 1722. Upward movement of sliding crossbar 1710 results in upper pulley 1719 of surface-flotation mounted subsea pulley assembly 1712, to travel a distance referenced as 1723, which may be equal to distance 1722, traveled by sliding crossbar 1710. Connecting cable 1715 linear distance traveled, may be greater than travel distance of sliding crossbar 1710, referenced as 1722, due to "block and tackle" configuration of surface flotation mounted subsea pulley assembly 1712 (block and tackle may be defined as two or more pulleys assembled to form paired blocks, with a rope or cable threaded between them). Linear travel of connecting cable 1715, connected to one drum of dual cable drum apparatus 1709, causes dual cable drum apparatus 1709 to rotate in counter-clockwise direction. Counter-clockwise direction rotation of second cable drum, of dual cable drum apparatus 1709, connected via cable, to tension apparatus 1701, results in retraction of tension apparatus 1701. Retraction of tension apparatus 1701 results in energy being built up within tension apparatus 1701, due to compression of tensioner spring. Rotation of dual cable drum apparatus 1709 provides rotatory motion and torque to two connected generators 1708.

As illustrated in FIG. 17C illustration C, turning handle 1704 in counter-clockwise direction, rotating cable drum 1702, causes sliding crossbar 1710, connected to cable drum 1702 via cable 1706, to travel vertically downward equal to distance referenced at 1722 in FIG. 17C illustration A. Downward travel of sliding crossbar 1710, allows upper pulley 1719 of surface flotation mounted subsea pulley assembly 1712 to travel vertically downward equal to distance referenced at 1723 in FIG. 17C illustration A. Downward travel of upper pulley 1719, releases tension on cable 1715, allowing cable 1715 to be pulled vertically upward by compressed spring energy within tension apparatus 1701 and results in clockwise rotation of dual cable drum apparatus 1709. Release of compressed spring energy within tension apparatus 1701 applies clockwise rotational torque to dual cable drum apparatus 1709. Rotational torque applied to dual cable drum assembly 1709, by release of compressed spring energy within tension apparatus 1701, provides rotatory motion and torque to two connected generators 1708.

FIG. 17D is a sequence of illustrations of equipment which may be capable of simulating, and testing one or more operations of wave swell energy capture infrastructure comprising surface flotation apparatus, dual cable drum apparatus, tensioning apparatus, and electric generator according to a specific implementation detailed within this disclosure.

As illustrated in FIG. 17D illustration A, connecting cable 1715, attached to crossbar 1716 at one end may be, in whole or in part, terminated within one of two cable drums within dual cable drum apparatus 1709 at the other end.

As depicted FIG. 17D illustration B, turning handle 1704 in clockwise direction, rotating cable drum 1702, causes sliding crossbar 1710, connected to cable drum 1702 via cable 1706, to travel vertically upward distance referenced at 1722. Upward movement of sliding crossbar 1710 results in cable 1715 rotating dual cable drum apparatus 1709 in a clockwise direction. Clockwise direction rotation of dual cable drum apparatus 1709, connected via cable, to tension apparatus 1701, results in retraction of tension apparatus

1701. Retraction of tension apparatus 1701 results in energy being buildup within tensioner 1701, due to compression of tensioner spring. Rotation of dual cable drum apparatus 1709 provides rotary motion and torque to two connected generators 1708.

As illustrated in FIG. 17D illustration C, turning handle 1704 in counter-clockwise direction, rotating cable drum 1702, causes sliding crossbar 1710, connected to cable drum 1702 via cable 1706, to travel vertically downward equal to distance referenced at 1722 in FIG. 17D illustration A. Downward travel of sliding crossbar 1710, releases tension on cable 1715, allowing a cable connected to one cable drum within dual cable drum apparatus 1709 to be pulled vertically upward by compressed spring energy within tension apparatus 1701, resulting in counter-clockwise rotation of dual cable drum apparatus 1709 applying counter-clockwise rotational torque to dual cable drum apparatus 1709. Rotational torque applied to dual cable drum apparatus 1709, by release of compressed spring energy within tension apparatus 1701, provides rotary motion and torque to two connected generators 1708.

FIG. 17F is a sequence of illustrations of equipment which may be capable of simulating, and testing one or more operations of wave swell energy capture infrastructure comprising surface flotation apparatus, dual cable drum apparatus, and electric generator according to a specific implementation detailed within this disclosure.

As illustrated in FIG. 17F illustration A, connecting cable 1715, attached to crossbar 1716 at one end, may be, in whole or in part, terminated within one of two cable drums within dual cable drum apparatus 1709 at the other end. Cable 1707 may be, in whole or in part, secured to second one of two drums within dual cable drum apparatus at one end and to stationary crossbar 1713, at the other end.

As depicted FIG. 17F illustration B, turning handle 1704 in clockwise direction, rotating cable drum 1702, causes sliding crossbar 1710, connected to cable drum 1702 via cable 1706, to travel vertically upward distance referenced at 1722. Upward movement of sliding crossbar 1710 results in cable 1715 rotating dual cable drum apparatus 1709 in a clockwise direction. Clockwise direction rotation of dual cable drum apparatus 1709, provides rotary motion and torque to two connected generators 1708.

As illustrated in FIG. 17F illustration C, turning handle 1704 in counter-clockwise direction, rotating cable drum 1702, causes sliding crossbar 1710, connected to cable drum 1702 via cable 1706, to travel vertically downward equal to distance referenced at 1722 in FIG. 17F illustration A. Downward travel of sliding crossbar 1710, releases tension on cable 1715, allowing a cable 1707 connected to one cable drum within dual cable drum apparatus 1709 to apply a counter-clockwise rotational torque to dual cable drum apparatus 1709. Rotational torque applied to dual cable drum apparatus 1709, provides two connected generators 1708, with rotary motion and torque.

FIG. 17I is an illustration of equipment that may be capable of simulating and testing one or more operations of a wave swell energy capture infrastructure comprising a weighted surface flotation apparatus, dual cable drum apparatus, and electric generator according to a specific implementation detailed within this disclosure.

As illustrated in FIG. 17I illustration A, connecting cable 1715, attached to crossbar 1716 at one end may be, in whole or in part, terminated within one of two cable drums within dual cable drum apparatus 1709 at the other end. Cable 1707 may be, in whole or in part, secured to second drum within dual cable drum apparatus at one end and to stationary crossbar 1713, at other end. A weight 1705 may be, in whole or in part, attached to sliding crossbar 1710.

As depicted in FIG. 17I illustration B, turning handle 1704 clockwise direction, rotating cable drum 1702, causes sliding crossbar 1710, connected to cable drum 1702 via cable 1706, to travel vertically upward distance referenced at 1722. Upward movement of sliding crossbar 1710 results in cable 1715 rotating dual cable drum apparatus 1709 in clockwise direction. Clockwise direction rotation of dual cable drum apparatus 1709, provides rotary motion and torque to two connected generators 1708.

As illustrated in FIG. 17I illustration C, turning handle 1704 in counter-clockwise direction, rotating cable drum 1702, causes sliding crossbar 1710, connected to cable drum 1702 via cable 1706, to travel vertically downward equal to distance referenced at 1722 in FIG. 17I illustration A. Downward travel of sliding crossbar 1710, releases tension on cable 1715, allowing cable 1707 connected to one cable drum within dual cable drum apparatus 1709 to apply counter-clockwise rotational torque to dual cable drum apparatus 1709. Weight 1705, attached to sliding crossbar 1710, provides additional downward force on sliding crossbar 1710, providing additional rotary torque to dual cable drum apparatus 1709. Rotational torque applied to dual cable drum apparatus 1709, provides rotary motion and torque to two connected generators 1708.

Figure 18:
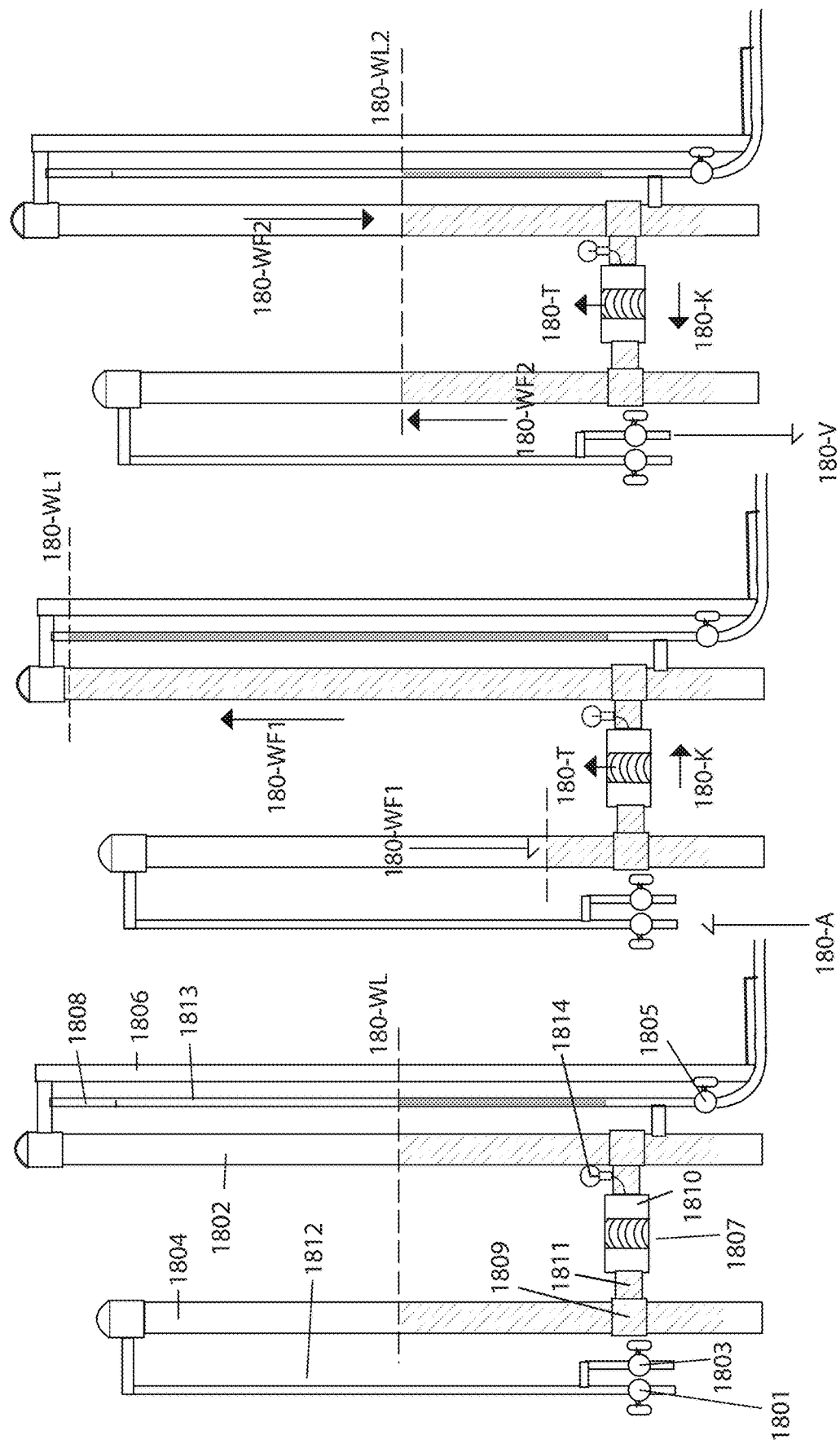
FIG. 18 is a sequence of illustrations of equipment that may be employed to observe and/or test different hydro kinetic turbine bucket and nozzle configurations of an example wave swell energy capture infrastructure, according to an implementation.

FIG. 18 is a sequence of illustrations of equipment which may be capable of simulating, and testing one or more different hydro kinetic turbines, as well as different hydro kinetic turbine bucket and nozzle configurations of wave swell energy capture infrastructure according to particular implementations, as illustrated in some instances, a bi-directional flow, hydro kinetic turbine, comprising a magnetically coupled rotor driven generator, and a bi-directional flow, hydro kinetic turbine, comprising a stationary stator generator.

As illustrated in FIG. 18 illustration A, a test stand may, as example, comprise two vertical 101 mm diameter columns 1804 and 1802. Each vertical column, in this example, has a 101 mm diameter Tee 1809 located near the bottom of column 1804 and 1802. Each Tee section has short 101 mm diameter pipe section 1811 which may be, for example, fitted with rubber boot sleeve 1810. Test stand, as illustrated in FIG. 18 may, for example, be designed to allow to insertion of test turbine, illustrated as an example at 1807 between columns 1804 and 1802, utilizing rubber boot sleeves 1810. Once an example test turbine 1807, is installed between columns 1804 and 1802, columns 1804 and 1802 may, in whole or in part, be connected together to form a watertight "U". As illustrated, for example, top of column 1804 and 1802 may be capped off and sealed. Column 1804 column top may connect, for example, to a 19 mm diameter pipe 1812. Bottom of 19 mm diameter pipe 1812 may, for example, be fitted with two valves 1801 and 1803. Valve 1801 may be used for air injection, and valve 1803 may be used as a pressure release valve. Top of column 1802, may connect for example, to a 25.3 mm diameter pipe 1806. Pipe 1806 may, in whole or in part, act as an overflow drain Line and column vent. Pipe 1808, a 19 mm diameter pipe, may connect, for example to 25.3 mm diameter pipe 1806. Pipe 1808 may connect, in this example, to a clear sight tube 1813. Bottom of clear sight tube 1813 may, in this example, connect back into water column 1802. A fill and drain valve 1805 may be located at bottom end of clear sight tube 1813. FIG. 18 illustration A (illustrated in a pretest position) is shown filled with water up to the halfway mark, referenced at 180WL in both columns, 1802 and 1804.

As depicted in FIG. 18 illustration B, compressed air, referenced at 180-A may be injected into top of column 1804 through valve 1801. As illustrated and indicated by arrows 180-WF1, compressed air injected into the top of column 1804 operationally pushes water in column 1804 downward and through turbine 1807, then up into column 1802. Injected compressed air into column 1804 may be shutoff once water level in column 1802 reaches the top of column 1802, referenced at level mark 180-WL1. Flow of water through turbine 1807, referenced at 180-K may, in whole or in part, cause turbine 1807 to rotate, as referenced at 180-T. Rotation of turbine 1807, may, in whole or in part, generate voltage and current within turbine 1807 apparatus, lighting indicator light 1814.

As depicted in FIG. 18 illustration C, air pressure in column 1804 may be vented through valve 1803. Venting of the compressed air releases the pressure in column 1804 that may, in whole or in part, allow a positive water head in column 1802 to push water back through turbine 1807 into column 1804, as indicated by arrow 180-WF2. Vent 1803 may be shutoff once the water level in column 1802 reaches the middle of column 1802 referenced at level mark 180-WL2. Flow of water through turbine 1807, referenced at 180-K may, in whole or in part, cause turbine 1807 to rotate, referenced at 180-T. Rotation of turbine 1807 may, in whole or in part, generate voltage and current within turbine 1807 apparatus, lighting indicator light 1814.

An experiment was designed, that may be capable to simulate, test and compare one or more operations which may comprise several different turbine bucket and nozzle configurations illustrated as examples, in FIGS. 14A through 14C. Simulation tests were carried out utilizing test equipment described and illustrated in FIG. 18. Tests were performed on model of single shaft two stage hydro kinetic impulse turbine illustrated in FIG. 14A, model of dual shaft two stage hydro kinetic impulse turbine illustrated in FIG. 14B, and model of single shaft single stage hydro kinetic impulse turbine illustrated in FIG. 14C. Turbine models installed into the test stand described and tested in FIG. 18 were observed to have averaged a range of turbine hydro flow velocities of roughly 1 meter/sec. Revolutions per minute (RPM) were obtained via a strobe light. The average sustained RPM observed for each of turbine configurations during hydro flow tests are listed in Table 1 below.

TABLE 1

Average Sustained RPM

| Turbine Configuration | RPM |
|---|---|
| 14A | 769 |
| 14B | 2,924 |
| 14C | 3,355 |

Experiments that may be capable to simulate and test one or more operations of a wave swell energy capture infrastructure comprising a model of a bi-directional flow, hydro kinetic turbine, with a magnetically coupled drive rotor assembly driven generator, described and illustrated in FIG. 15A, were performed as described as follows: A preliminary test using compressed air was performed on a bi-directional flow, hydro kinetic turbine, with a magnetically coupled drive rotor assembly driven generator test model, described and illustrated in FIG. 15A. Preliminary compressed air testing was followed by numerous tests utilizing tests procedures as described and illustrated in FIG. 18. Bi-directional flow, hydro kinetic turbine model illustrated in FIG. 15A, was installed into test stand as described and tested as shown in FIG. 18 using water. Hydro flow velocities through a model bi-directional flow, hydro kinetic turbine, with a magnetically coupled drive rotor assembly driven generator, during testing, were observed to have averaged roughly 1.524 meter/sec. Voltage produced by a model bi-directional flow, hydro kinetic turbine, with a magnetically coupled drive rotor assembly driven generator as described and illustrated in FIG. 15A, during testing, may be seen in the representative trace of oscilloscope patterns in FIG. 15B, which ranged from −0.375 VAC to +0.375 VAC at a frequency of around 70.64 Hz.

Experiments that may be capable of simulating and testing one or more operations of wave swell energy capture infrastructure comprising a model of bi-directional flow, hydro kinetic turbine, with a stationary stator, permanent magnet generator, described and illustrated in FIG. 16A were performed as described below:

A preliminary test was performed on test model, as described and illustrated in FIG. 16A using compressed air, followed by numerous tests utilizing tests and procedures, as described and illustrated in FIG. 18. Bi-directional flow, hydro kinetic turbine model 16A was installed into test stand as described and tested as shown in FIG. 18. Hydro flow velocities through model bi-directional flow, hydro kinetic turbine, with a stationary stator, permanent-magnet-generator, described and illustrated in FIG. 16A, during testing, averaged roughly 1.524 meter/sec. Voltage produced by model of a bi-directional flow, hydro kinetic turbine, with a stationary stator, permanent magnet generator, as described and illustrated in FIG. 16A, after rectification, may be seen in representative trace of oscilloscope patterns observed during testing in FIG. 16C, which ranged from 0.02 mVDC to +0.375 mVDC.

An experiment that may be capable to simulate and test one or more operations of a wave swell energy capture infrastructure comprising an example of particular implementation detailed within this disclosure that may be comprised of surface flotation apparatus, dual cable drum apparatus, seabed mounted subsea pulley assembly, tensioning apparatus and electric generator, was carried out utilizing test equipment as described and illustrated in FIG. 17A. In several specific experiments, referring to FIG. 17A, vertical travel referenced at 1722, of sliding crossbar 1710, was observed to have averaged roughly 127 mm in approximately two seconds or at velocity of 63.5 mm/sec. Connecting cable 1715 was observed to have averaged a traveled distance of roughly 254 mm, referenced at 1724 in FIG. 17A-B, at velocity of approximately 127 mm/sec. Dual cable drum apparatus 1709 cable drum average rotation was 1.79 revolutions. Average voltages generated by one of two generators as shown below in FIG. 17B, may be seen in representative trace of oscilloscope patterns observed during testing, which ranged between −0.6 VAC and +0.4 VAC at a frequency of 91.46 Hz.

Experiments that may be capable to simulate, and test one or more operations of a wave capture infrastructure comprising one example of a particular implementation detailed within this disclosure, that may for example be comprised of a surface flotation apparatus, dual cable drum apparatus, surface flotation apparatus mounted subsea pulley assembly, tensioning apparatus and electric generator, were carried out utilizing test equipment as illustrated in FIG. 17C. In these experiments, referring to FIG. 17C vertical travel referenced at 1722 of sliding crossbar 1710, was observed to have averaged roughly 127 mm in approximately two seconds, or velocity of 63.5 mm/sec. Dual cable drum apparatus 1709 cable drum rotation averaged 1.79 revolutions. Observed voltages, averaged by one of two generators, were the same as shown above in FIG. 17B representative trace of the oscilloscope patterns observed during testing, with voltages averaging between −0.6 VAC and +0.4 VAC at a frequency of 91.46

Another set of experiments that may be capable to simulate and test one or more operations of wave swell energy capture infrastructure comprising one example of particular implementation described in detail within this disclosure, that may for example comprise a surface flotation apparatus, dual cable drum apparatus, tensioning apparatus and electric generator, and without a subsea pulley assembly, were carried out utilizing test equipment as illustrated in 17D. These experiments referring to FIG. 17D, were observed to have averaged vertical travel of roughly 127 mm, referenced at 1722, of sliding crossbar 1710 with an observed average velocity of roughly 63.5 mm/sec. Dual Cable drum apparatus 1709 rotated an average of 0.895 revolutions. Average voltages generated by one of two generators, may be seen below in FIG. 17E representative trace of the oscilloscope patterns observed during testing, where voltages ranged between −0.208 VAC and +0.20 VAC at a frequency of 19.6 Hz.

Another set of experiments that may be able to simulate and test one or more operations of wave swell energy capture infrastructure comprising one example of particular implementation described in detail within this disclosure that may be comprised of a surface flotation apparatus, dual cable drum apparatus, electric generator, and without subsea pulley assembly or tensioner, were carried out utilizing test equipment as illustrated in 17F. In specific experiments referring to FIG. 17F, observed average vertical travel of roughly 127 mm referenced at 1722, of sliding crossbar 1710 was observed at average velocity of roughly 63.5 mm/sec in upward direction and an observed average vertical travel of roughly 127 mm at average downward velocity of roughly 42.3 mm/sec. Dual Cable drum apparatus 1709 average rotation was 0.895 revolutions. Average voltages generated by one of two generators may be seen below in FIG. 17G and FIG. 17H representative trace of the oscilloscope patterns observed during testing. FIG. 17G represents the upward travel voltage, and FIG. 17H represents the downward travel voltage. Output voltages ranged between 0.220 VAC and +0.220 VAC, with a frequency of 23.54 Hz during upward travel and 15.53 Hz during downward travel.

A fifth set of experiments that may be able to simulate, and test one or more operations of wave swell energy capture infrastructure comprising one example of a particular implementation described in detail within this disclosure, which may for example comprise weighted surface flotation apparatus, dual cable drum apparatus and electric generator, were carried out utilizing test equipment as illustrated in FIG. 17I.

In these experiments, referring to FIG. 17I, observed average vertical travel referenced at 1722, of sliding crossbar 1710 was roughly 127 mm, or an average velocity of 63.5 mm/sec in the upward direction and roughly 127 mm at an average velocity of 63.5 mm/sec in the downward direction. Dual Cable drum apparatus 1709 cable drum rotations averaged 0.895 revolutions. Average voltages generated by one of the two generators may be seen below in FIG. 17A5S, a representative trace of oscilloscope patterns observed during testing. Output voltage ranged between −0.220 VAC and +0.410 VAC, with a frequency of 32.65 Hz.

Referring to tests detailed in FIGS. 14A through 14C and table 1, comparing the operation of several different turbine bucket and nozzle configurations, it appears that, in some instances, a single shaft single stage hydro kinetic impulse turbine bucket and nozzle configuration FIG. 14C, may be capable of producing more revolutions per minute (RPM) for a given hydro flow as compared to the other configurations as detailed in FIG. 14A and FIG. 14B.

Referring to tests detailed in FIGS. 17A through 17I, it appears that, in some instances, using a block and tackle configuration and a tensioning apparatus, as part of a subsea and surface flotation system in a particular implementation detailed within this disclosure may be capable of producing an increase in output for a particular implementation.

Referring to tests detailed in FIGS. 17A through 17I, it appears that, in some instances, using a tensioning apparatus, as part of surface flotation system in a particular implementation detailed within this disclosure, may be capable of producing an increase in output for a particular implementation.

Figure 19A:
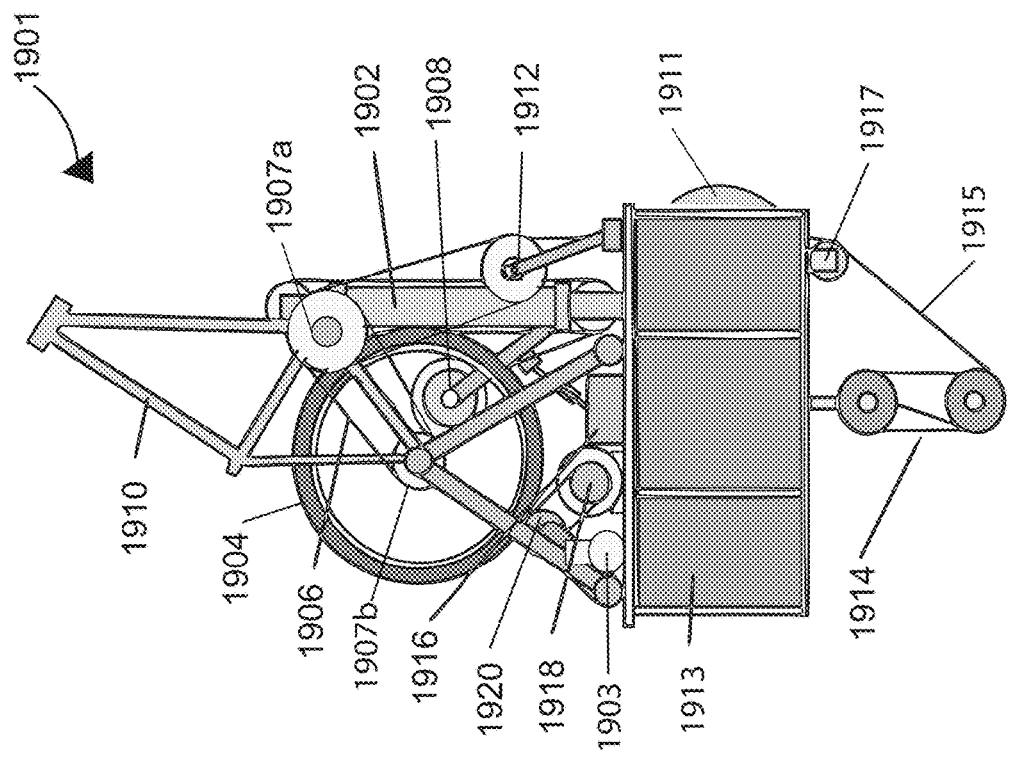
FIGS. 19A and 19B are plan views illustrating components that may be employed to construct a power conversion apparatus that may be used for an example wave swell energy capture infrastructure, according to an implementation.
Figure 19B:
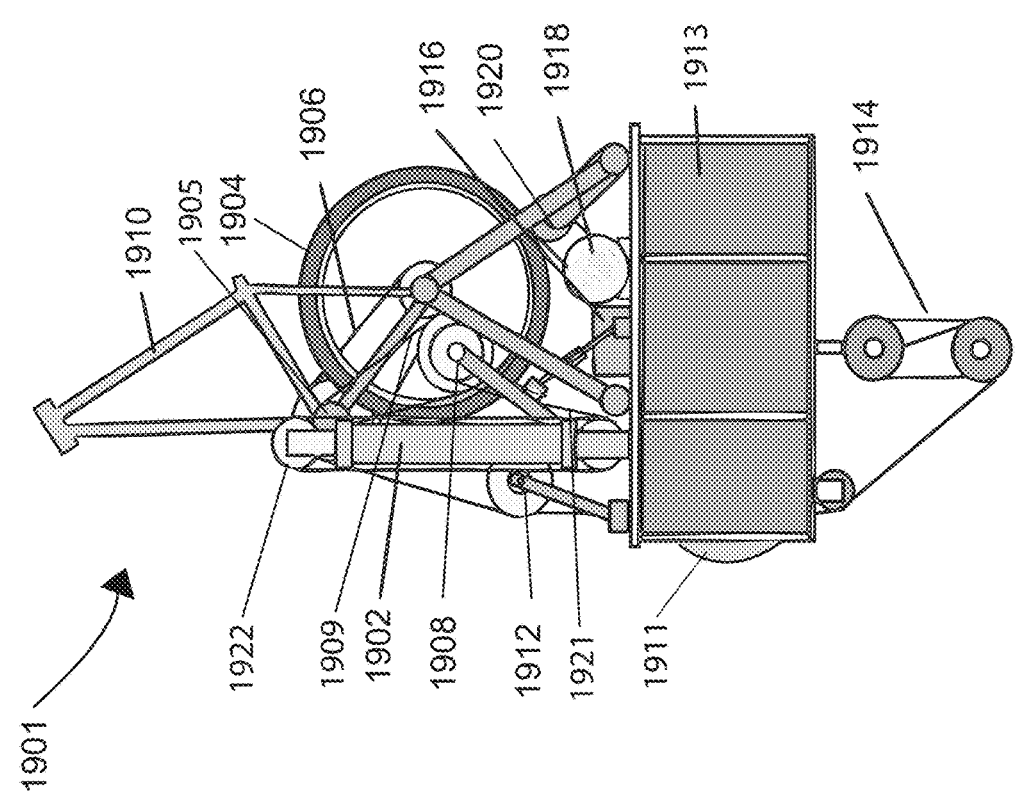

FIGS. 19A-B are plan views illustrating components that may be utilized to more effectively and/or more efficiently construct an example of a power conversion apparatus for a proto-type of wave swell energy capture infrastructure for a particular implementation detailed within this disclosure, if suitable or desired. As an example and as illustrated in FIG. 19A-B, recycled bicycle and automotive parts may be utilized to construct a wave swell energy capture infrastructure.

FIG. 19A provides a front elevation view of power conversion apparatus referenced as 1901 and FIG. 19B provides rear elevation view of power conversion apparatus referenced as 1901. Power conversion apparatus, referenced at 1901, in this example may comprise a rear section of a bicycle frame indicated at 1910. A cable drum 1912 connects to subsea cable 1915 via guide pulley 1917. Linear travel of subsea cable 1915 may be routed through subsea pulley assembly 1914 or connected to a seabed anchor. Linear travel of subsea cable 1915 may be, in whole or in part, converted to rotary motion and torque by cable drum 1912. Cable drum 1912 may be, in whole or in part, connect to drive sprocket 1907a. Drive sprocket 1907a, via drive chain 1906 and sprocket 1907b may, at least in part, provide rotary torque to drive wheel 1904. Drive wheel 1904 may, at least in part, provide rotary torque to drive pulley 1920. Drive pulley 1920 may, at least in part, provide rotary torque to generator 1918. Generator 1918 may consist of a permanent magnet generator or an automotive alternator or similar. Generator 1918 provides amperage and voltage to battery 1916. Drive pulley 1905 may, at least in part, provide rotary motion and torque to tension drum 1908 via drive chain 1909. Tensioner cable 1921 connects to tensioning system cylinder 1902, routing through pulleys 1917. Compressor 1903 may, in whole or in part, provide compressed air to air storage tank 1911. Air storage tank 1911 may, in whole or in part connect to tensioning system cylinder 1902. Power conversion apparatus referenced as 1901, may in whole or in part, be attached to one or more floats 1913. Float 1913 may, as illustrated in this example, comprise two 55-gallon drums.

What is claimed is:
1. An apparatus comprising:
a subsea cable assembly fixedly attached to a surface flotation apparatus via one or more pulleys of a set of pulleys of the subsea cable assembly, the subsea cable assembly having a set of guides to rotationally route one or more cables of a set of cables of the subsea cable assembly for a movable connection of the one or more cables to a dual cable drum apparatus via a first drum, wherein one or more additional pulleys of the subsea cable assembly fixedly attached to one or more subsea interconnecting cables to interconnect with at least one of a seabed anchor or a sea anchor, wherein the surface flotation apparatus is operatively connected to a cable tensioning apparatus via at least a connecting cable of a second drum of the dual cable drum apparatus, wherein the cable tensioning apparatus, the dual cable drum apparatus, and the surface flotation apparatus cooperate, via at least the one or more subsea interconnecting cables, the connecting cable, and the set of cables of the subsea cable assembly to convert a linear motion of the surface flotation apparatus into a rotary motion of the dual cable drum apparatus during a full wave period; and wherein the conversion is to amplify the linear motion of the surface flotation apparatus by a first threshold value, and wherein the first threshold value is a factor of a number of pulleys of the subsea cable assembly.

2. The apparatus of claim 1, wherein the apparatus is scalable relative to the surface flotation apparatus.

3. The apparatus of claim 1, wherein the full wave period comprises a first half-period and a second half-period.

4. The apparatus of claim 3, wherein the cable tensioning apparatus is utilized, at least in part, during the second half of the wave period.

5. The apparatus of claim 3, wherein the surface flotation apparatus is utilized, at least in part, during the first half of the wave period.

6. The apparatus of claim 1, wherein the conversion is to amplify the linear motion of the cable tensioning apparatus by a second threshold value, and wherein the second threshold is a factor of a number of pulleys of the cable tensioning apparatus and the speed of the second drum.

7. The apparatus of claim 1, wherein the rotary motion of the dual cable drum apparatus is converted into mechanical energy for use by a power conversion apparatus.

8. The apparatus of claim 7, wherein the power conversion apparatus is secured to the dual cable drum apparatus via one or more connectors of a disconnect apparatus.

9. The apparatus of claim 8, wherein the disconnect apparatus is connected to at least one of the following: a gearbox; a chain and sprocket drive; a belt and pulley drive assembly; or any combination thereof.

10. An apparatus comprising:
a subsea interconnecting cable operatively connected to a dual cable drum apparatus via a first drum, wherein the subsea interconnecting cable is fixedly attached to at least one of a seabed anchor or a sea anchor, wherein a surface flotation apparatus is operatively connected to a cable tensioning apparatus via at least a connecting cable of a second drum of the dual cable drum apparatus, wherein the cable tensioning apparatus, the dual cable drum apparatus, and the surface flotation apparatus cooperate, via the subsea interconnecting cable and the connecting cable to convert a linear motion of the surface flotation apparatus into a rotary motion of the dual cable drum apparatus during a full wave period; and wherein the conversion is to amplify the linear motion of the cable tensioning apparatus by a threshold value, and wherein the threshold value is a factor of a number of pulleys of the cable tensioning apparatus and the speed of the second drum.

11. The apparatus of claim 10, wherein the apparatus is scalable relative to the surface flotation apparatus.

12. The apparatus of claim 10, wherein the full wave period comprises a first half-period and a second half-period.

13. The apparatus of claim 12, wherein the cable tensioning apparatus is utilized, at least in part, during the second half of the wave period.

14. The apparatus of claim 12, wherein the surface flotation apparatus is utilized, at least in part, during the first half of the wave period.

15. The apparatus of claim 10, wherein the rotary motion of the dual cable drum apparatus is converted into mechanical energy for use by a power conversion apparatus.

16. The apparatus of claim 15, wherein the power conversion apparatus is secured to the dual cable drum apparatus via one or more connectors of a disconnect apparatus.

17. The apparatus of claim 16, wherein the disconnect apparatus is connected to at least one of the following: a gearbox; a chain; a sprocket drive; a belt; a pulley drive assembly; or any combination thereof.

18. The apparatus of claim 17, wherein one or more of the gearbox, the chain, the sprocket drive, the belt, and the pulley drive assembly have selectable input to output speed ratios.

* * * * *